United States Patent [19]
Itoh et al.

[11] Patent Number: 5,926,186
[45] Date of Patent: Jul. 20, 1999

[54] GRAPHIC EDITING APPARATUS AND METHOD

[75] Inventors: Yasunari Itoh, Kahoku-gun; Taiji Okamoto; Satoshi Kikuchi, both of Kawasaki; Masahiro Suzuki; Atsuko Kasai, both of Kahoku-gun, all of Japan

[73] Assignees: Fujitsu Limited, Kawasaki; PFU Limited, Ishikawa, both of Japan

[21] Appl. No.: 08/786,190

[22] Filed: Jan. 21, 1997

Related U.S. Application Data

[62] Continuation of application No. 08/562,262, Nov. 22, 1995, abandoned, which is a continuation of application No. 08/232,215, filed as application No. PCT/JP93/01303, Sep. 10, 1993, abandoned.

[30] Foreign Application Priority Data

| Sep. 10, 1992 | [JP] | Japan | 4-241113 |
| Sep. 10, 1992 | [JP] | Japan | 4-241114 |
| Sep. 10, 1992 | [JP] | Japan | 4-241115 |
| Sep. 10, 1992 | [JP] | Japan | 4-241116 |

[51] Int. Cl.⁶ .................................................. G06F 15/00
[52] U.S. Cl. ............................................................ 345/433
[58] Field of Search .................................. 395/133, 140, 395/142, 143; 345/121, 133, 134

[56] References Cited

U.S. PATENT DOCUMENTS 5,581,796  12/1996  Koga et al. .............................. 395/133

FOREIGN PATENT DOCUMENTS

| 63-049884 | 3/1988 | Japan . |
| 2-199579 | 8/1990 | Japan . |
| 3-136173 | 6/1991 | Japan . |
| 4-127278 | 4/1992 | Japan . |
| 4-130579 | 8/1992 | Japan . |
| 2221369 | 1/1990 | United Kingdom . |
| 2236638 | 4/1991 | United Kingdom . |
| 2258790 | 2/1993 | United Kingdom . |
| 2260240 | 4/1993 | United Kingdom . |

OTHER PUBLICATIONS

The Patent Office, (Combined Search and Examination Report under Sections 17 and 18(3), Nov. 7, 1996, 3 pages.
The Patent Office, Combined Search and Examination Report under Sections 17 and 18(3), Nov. 8, 1993, 3 pages.

*Primary Examiner*—Phu K. Nguyen
*Attorney, Agent, or Firm*—Staas & Halsey

[57] ABSTRACT

A graphic editing apparatus makes it easy to change positions, shapes, or states of a graphic in a screen on a display unit with the passage of time or the change in value of an attribute, and then delineate the resultant graphic. The graphic editing apparatus comprises displaying units 17 and 18 for displaying graphics and time instants in a graphic area 24 and a time area 25 respectively on a graphic display unit, a processor 19 for specifying in graphic information an association between points on a change reference graphic 27 and points on a time graphic 28, and an updating unit 20 for performing interpolation to calculate the position of a point on the change reference graphic 27 with the movement of a current time point on the time graphic 28 or the passage of time, executing editing to move or deform the graphic according to the calculated position of the point, and displaying the graphic. The graphic editing apparatus handles an attribute value display graphic and a time-sequentially varying graphic, sets a bind point, displays grips, performs graphic relating-based editing, edits graphics synchronously, and so on.

19 Claims, 39 Drawing Sheets

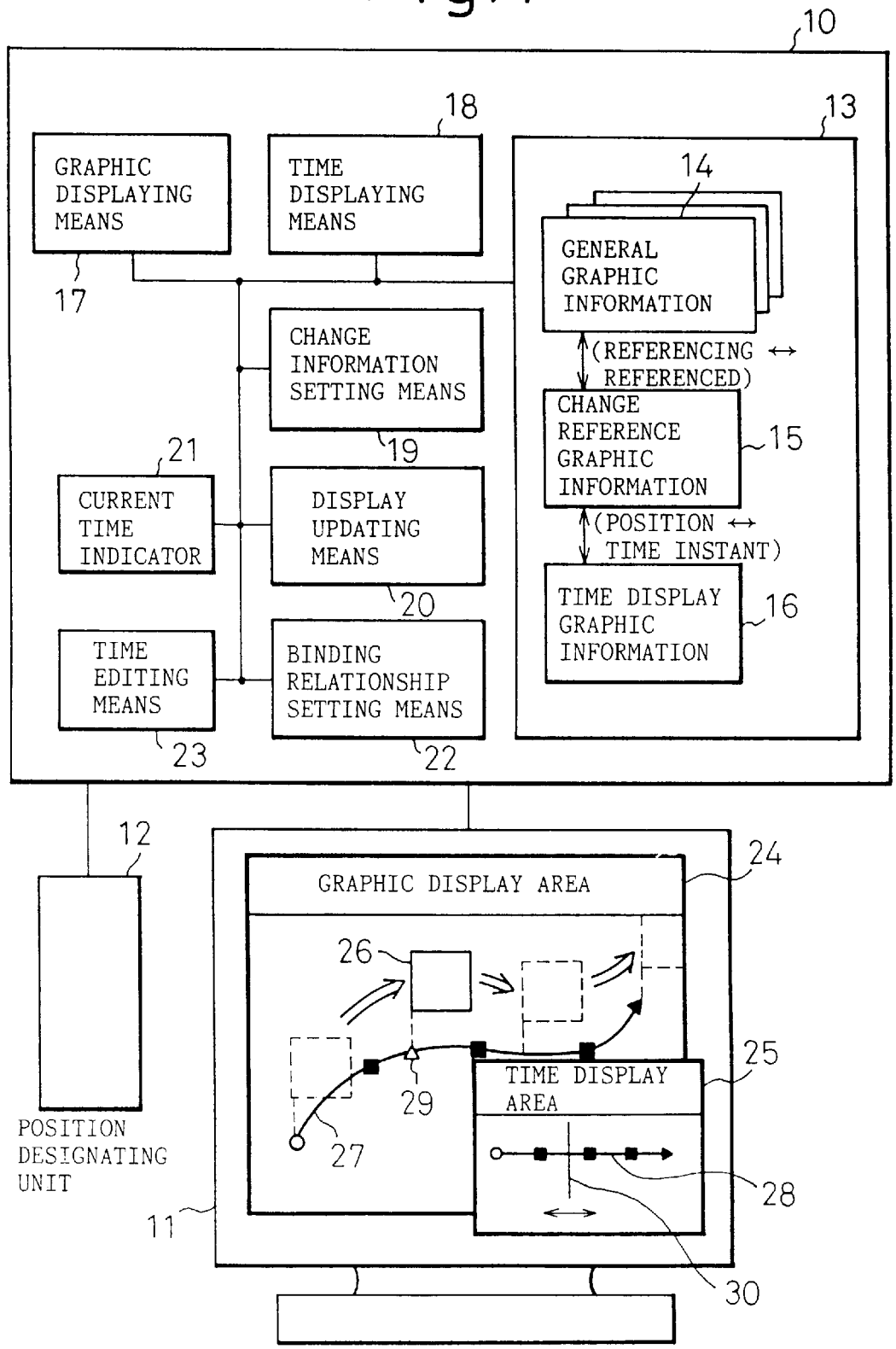

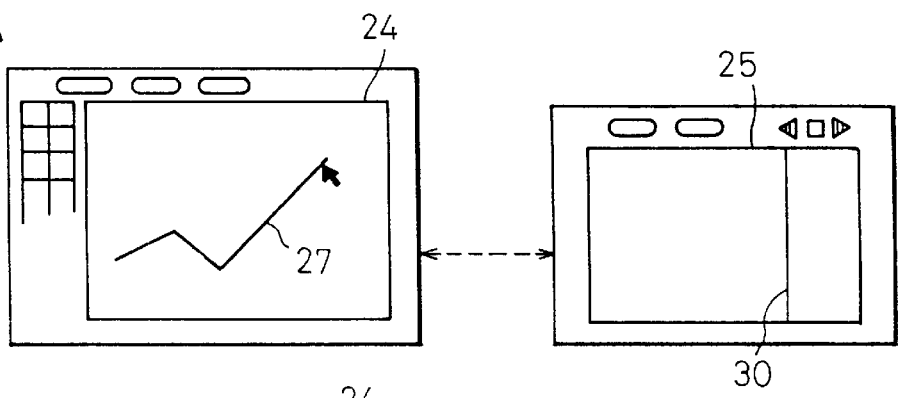
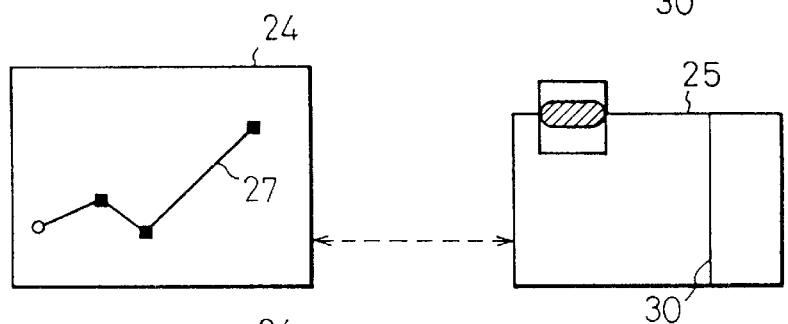
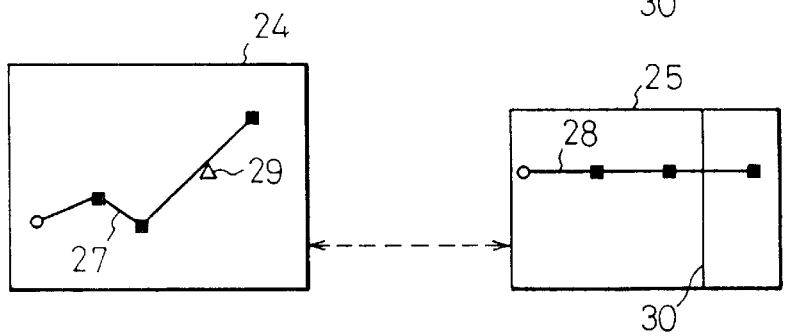
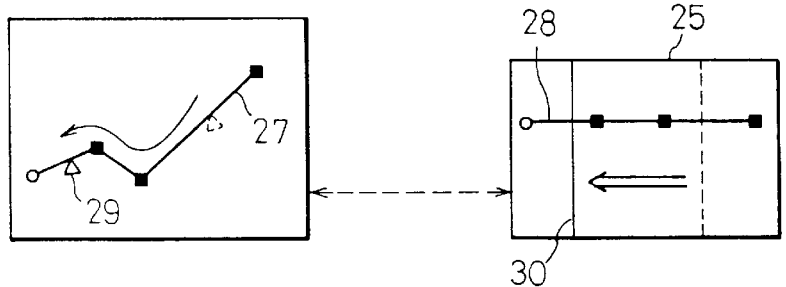

Fig.14A  Fig.14B
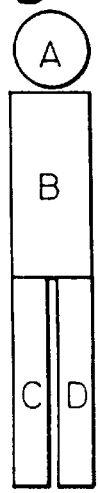
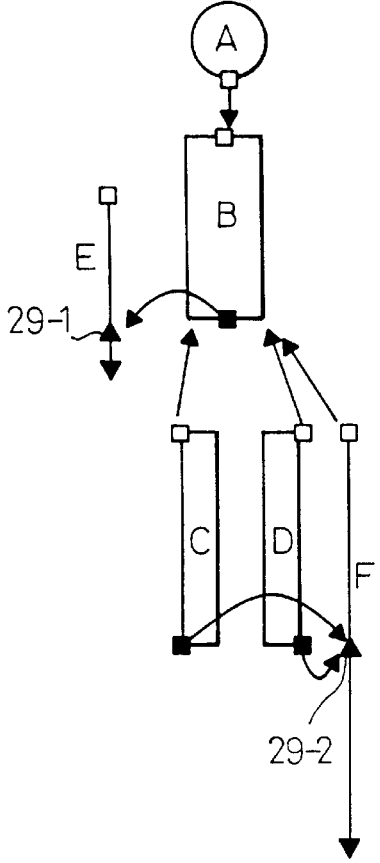
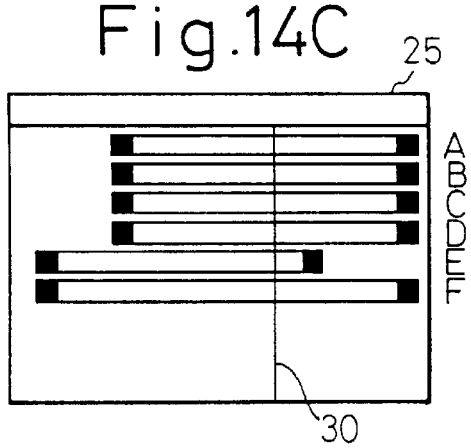
□ BIND POINT
→ REFERENCE
■ REFERENCING POINT
▲ POSITION CURSOR
→ CHANGE REFERENCE GRAPHIC
Fig.14C
Fig.14D  Fig.14E  Fig.14F
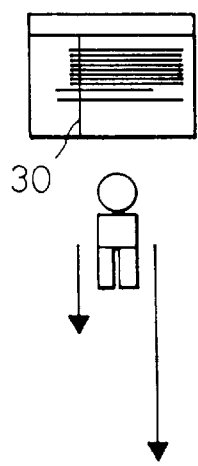
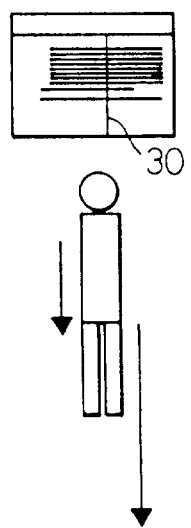
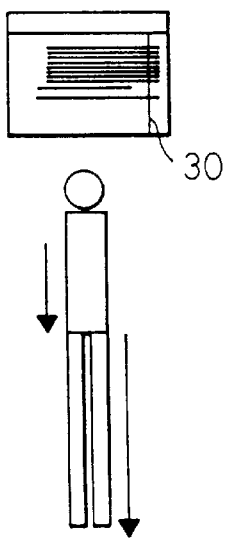

MOVEMENT

ROTATION

DEFORMATION (ENLARGEMENT)

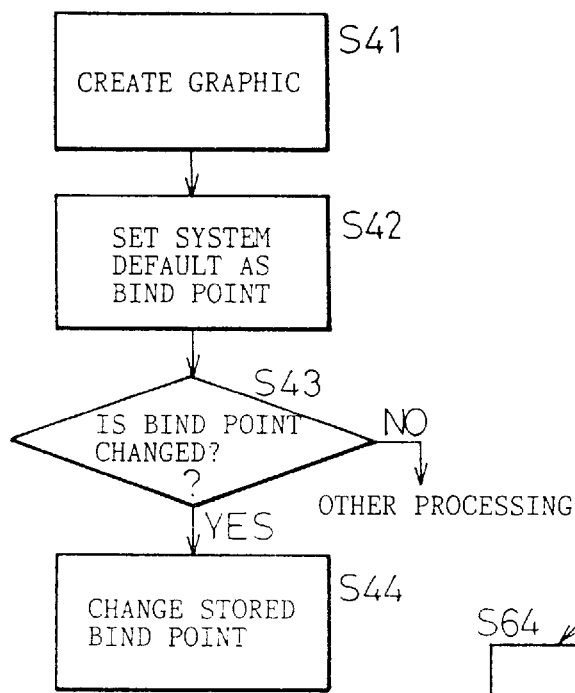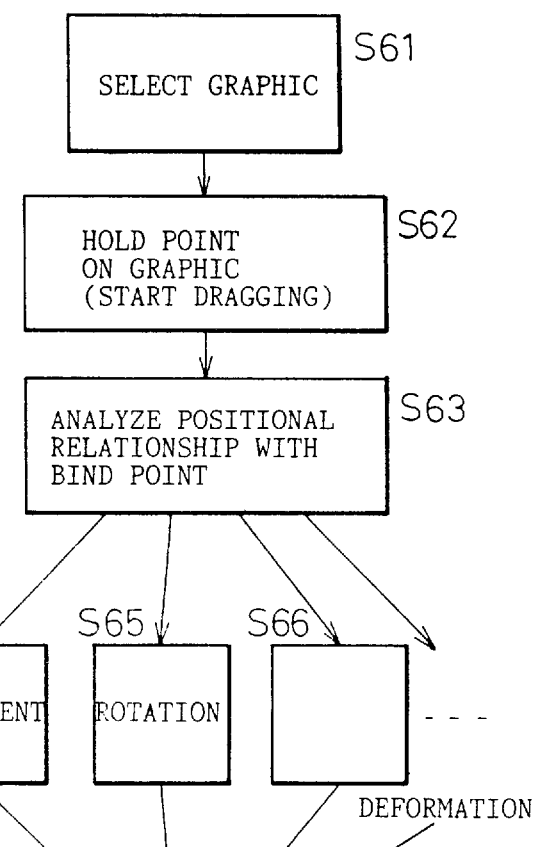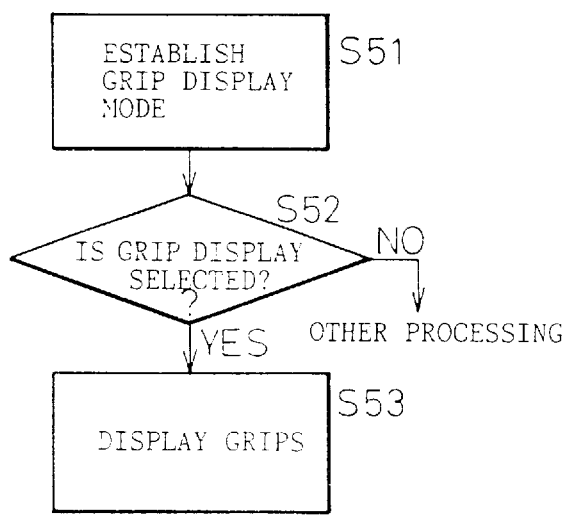

Fig. 38A
| | (a) | (b) | (c) | (d) |
|---|---|---|---|---|
| WHEN GRIPS ARE NOT REFERENCING POINTS | | | | |
| WHEN GRIPS ARE REFERENCING POINTS | | | | |
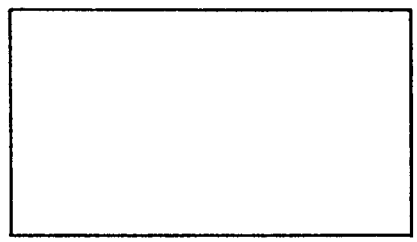
Fig. 38B
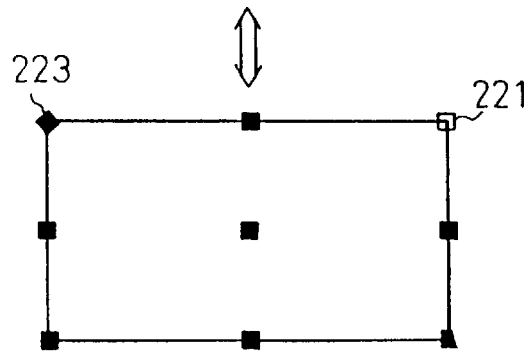
Fig. 38C

GRAPHIC EDITING APPARATUS AND METHOD

This application is a continuation, of application Ser. No. 08/562,262, filed Nov. 22, 1995, now abandoned, which is a continuation, of application Ser. No. 08/232,215, filed May 4, 1994, now abandoned filed as PCT/JP93/01303, Sep. 10, 1993.

CROSS-REFERENCE TO RELATED APPLICATIONS

The present application partly succeeds each of the disclosures concerning the subjects of Japanese Patent Application Nos. 4-241113, 4-241114, 4-241115, and 4-241116 filed on Sep. 10, 1992.

BACKGROUND OF THE INVENTION

1. Field of the Invention

The present invention relates to a graphic editing apparatus and method. More particularly, this invention is concerned with a graphic editing apparatus and a graphic editing method both for creating or editing graphics on a display unit using a computer, wherein a graphic can be easily changed in position, shape, or state and delineated in a screen on the display unit with the passage of time or the change in value of an attribute.

2. Description of the Related Art

In the past, a graphic processing system based on a computer has handled a moving graphic such as an animated image according to a method in which a position of a graphic on a display unit at each time in stant is described using a predetermined script or a method in which all the positions or shapes of a graphic at respective time instants are designated independently.

According to the former method, the relationships between the position of a graphic and the time instant must be expressed as equations and position change information must be designated. It is therefore hard to determine the relationships between the time instant and position of a graphic during creation or editing. In particular, creating or editing a plurality of varying graphics is very hard to do. It is also hard to designate finely-varying states. Especially, editing work for varying a plurality of graphics simultaneously is very complex because time instants that are turning points of variations must be consistent among graphics.

In a method in which all the shapes of a graphic varying time-sequentially are designated at respective time instants, a position and shape of a graphic must be delineated in every screen sent at each time instant (hereinafter, a frame). An enormous amount of labor is required for creation or editing. After creation or editing is completed, (1) when a graphic is to be moved more quickly or slowly, all frames must be re-edited. Thus, correction is hard to do. (2) When time instants at which graphics vary synchronously are to be modified, all graphics in frames concerned must be re-edited. Thus, correction is hard to do.

When a conventional method is adopted, it is hard to edit not only a graphic varying time-sequentially but also a graphic varying depending on the value of a certain attribute. For example, when water is poured into a guitar-shaped vase, the water level in the vase rises with an increase in an amount of water. The rate at which the water level rises depends on the cross-sectional area of the vase. Even when the amount of water increases constantly, the speed at which the water level rises is not constant. For editing a graphic varying depending on the value of an attribute or the amount of water, the water level had to be described with complex equations or the water level had to be changed frame by frame in the past.

Assuming that an image of a scenery of sunset is edited, the colors of mountains and trees differ before and after sunset. The changes in these graphics must be synchronized with one another. When the time instant of sunset is to be changed, re-editing is required to change the colors of the individual graphics time-sequentially. In prior arts, complex work is required to edit such graphics synchronously with the passage of time.

The graphic processing system based on a computer offers various editing facilities for moving a graphic to another position, stretching or shrinking the graphic in a particular direction, enlarging or reducing the graphic, and rotating the graphic after displaying the graphic created on a display unit.

In the past, when these editing facilities were employed, an editing operation had to be designated to indicate what kind of editing was to be performed by switching edit modes using an icon menu or a command and then all points required for the editing operation had to be designated.

For example, when a certain graphic is to be rotated, first, an operation of "rotation" must be selected. A point acting as a rotation center is then designated. Thereafter, an angle of rotation is entered. When a square graphic is to be deformed to produce a rectangle, the square is deleted, and then a rectangle is created newly. Alternatively, "stretch/shrink deformation" is selected, and then it is designated which portion should be stretched or shrunken to what extent in which direction.

After a graphic is rotated once, when editing the graphic is completed, if an attempt is made to execute the same rotation, the previous sequence including a step of designating a point serving as a center must be repeated.

In a conventional graphic editing sequence, various editing operations must be designated in advance, and then a graphic to be deformed and a magnitude of deformation must be specified. The sequence is complex and time-consuming.

In the graphic processing system based on a computer, a plurality of graphics created independently on the display unit must sometimes be correlated with one another and handled as a single graphic. This correlating is required, for example, when a graphic of a steering wheel of an automobile, a graphic of a body frame, a graphic of a saddle, a graphic of front wheels, and a graphic of rear wheels are created independently and combined together to compose a graphic of an automobile. The graphic of a steering wheel or body frame must be composed by combining graphics of parts.

In prior arts, when a plurality of graphics of parts are to be created with the locations of the parts held intact, the locations of the parts are placed in memory and divided into groups. A group is regarded as a single graphic. Deformation, rotation, or movement is executed relative to the whole of a group.

In the conventional methods, however, when it is required to deform a particular one of graphics belonging to a group, the group of graphics must be broken up to execute deformation. When a group is broken up, the positional relationships between the graphic and the other graphics are destroyed. During the deformation, an editor must deform or move the other graphics.

For example, when the graphics of a handle bar and a body frame of a bicycle are correlated and grouped, these graphics are handled as a united graphic. It is therefore impossible to enlarge or reduce the handle bar alone. Enlargement or reduction cannot help involving the body frame. For enlarging the handle bar alone, the grouping of the handle bar and body frame is dissolved temporarily, and then the handle bar alone is enlarged. Thereafter, the position of the enlarged handle bar relative to that of the body frame is determined, and then the enlarged handle bar and body frame must be grouped again.

SUMMARY OF THE INVENTION

An object of the present invention is to solve the aforesaid problems and provide a means for readily creating or editing a graphic varying with the passage of time or the change in value of an attribute.

In particular, the present invention is intended to enable automatic movement, deformation, and change in state of a graphic, of which position, shape, and state such as color or brightness changes with the passage of time or the change in value of an attribute, merely by defining associative relationships on a time base or an attribute base.

Another object of the present invention is to provide an editing apparatus that when a plurality of graphics whose positions, shapes, and states vary synchronously are to be edited, maintains the synchronism among the graphics while handling the time-sequential changes independently and edits the plurality of synchonously-varying graphics readily.

Yet another object of the present invention is to provide an apparatus capable of executing various editing operations directly for a graphic without switching edit modes.

Still another object of the present invention is to enable handling of a group of graphics having a certain association as a united part with the locations of the graphics held intact and to permit automatic editing of connected graphics according to a relating mode without causing discrepancy merely by editing the related graphics individually.

According to the first aspect of the present invention, a graphic editing apparatus having a display unit for displaying graphics, a position designating unit for use in designating positions in a display screen, and a processing unit for creating or editing graphics, comprises: a graphic displaying means for displaying a graphic in a graphic display area formed in a screen on the display unit; a time displaying means for displaying a time display graphic on a time base in a time display area formed in a screen on the display unit; a change information setting means for creating or editing a change reference graphic, which serves as a reference for moving or deforming a graphic time-sequentially, according to information entered at the position designating unit, and then specifying in graphic information the information on the association of some points on the change reference graphic with some points on the time display graphic; and a display updating means for performing interpolation to calculate the position of a point on the change reference graphic with the movement of a point representing a current time instant on the time display graphic or the passage of time, executing editing of moving or deforming the graphic according to the calculated position of the point, and thus updating the display screen of the graphic. Herein, a graphic varies time-sequentially.

In the aspect of the present invention described in claim 1, a time display graphic for indicating time instants at which the position of a graphic in a graphic display area is changed is displayed in a time display area independent of the graphic display area. The change in position of a graphic can therefore be controlled readily using the time display graphic through a change reference graphic. Specifically, when a time cursor representing a current time instant is moved in the time display area, a position cursor on the change reference graphic can be moved in the graphic display area.

The trajectory of the moving position cursor can be defined in the change reference graphic, which obviates the necessity of editing a graphic at every time instant. The speed of the moving position cursor can be controlled by adjusting the speed at which the time cursor moves in the time display graphic or a space between adjacent points in the time display graphic which are associated with points in the change reference graphic.

After the change information setting means specifies the information on the association of the time display area with the change reference graphic, the change reference graphic and time display area need not be displayed. By designating a current time instant using the position designating unit or an application program, only a graphic associated with the time instant can be displayed without displaying the change reference graphic and time display area.

According to another aspect of the present invention, a graphic editing apparatus having a display unit (11) for displaying graphics, a position designating unit (12) for use in designating positions in a display screen, and a processing unit (10) for creating or editing graphics, comprises: a graphic displaying means (17) for displaying a graphic in a graphic display area (24); an attribute value displaying means for displaying an attribute value display graphic on a predetermined attribute base in an attribute value display area formed in a screen of the display unit (11); a change information setting means (19) for creating or editing a change reference graphic (27), which serves as a reference for moving or deforming a graphic with the change in value of an attribute, in the graphic display area (24) according to information entered at the position designating unit (12), and specifying in graphic information the information on the association of some points on the change reference graphic (27) with some points on the attribute value display graphic; and a display updating means for performing interpolation to calculate the position of a point on the change reference graphic (27) with the movement of a point representing a current attribute value in the attribute value display graphic or the change in value of a designated attribute, executing editing of moving or deforming the graphic according to the position of the point, and thus updating the display screen of the graphic. Herein, a graphic varies depending on an attribute value.

In yet another aspect of the present invention, a graphic editing apparatus having a display unit (11) for displaying graphics, a position designating unit (12) for use in designating positions in a display screen, and a processing unit (10) for creating or editing graphics, comprises: a graphic displaying means (17) for displaying change reference graphics (27), which serve as references for changing positions or shapes of graphics, in a graphic display area (24) formed in a screen of the display unit (11); a time displaying means (18) for displaying time display graphics (28) on a time base in a time display area (25) formed in a screen on the display unit (11) in association with the change reference graphics (27); a graphic information memory (13) for storing information on the association of points representing time instants on the time display graphics (28) with points representing positions on the change reference graphics (27); a change information setting means (19) that when some points on each of the change reference graphics (27) serving as references for changing positions or shapes of graphics with the passage of time are entered in the graphic display area (24) at the position designating unit (12), specifies in graphic information the information on the association of some points on each of the change reference graphics (27) with some points on each of the time display graphics (28); a display updating means (20) for performing interpolation to calculate the positions of points on the change reference graphics (27), which are associated with points representing a current time instant on the time display graphics (28), with the movement of the points representing a current time instant on the change reference graphics (27) or the passage of a designated time interval, changing the positions or shapes of the graphics according to the positions of the points, and thus updating the display screen of the graphics; and a time display editing means (21) for relating some points in one time display graphic (28) with those in other time display graphic (28), and editing the time display graphics (28) so that a related point moves with the movement of one point. Herein, the graphic editing apparatus edits graphics synchronously.

In another aspect of the present invention, a graphic editing apparatus having a display unit (11) for displaying graphics, a position designating unit (12) for use in designating positions in a display screen, and a processing unit for creating or editing graphics, comprises: a graphic information memory (13) in which one point or a plurality of points on a graphic plotted with a set of points are specified as a bind point or bind points in graphic information; a bind point setting means (16) for defining one point or a plurality of points on a graphic to be edited as a bind point or bind points, and specifying the bind point or points in graphic information; and a graphic handling means (17) for effecting graphic deformation according to the positional relationship between a point on a graphic designated using the position designating unit (12) during graphic editing and a predefined bind point on the graphic, and thus updating the graphic. Herein, the graphic editing apparatus is of a bind point type.

In yet another aspect of the present invention, a graphic editing method implemented in a graphic editing apparatus having a display unit (11) for use in displaying graphics, a position designating unit (12) for use in designating positions in a display screen, and a processing unit (10) for creating or editing graphics, comprises: a process in which a point or a plurality of points on a graphic to be edited are defined as a bind point or bind points and specified in graphic information; a process in which a point on a graphic designated using the position designating unit (12) during graphic editing is held intact and moved to a designated position; and a process in which when the designated point is a bind point, the graphic is moved together with the designated point, when the designated point lies on a predetermined side of the graphic, the graphic is rotated with the bind point as a center toward the position of the designated point, when the designated point neither coincides with a bind point nor lies on the predetermined side, the graphic is deformed toward the designated point according to the positional relationship between the point and bind point. Herein, the graphic editing method is of a bind point type.

In still another aspect of the present invention, an editing method implemented in a graphic editing apparatus having a display unit (11) for displaying graphics, a position designating unit (12) for use in designating positions in a display screen, and a processing unit (10) for creating or editing graphics, comprises: a process in which a command is entered at the position designating unit (12) to establish a referencing-referenced relationship between a shape determination point for determining a shape of a graphic and any other point on the graphic; a process in which a relationship between a referencing point (21) and a referenced point (22) is specified in graphic information in response to the related command; and a process in which when the graphic (20A) including the referenced point (22) is moved or deformed, the referencing point (21) that references the referenced point (22) is moved in harmony with the referenced point (22) so as to move or deform a graphic (20B) having the referencing point (21). Herein, the editing method is based on graphic relationship.

In still another aspect of the present invention, a graphic editing apparatus having a display unit (11) for use in displaying graphics, a position designating unit (12) for use in designating positions in a display screen, and a processing unit (10) for creating or editing graphics, comprises: a graphic information memory (13) for storing information concerning shape determination points for determining a shape of a graphic and a referenced point (22) that is referenced by other points in the graphic; a relating means (17) for establishing a referencing-referenced relationship between any of the shape determination points for determining the shape of the graphic and any other point on the graphic according to the information entered at the position designating unit (12), and specifying a relationship between a referencing point (21) and the referenced point (22) in graphic information; and a graphic handling means (18) that when a graphic (20A) having the referenced point (22) is moved or deformed, moves the referencing point (21), which references the referenced point (22), in harmony with the referenced point (22), and thus performs editing of moving or deforming a graphic (20B) having the referencing point (21). Herein, the graphic editing apparatus is based on graphic relating.

The present invention has other objects, features, and advantages that will be fully apparent from the detailed description made in conjunction with the appended drawings.

BRIEF DESCRIPTION OF THE DRAWINGS

FIGS. 3A to 6E show examples of editing processes in the first embodiment;

Figure 2A:
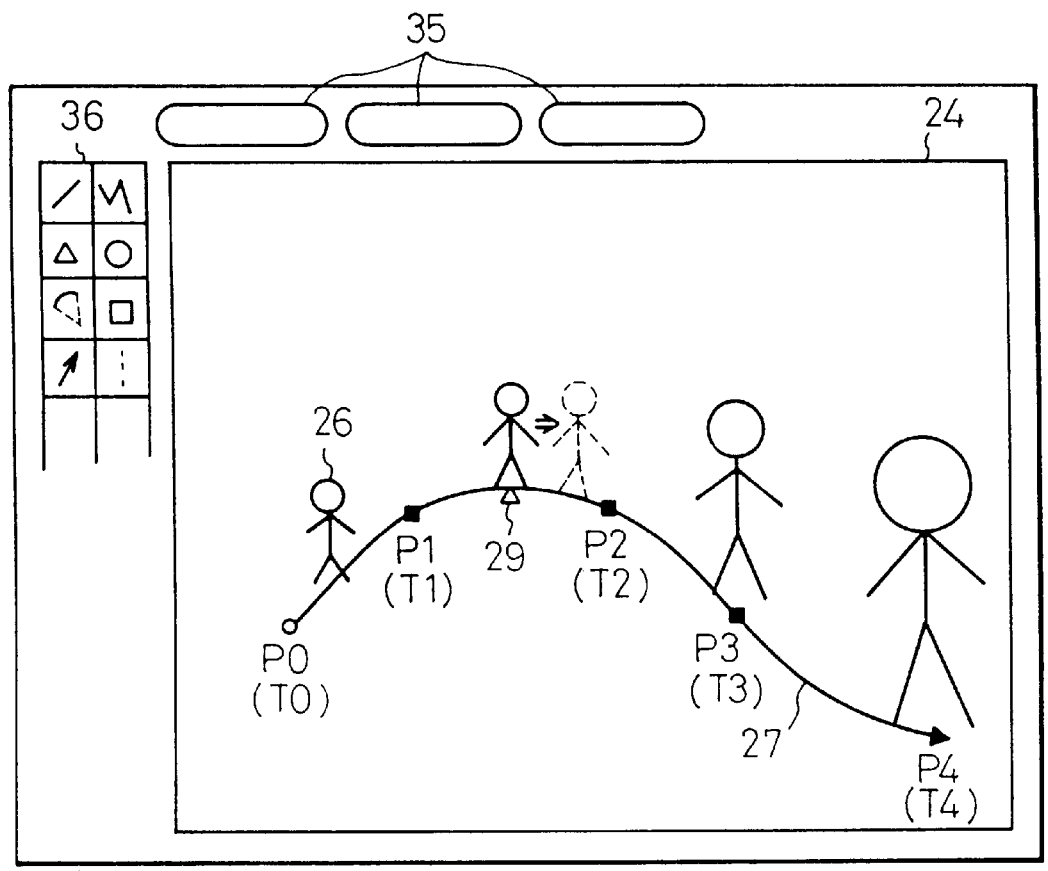
FIGS. 2A and 2B are explanatory diagrams showing a specific embodiment of the present invention.
Figure 8A:
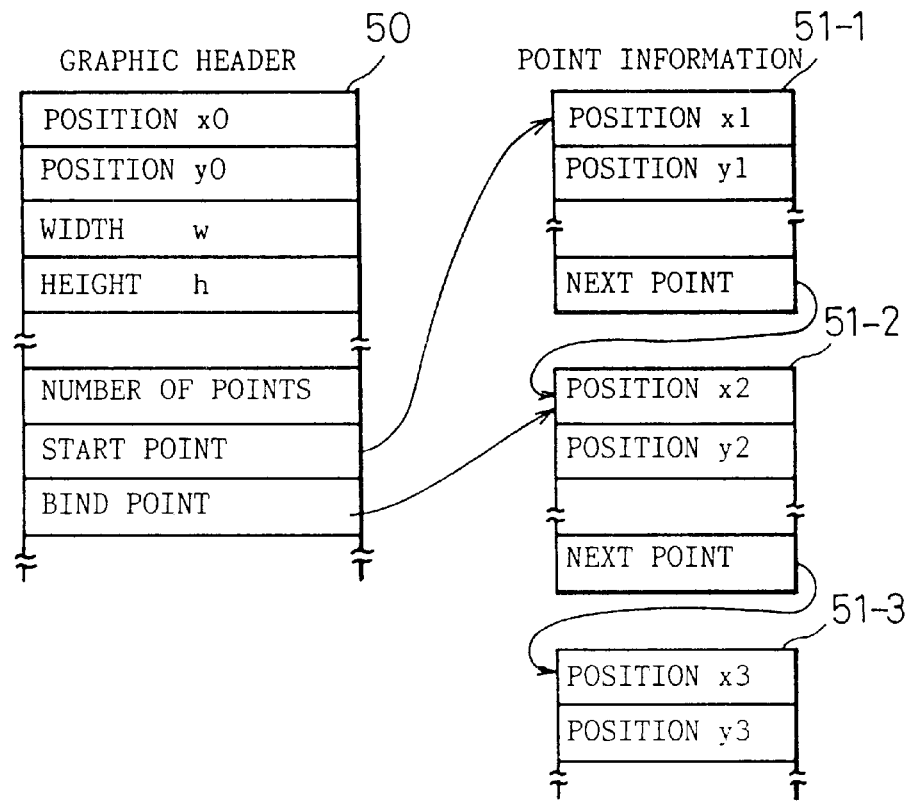
Figure 8B:
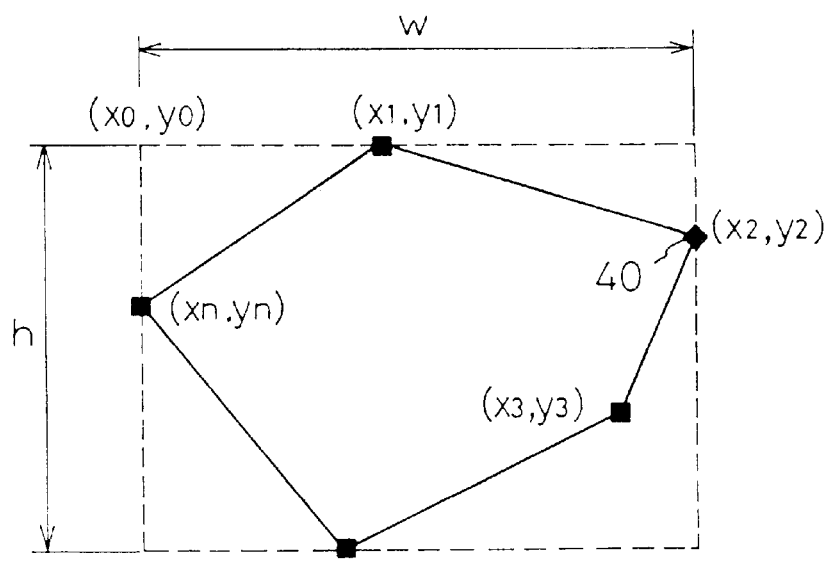
Figure 9:
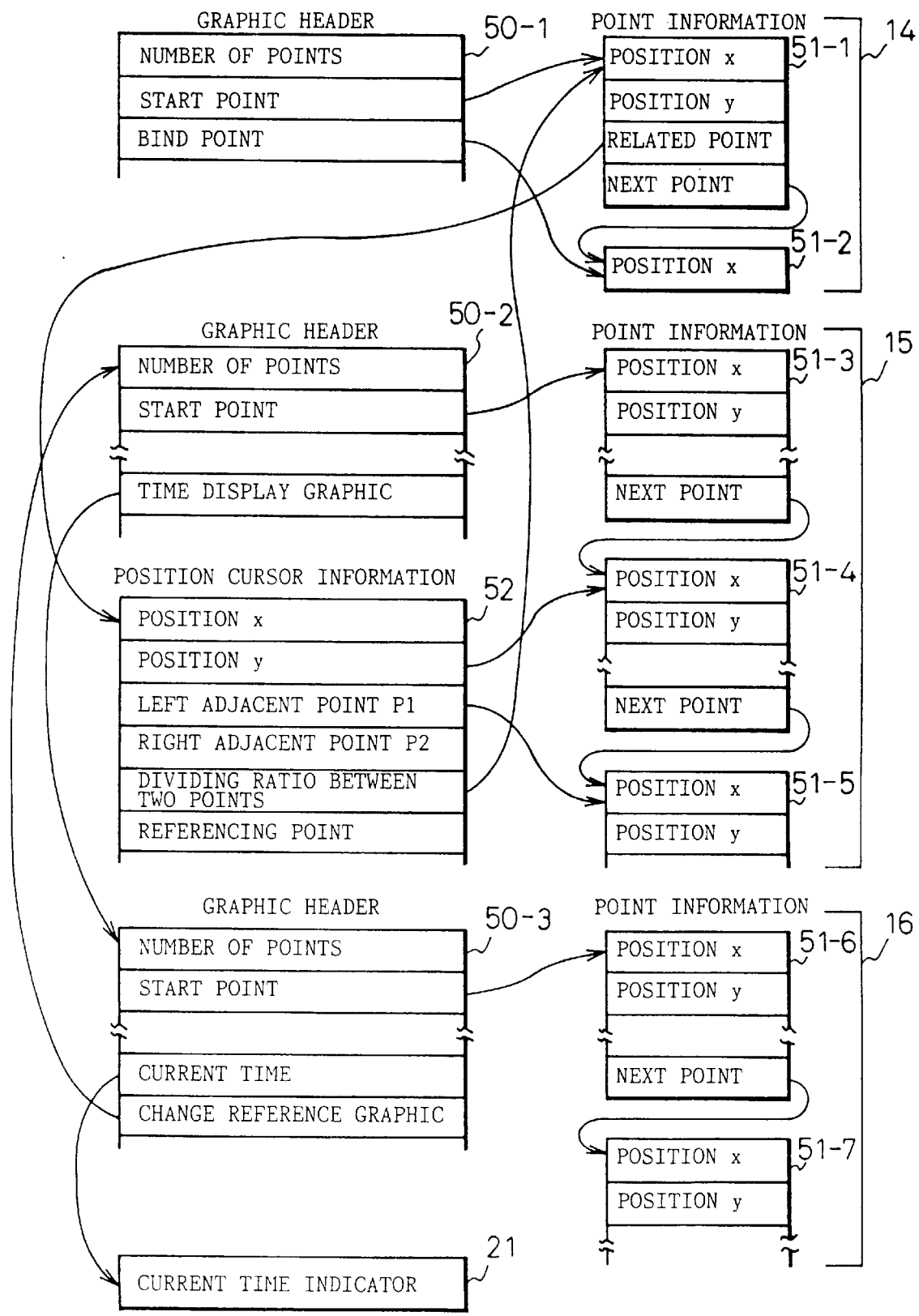
Figure 10:
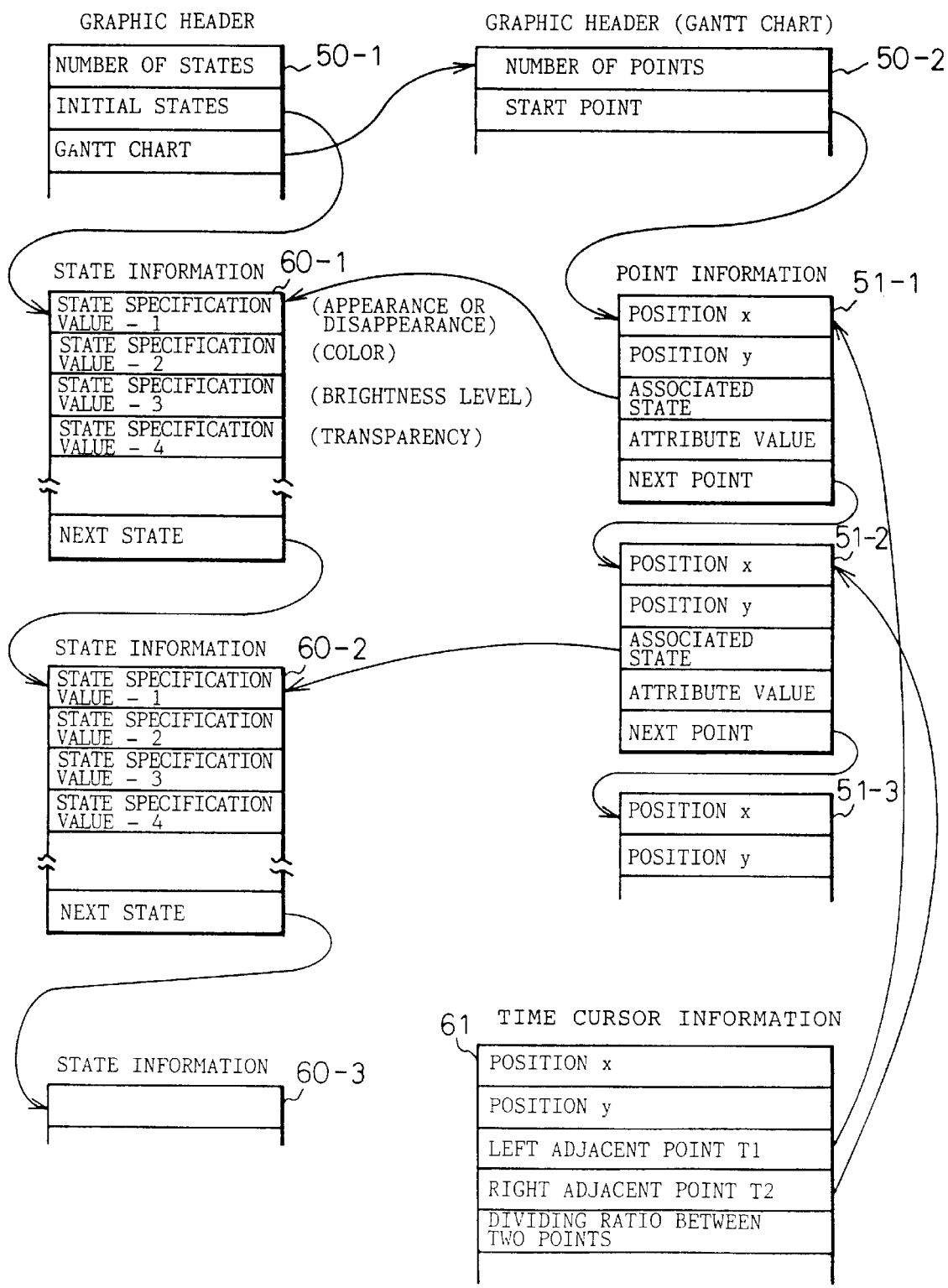
Figure 11A:
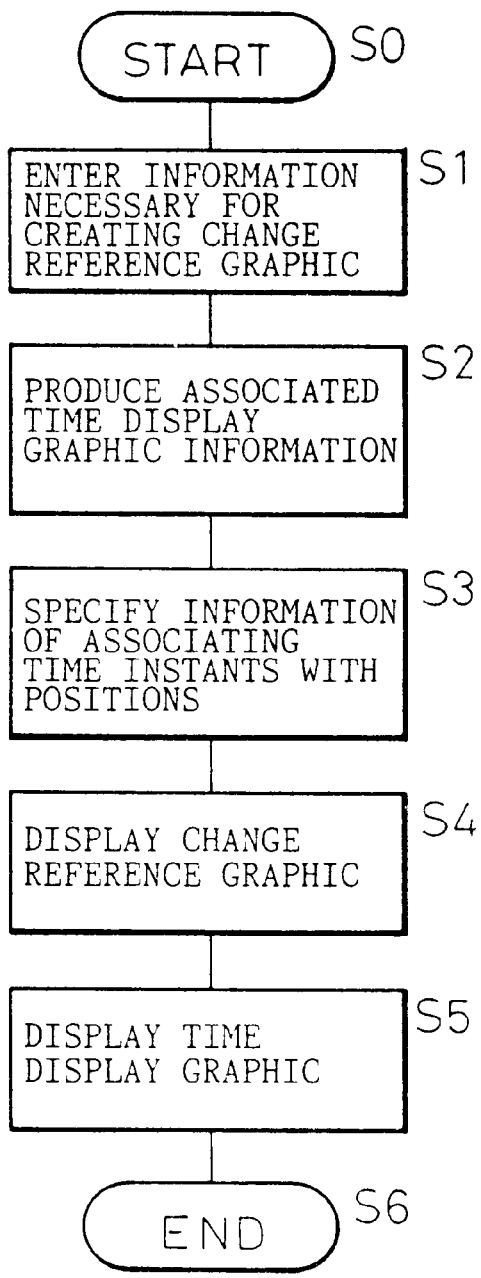
Figure 11B:
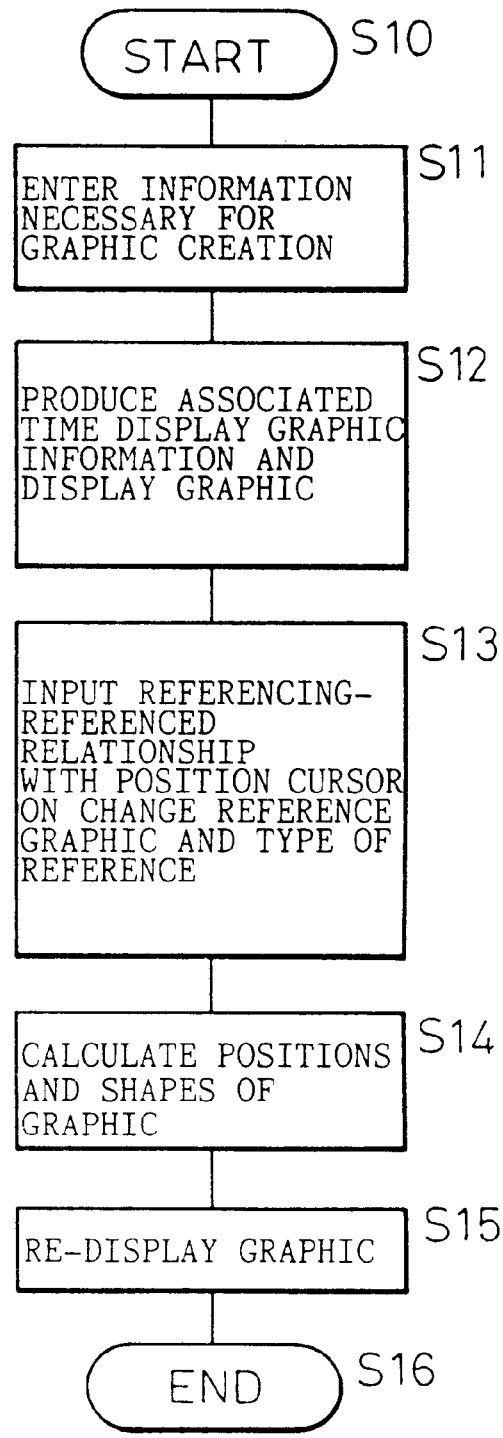
Figure 12:
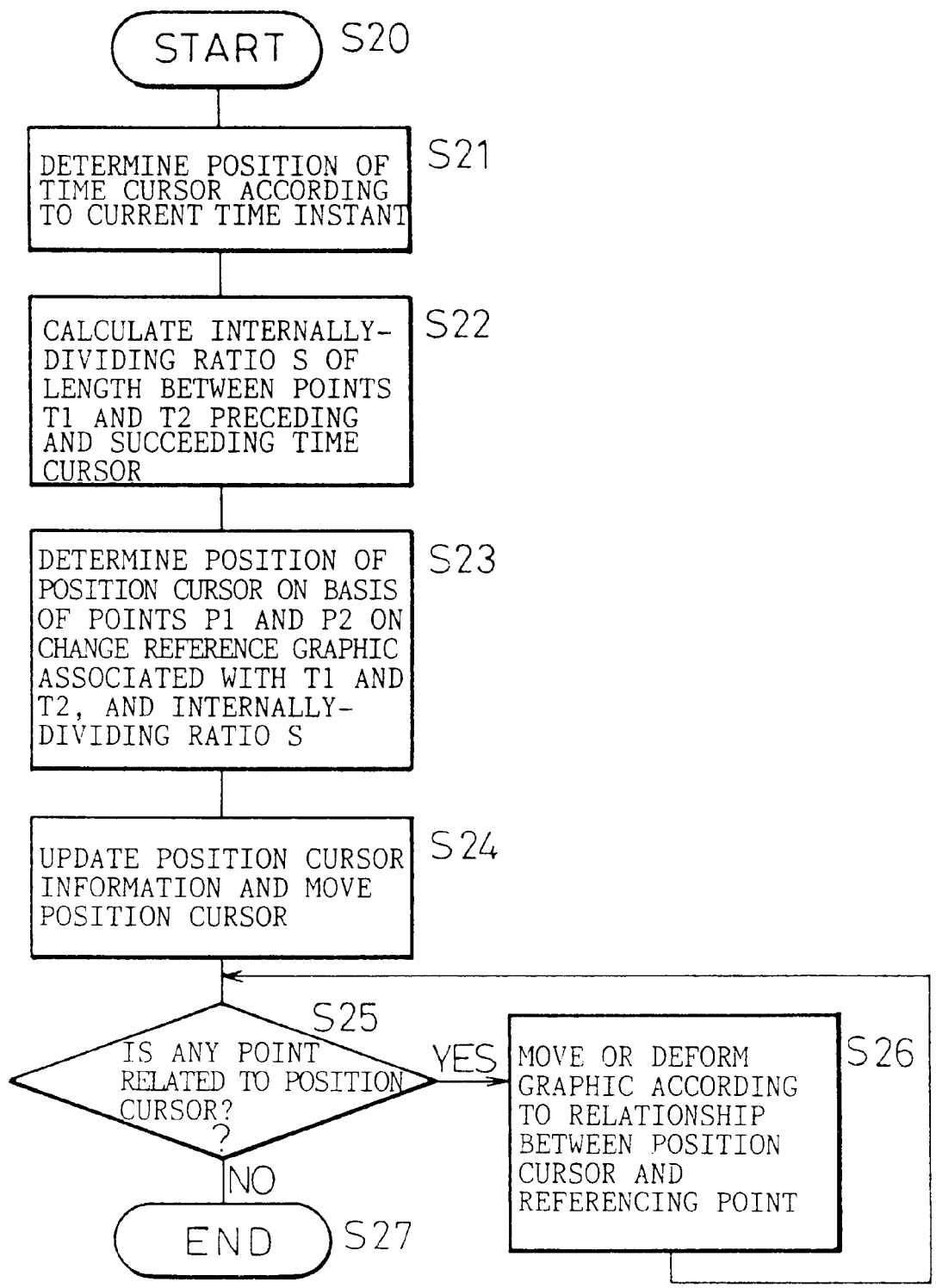
Figure 13:
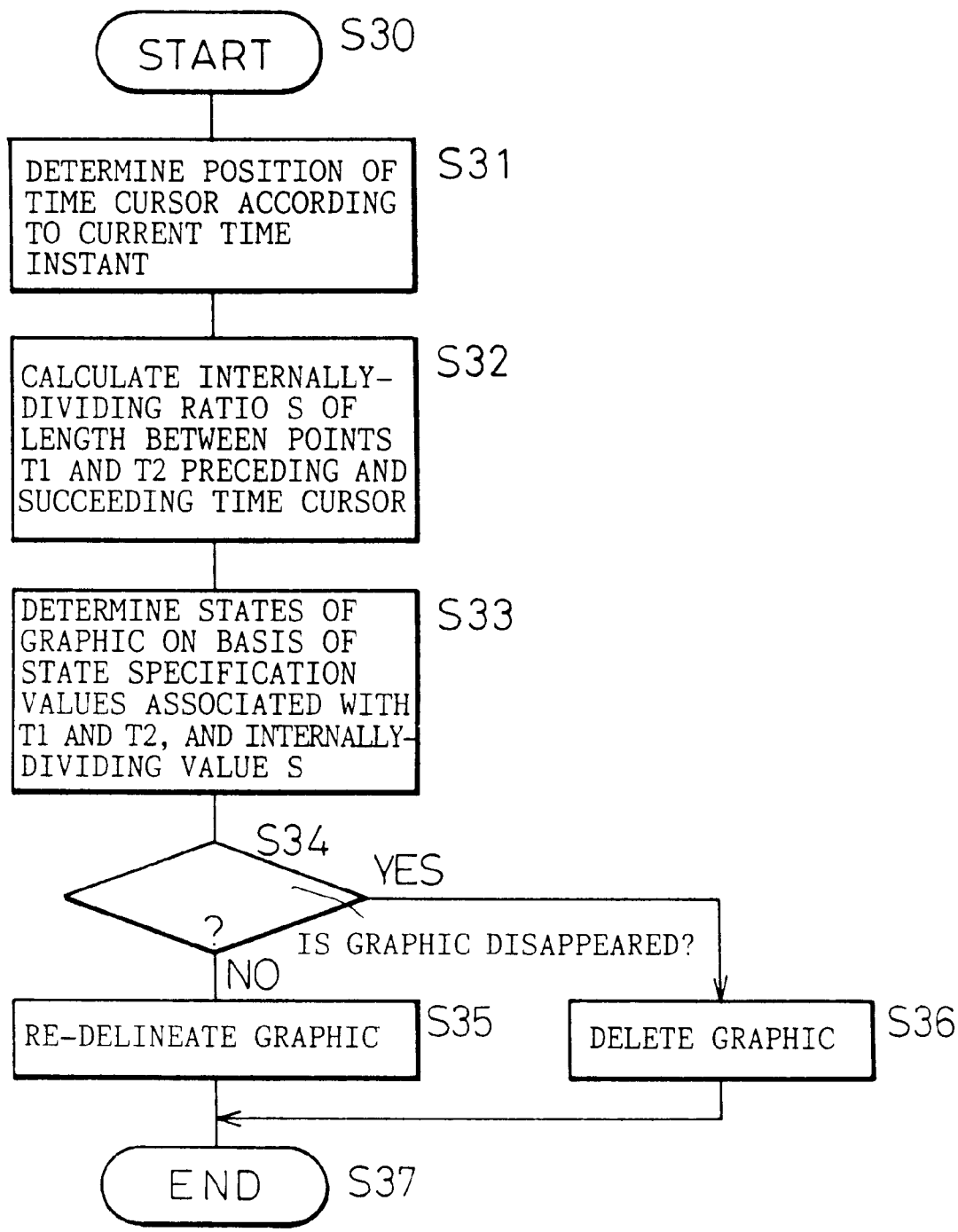
Figure 15:
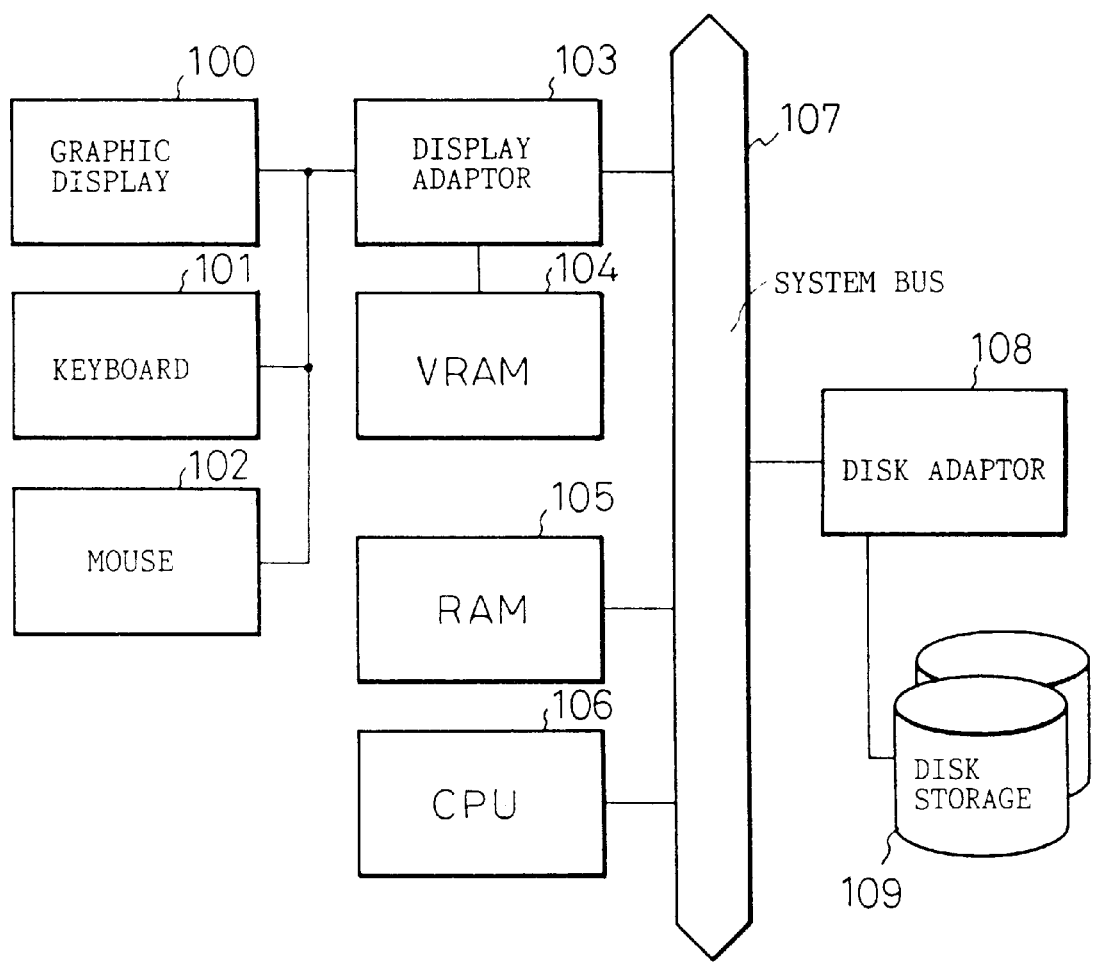
Figure 16:
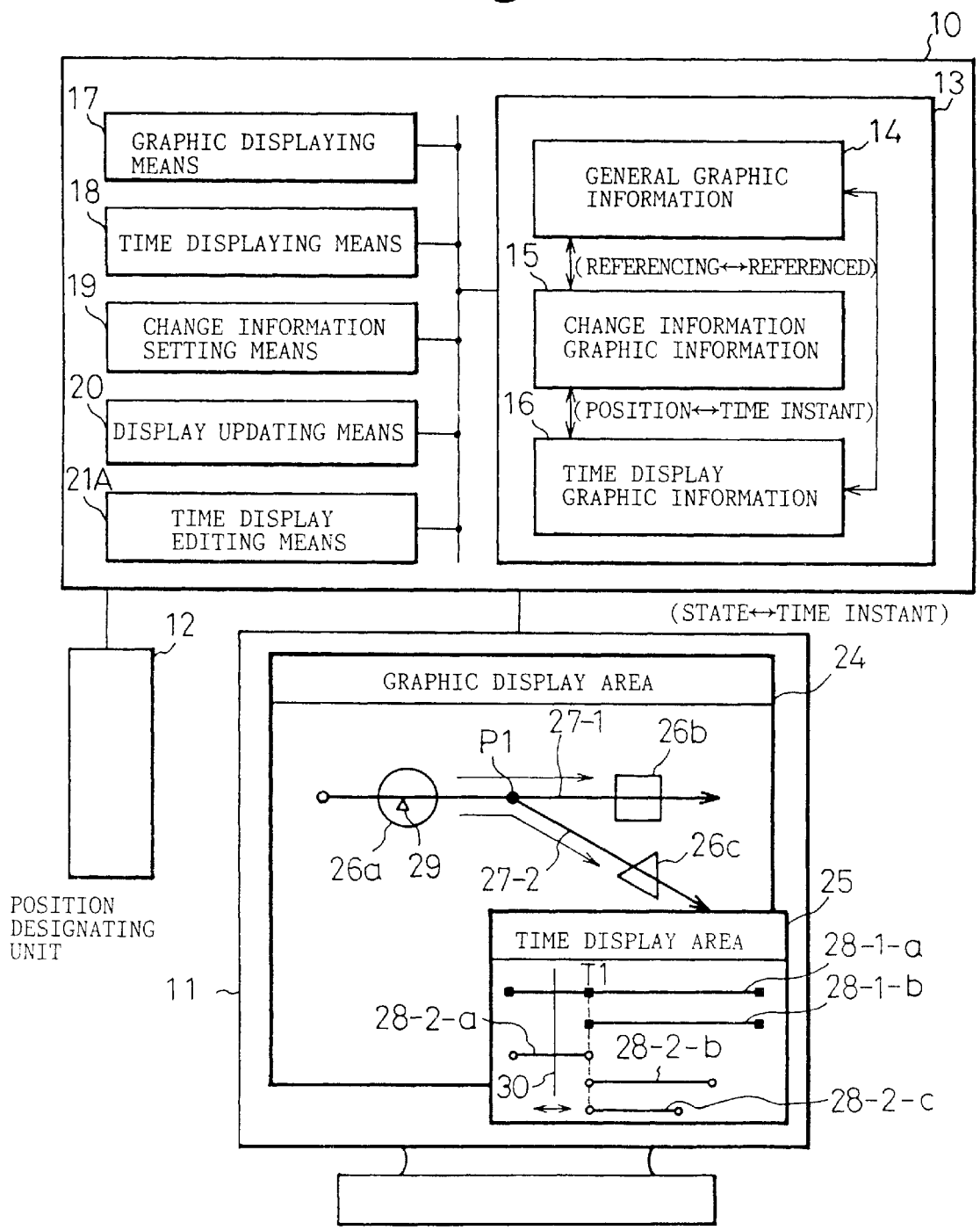
Figure 24:
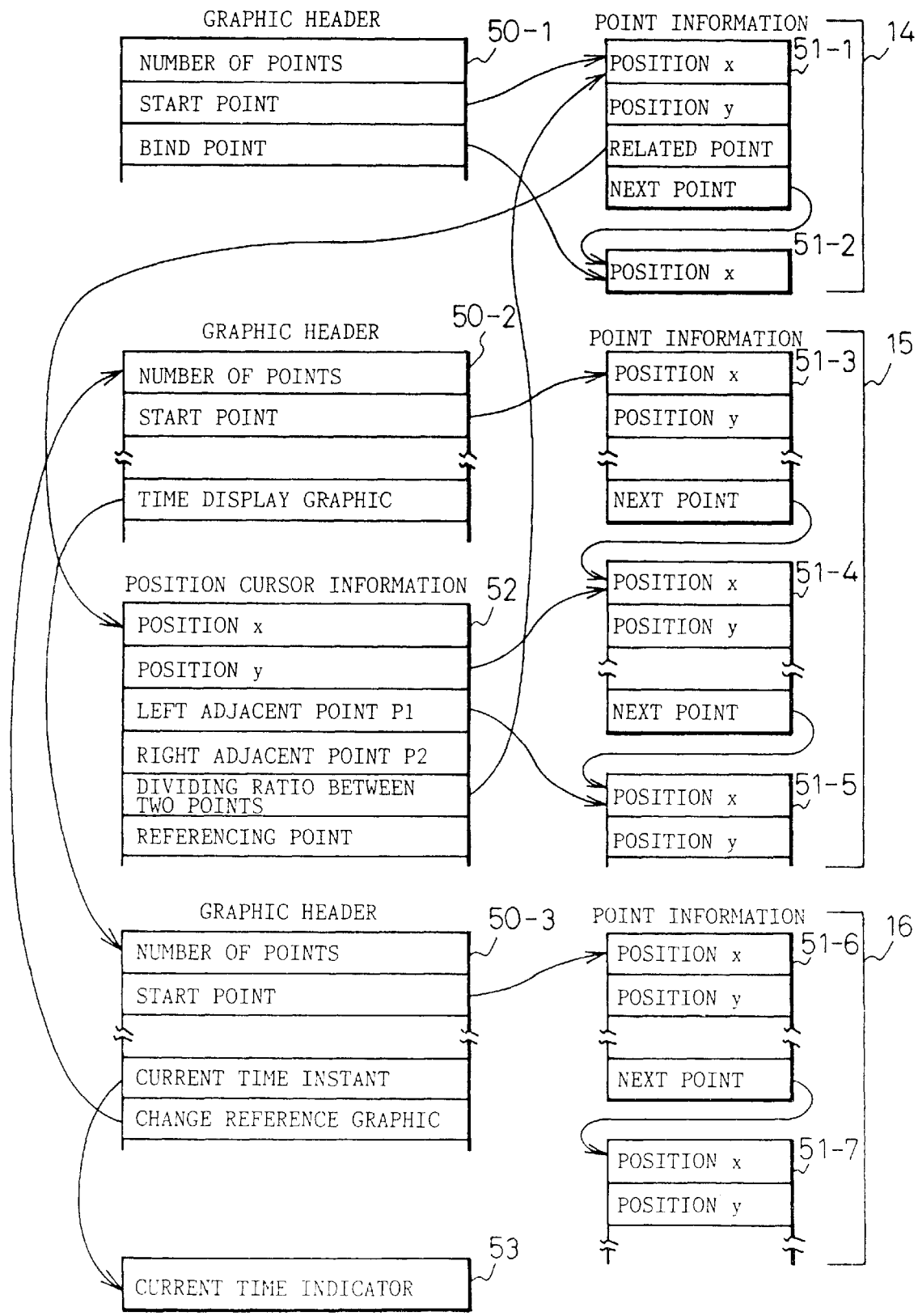
Figure 25A:
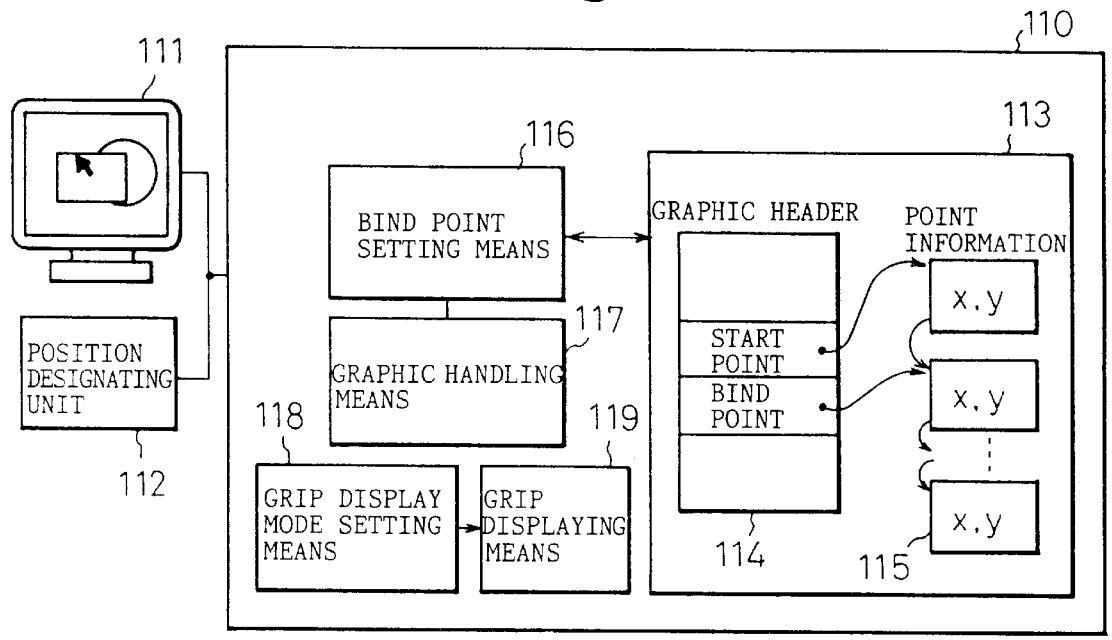
Figures 1, 25B:
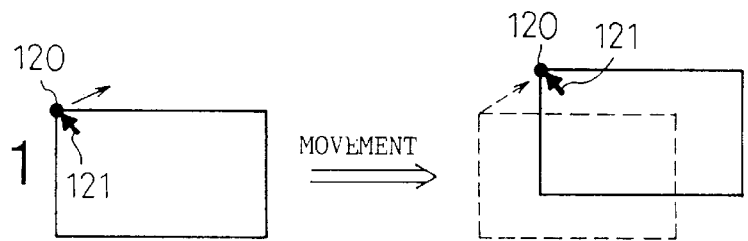
FIG. 1 is an explanatory diagram showing the principle of operation of the first embodiment of the present invention.
Figure 26A:
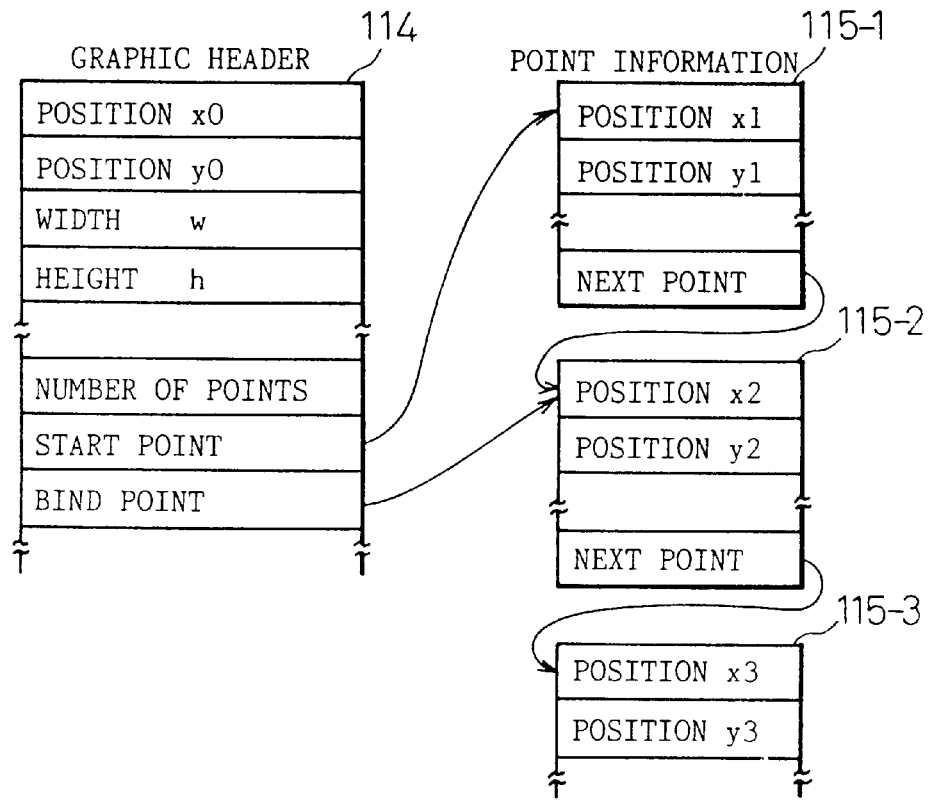
Figure 26B:
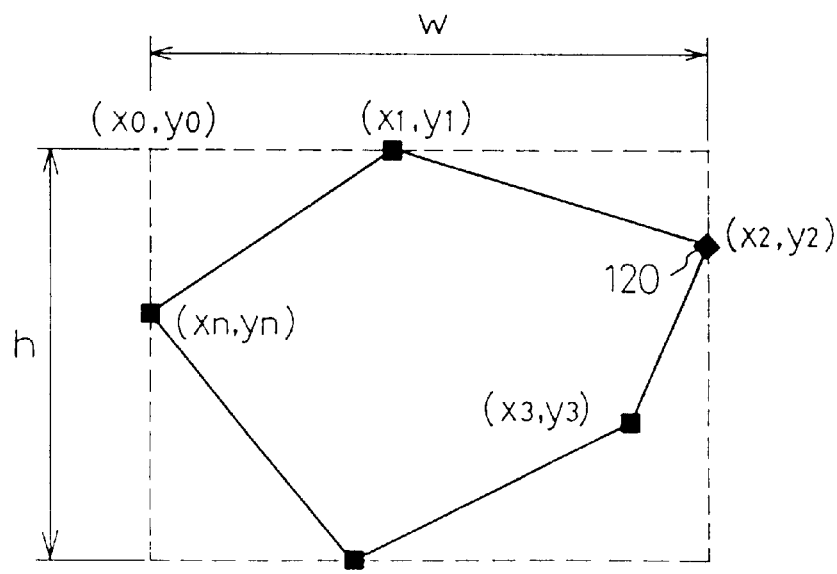
Figures 1, 28A:
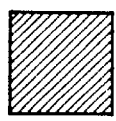
Figures 3, 28A:
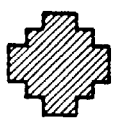
Figures 2, 28A:
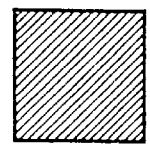
Figures 4, 28A:
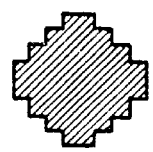
Figure 28B:
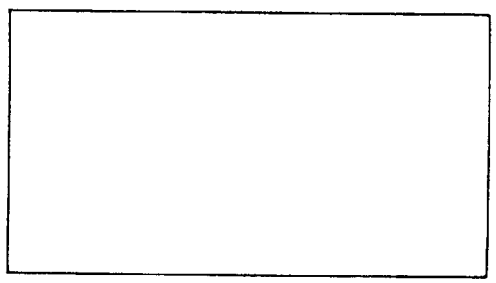
Figure 28C:
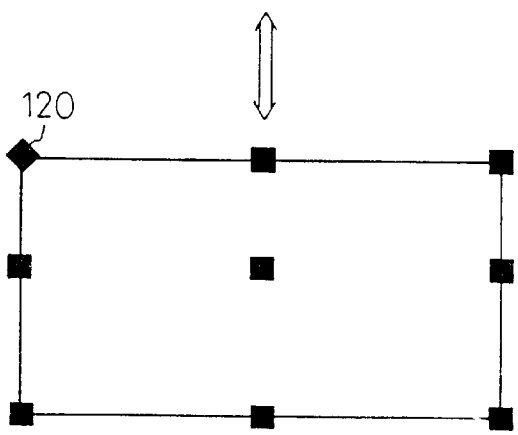
Figure 30:
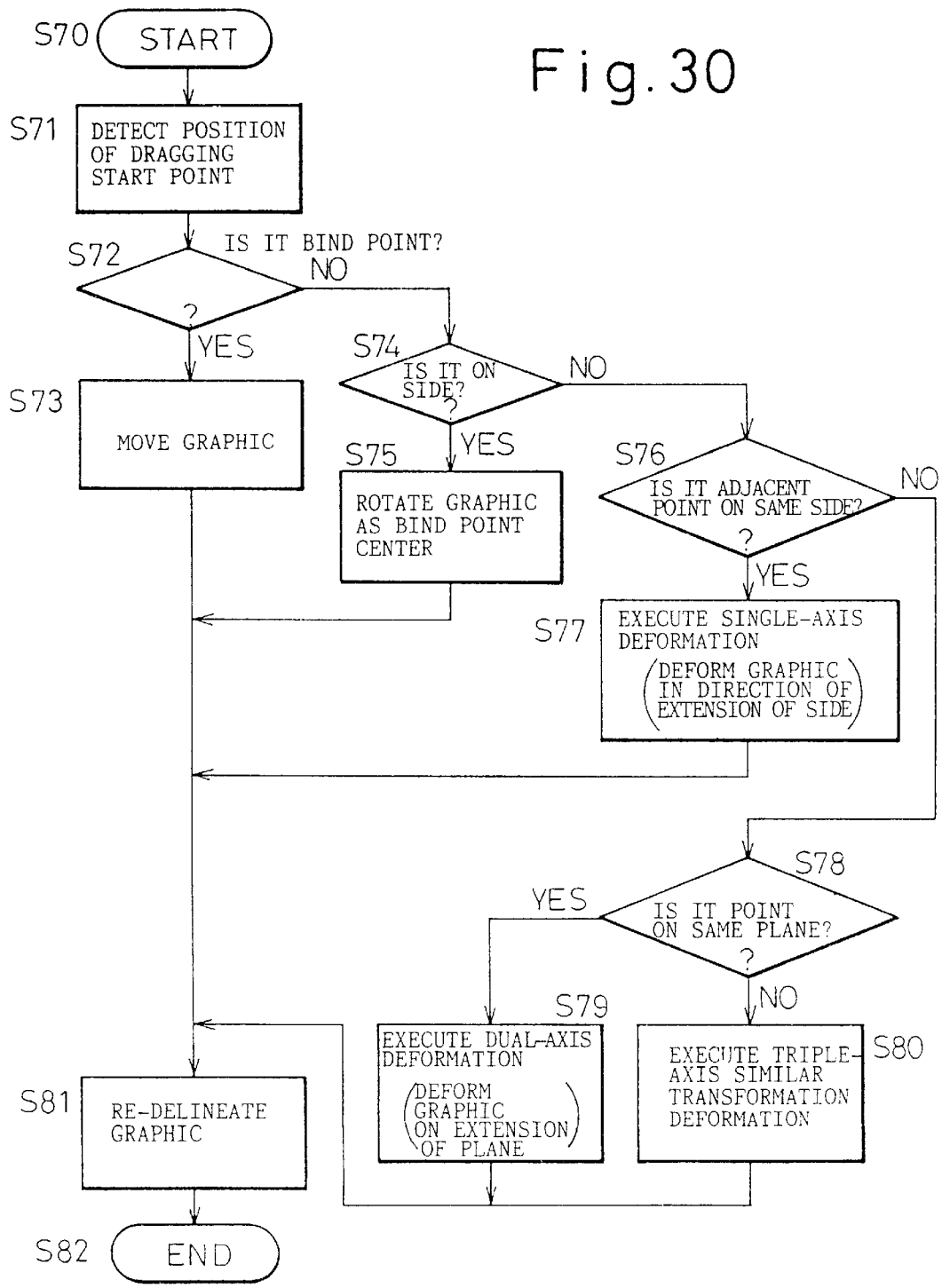
Figure 31A:
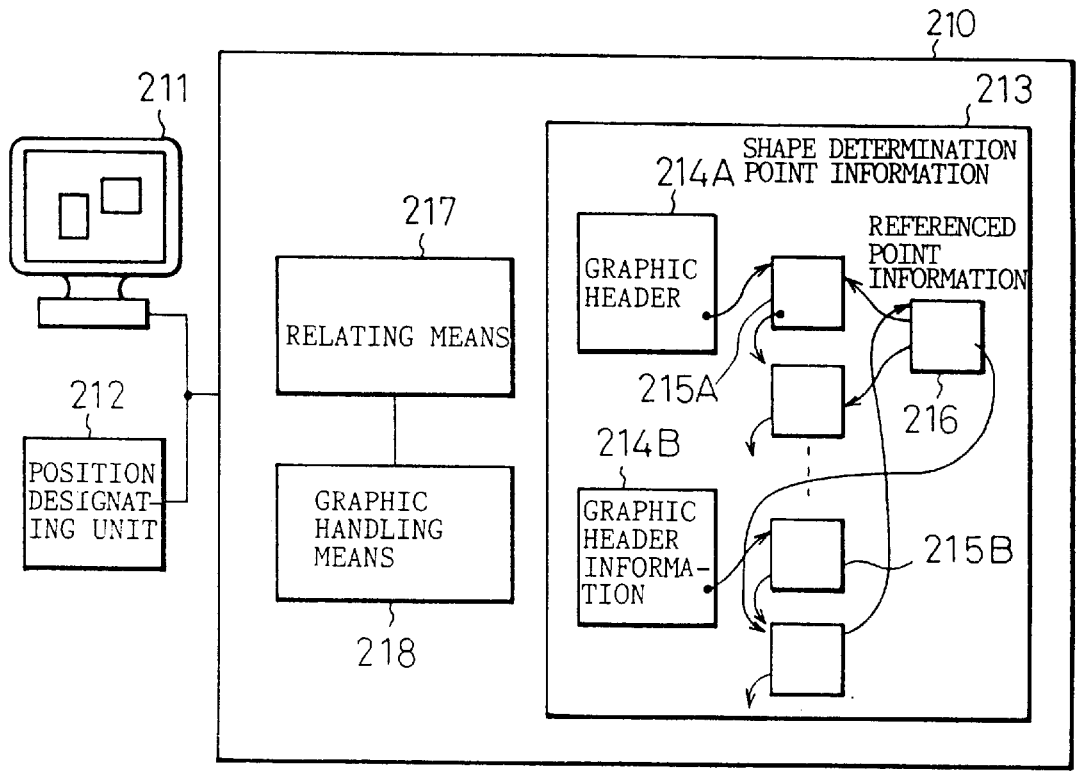
Figure 31B:
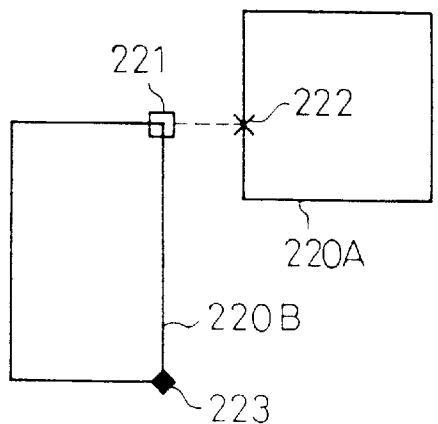
Figure 31C:
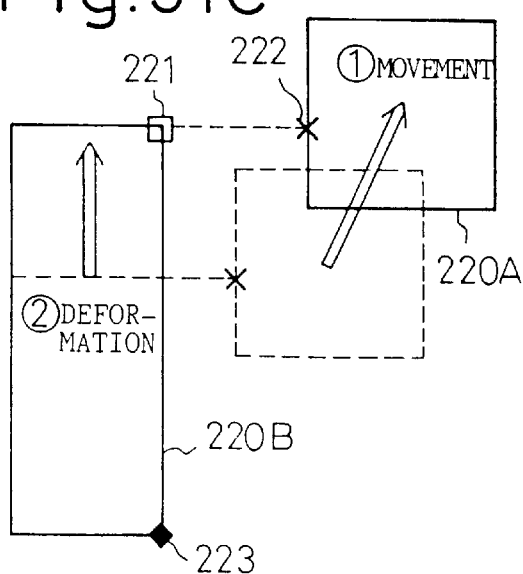
Figure 32A:
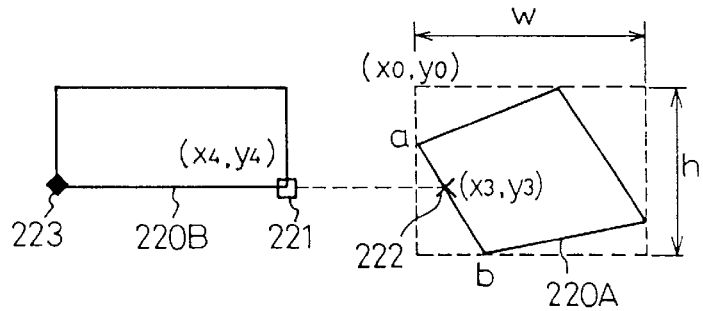
Figure 32B:
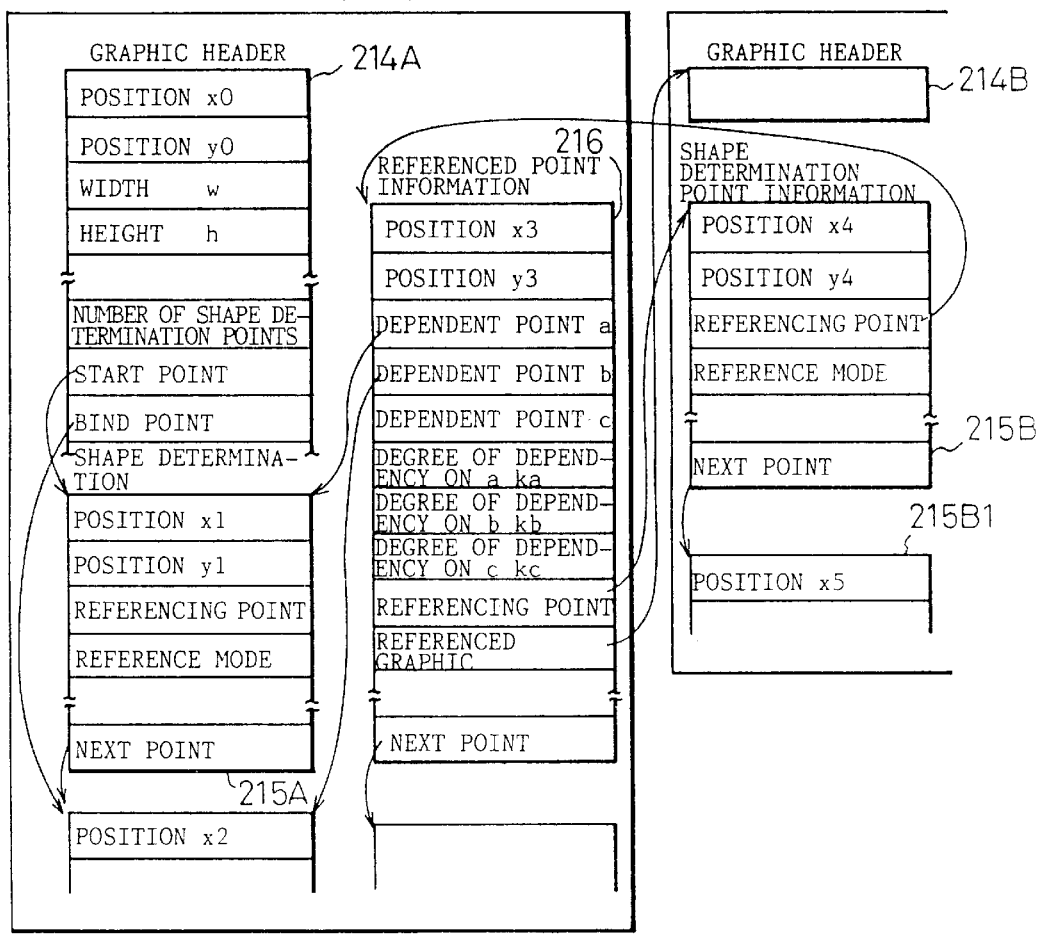
Figure 32C:
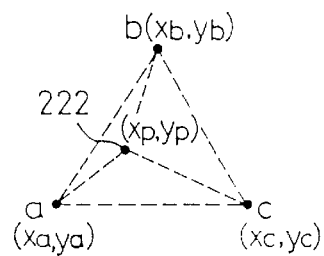
Figure 35A:
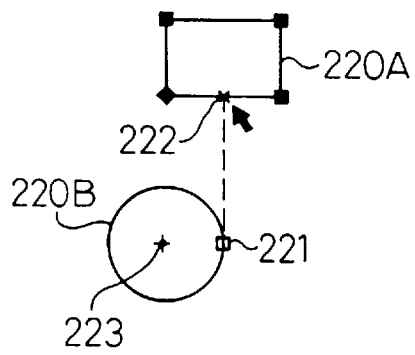
Figure 35B:
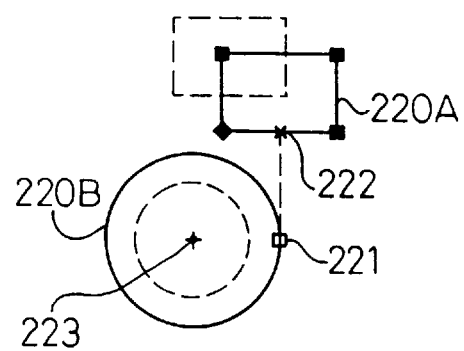
Figure 36A:
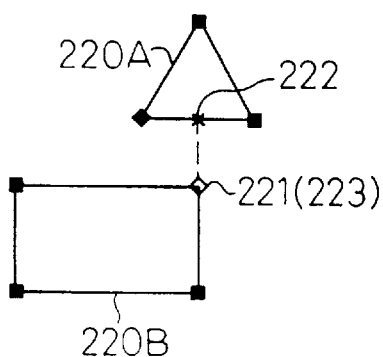
Figure 36B:
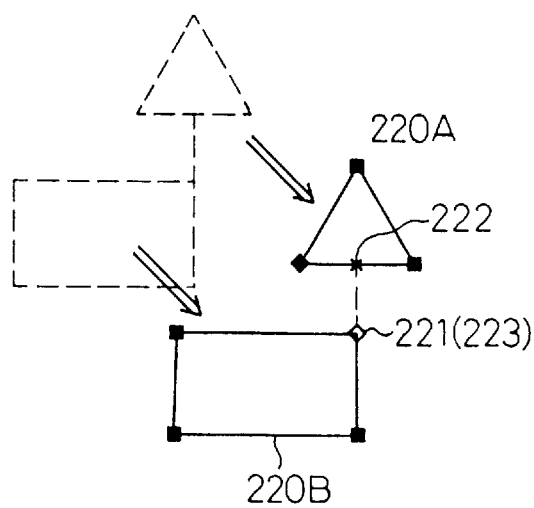
Figure 39:
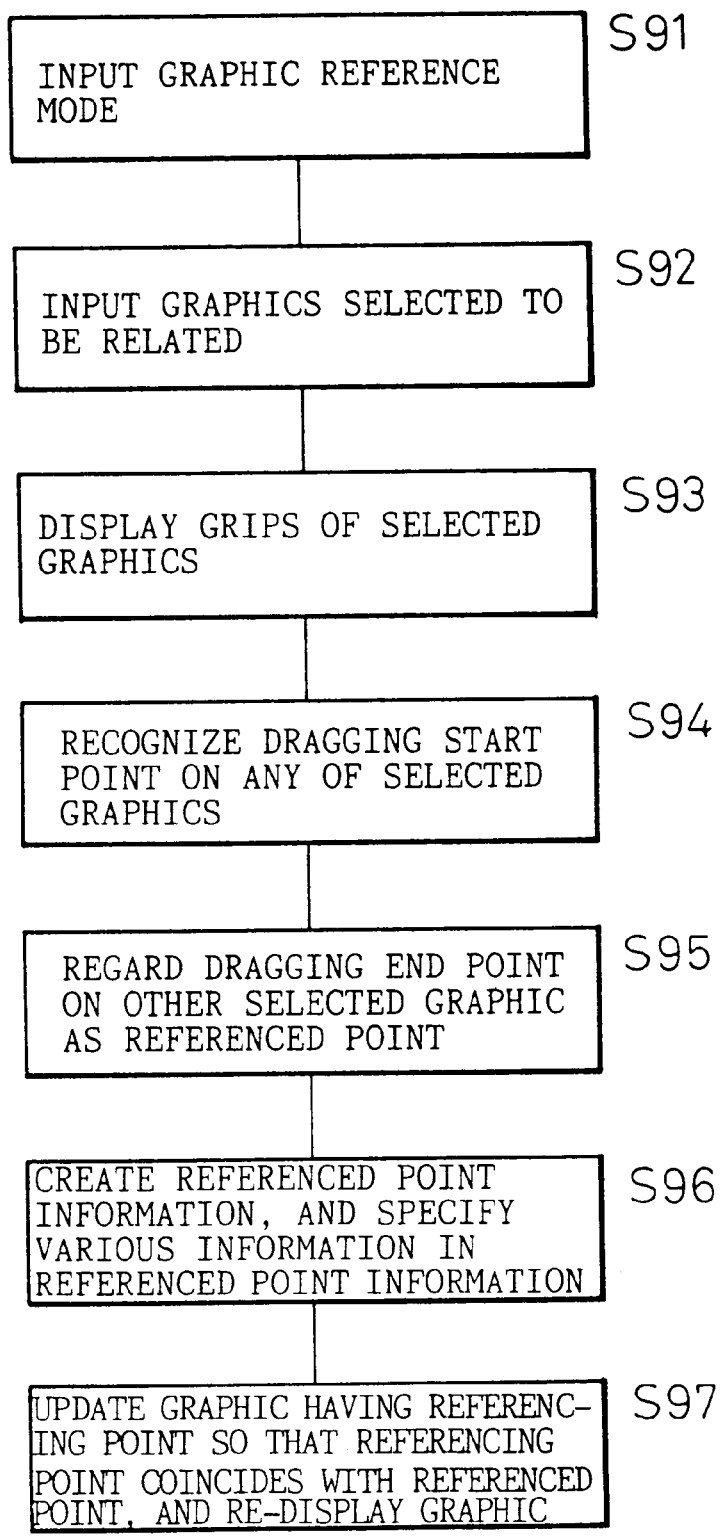
Figure 40:
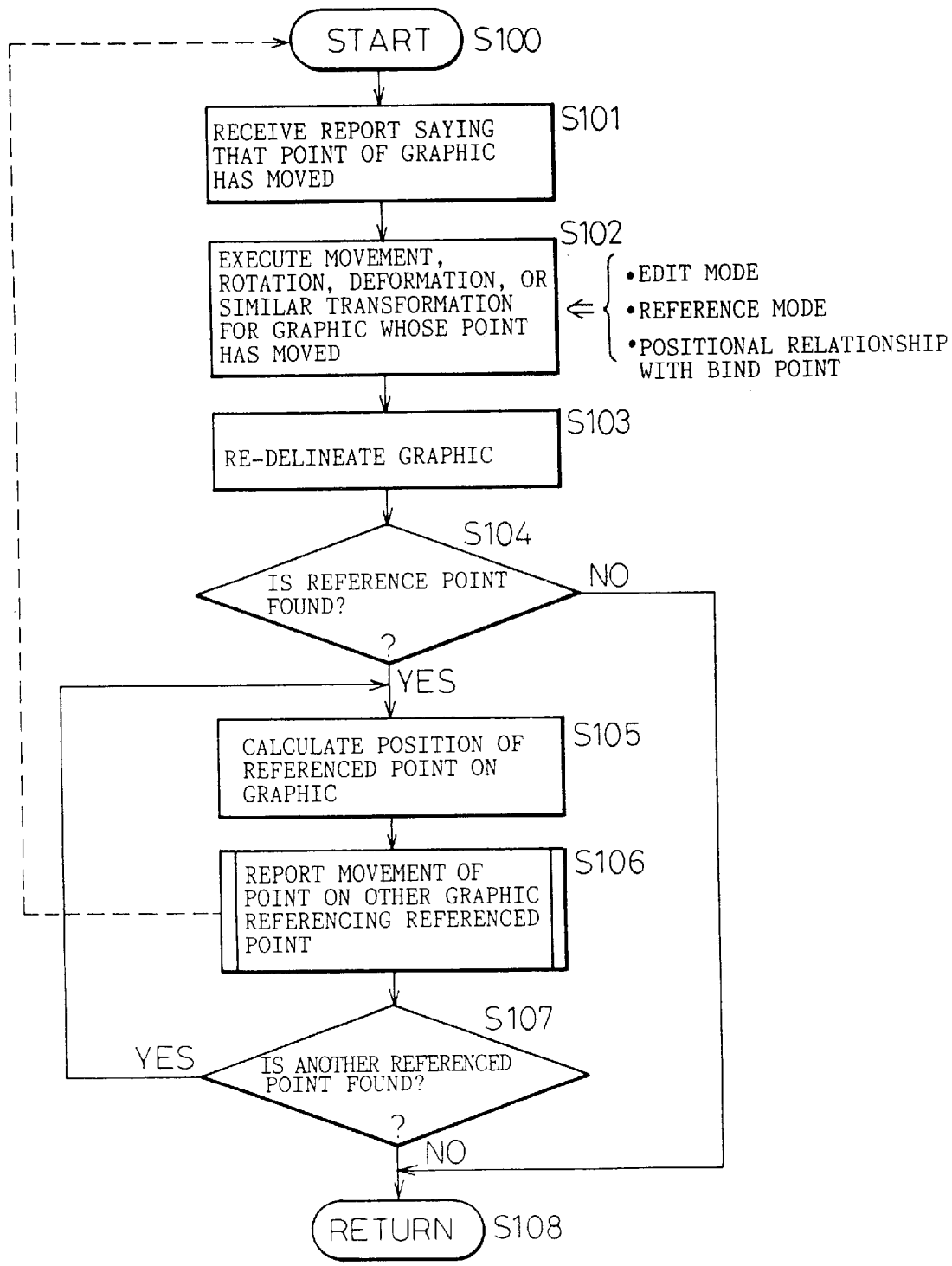

The left-hand drawings in FIGS. 3A to 3D show a change reference graphic 27 and a position cursor 29 in a graphic display area, and the right-hand drawings therein show a time display graphic 28 and a moving time cursor 30 in a time display area 25;

FIGS. 4A to 4D show an example of editing in which a graphic 26 is related to the position cursor 29 on the change reference graphic 27 so that the graphic 26 moves with the movement of the position cursor 29;

FIGS. 5A to 5H show examples of editing in which the graphic 26 is related to the position cursor 29 in the change reference graphic 27 so that the graphic 26 deforms or rotates with the movement of the position cursor 29;

FIGS. 6A to 6E show examples of editing in which a change in state of the graphic 26 resulting from the passage of time is specified;

FIGS. 7A to 7D show examples of editing a Gantt chart, or specifically, an example of moving the time display graphic 28 within the time display area 25 (FIG. 7B), an example of moving a range by dragging one point in the time display graphic 28 (FIG. 7C), and an example of stretching or shrinking a range by dragging an end point;

FIG. 8A shows an example of a basic data structure of graphic information to be placed in a graphic information memory 13, wherein the association of a graphic header with point information;

FIG. 8B shows an extent and points using a bind point;

FIG. 9 shows a correlation among data in the first embodiment, or specifically, relationships among point information, graphic headers, and position cursor information;

FIG. 10 shows an example of a data structure for managing information concerning the state changes shown in FIG. 6;

FIG. 11A is an explanatory diagram showing steps of creating the change reference graphic 27 and time display graphic 28 in the first embodiment;

FIG. 11B is an explanatory diagram showing the sequence of relating any graphic 26 to the change reference graphic 27 as shown in FIG. 4;

FIG. 12 is an explanatory diagram showing the sequence of changing the graphic 26 time-sequentially;

FIG. 13 shows the sequence of changing the states of the graphic 26 time-sequentially, wherein unlike FIG. 12, the graphic 26 has disappeared, been deleted from the area, or re-delineated according to a state designation value that indicates the relationship between a Gantt chart 45 and a position representing a current time instant, or appearance or disappearance;

FIGS. 14A to 14F show examples of practical applications of the present invention, wherein animating a graphic of a human being is discussed;

FIG. 15 is a block diagram of a hardware configuration employed in the first embodiment of the present invention;

FIG. 16 shows facilities to explain the principle of operation of the second embodiment of the present invention;

FIGS. 17A to 19D show examples of editing a graphic in the second embodiment of the present invention;

FIGS. 17A to 17D show an example of an editing sequence: a change reference graphic 27-1 representing a trajectory of a moving graphic is created; when the graphic is selected, a menu 44 is clicked to execute a Gantt chart creating command in a time display area 25; and thus a time display graphic 45-1 is created and a position cursor 29-1 is created on the change reference graphic 27-1;

FIGS. 18A to 18D and 19A to 19D show examples of editing in the second embodiment;

FIGS. 20A to 20D show examples of handling a graphic created as shown in FIGS. 17A to 19D;

FIGS. 21A to 21E show examples of editing a state in the second embodiment;

FIGS. 22A to 22D show examples of editing a Gantt chart in the second embodiment;

FIGS. 23A to 23H are explanatory diagram concerning relating of a plurality of Gantt charts;

FIG. 24 shows the correlation among data in the second embodiment, which is explained similarly to FIG. 9;

FIGS. 25A and 25B are explanatory diagrams showing the principle of operation of the third embodiment of the present invention;

FIG. 25A shows facilities of a major portion;

FIG. 25B is an explanatory diagram showing a position of a cursor relative to that of a bind point, and movement, rotation, and deformation (enlargement) of a graphic;

FIG. 26A shows an example of a data structure of graphic information in the third embodiment, wherein the relationship between a graphic header and point information is apparent;

FIG. 26B is an explanatory diagram showing an extent whose information is contained in the graphic header 114 for a polygonal graphic;

FIGS. 27A to 27J show examples of graphic handling in the third embodiment, or more particularly, relationships among a bind point, a handling start point, and a handling end point on a two-dimensional or three-dimensional graph;

FIGS. 28A to 28C are explanatory diagrams concerning display of grips in the third embodiment;

FIG. 28A is an explanatory diagram showing various grips;

FIG. 28B is an explanatory diagram showing a grip non-display mode;

FIG. 28C is an explanatory diagram showing a grip display mode;

FIGS. 29A to 29C are explanatory diagrams showing processing sequences in the third embodiment;

FIG. 29A shows an example of setting a bind point;

FIG. 29B shows an example of setting the grip display mode;

FIG. 29C shows an example of processing related to graphic editing;

FIG. 30 is an explanatory diagram showing a sequence of handling of a three-dimensional graphic in the third embodiment of the present invention, and which shows the details of FIGS. 29A to 29C;

FIGS. 31A to 31C are explanatory diagrams concerning the principle of operation of the fourth embodiment of the present invention;

FIGS. 32A to 32C are explanatory diagrams showing an example of a data structure of graphic information in the fourth embodiment of the present invention;

FIGS. 33A to 33G show examples of deformation reference in the fourth embodiment, wherein a cursor, icons, and a display screen are employed;

FIGS. 34A to 34E show examples of rotation reference in the fourth embodiment, wherein a mouse is used as a position designating unit to move a cursor, the cursor is used to select an icon for instructing rotation reference and then select a graphic to be related;

FIGS. 35A and 35B show examples of similar-transformation deformation reference in the fourth embodiment;

FIGS. 36A and 36B show examples of movement reference in the fourth embodiment;

FIGS. 37A to 37J correspond to FIGS. 27A to 27J, showing examples of deformation based on a bind point in the fourth embodiment of the present invention;

FIGS. 38A to 38C are explanatory diagrams concerning display of grips in the fourth embodiment of the present invention;

FIG. 38A shows various grips that may or may not reference points;

FIG. 38B shows a grip non-display mode;

FIG. 38C shows a grip display mode;

FIG. 39 is an explanatory diagram showing a relating sequence in the fourth embodiment of the present invention; and FIG. 40 is an explanatory diagram showing a sequence of graphic handling in the fourth embodiment of the present invention.

DESCRIPTION OF THE PREFERRED EMBODIMENTS

The present invention will be described with reference to the drawings.

FIG. 1 explains the principle of operation of the first embodiment of the present invention.

In FIG. 1, reference numeral 10 denotes a processing unit comprising a CPU and a memory. 11 denotes a display unit for displaying graphics to be created or edited. 12 denotes a position designating unit for use in designating positions in a display screen, which may be a mouse or a keyboard. 13 denotes a graphic information memory. 14 denotes general graphic information concerning ordinary graphics. 15 denotes change reference graphic information concerning graphics referenced to change a graphic; such as, a trajectory. 16 denotes time display graphic information representing time instants on a time base associated with ordinary graphics or change reference graphics. 17 denotes a graphic displaying means for displaying ordinary graphics and change reference graphics. 18 denotes a time displaying means for displaying time display graphics. 19 denotes a change information setting means for setting change information based on time instants or attribute values. 20 denotes a display updating means for updating a display screen of a graphic with the passage of time or the change in value of an attribute. 21 denotes a current time indicator for indicating a current time instant. 22 denotes a binding relationship setting means for inputting and setting information concerning binding relationships among graphics. 23 denotes a time editing means for editing a time display graphic.

24 denotes a graphic display area in a screen for displaying ordinary graphics and change reference graphics. 25 denotes a time display area in a screen for displaying time display graphics. 26 denotes an ordinary graphic. 27 denotes a change reference graphic. 28 denotes a time display graphic. 29 denotes a position cursor for indicating a position that changes time-sequentially. 30 denotes a time cursor for indicating a current time instant in the time display area 25.

In the aspect of the present invention described in claim 1, the processing means employed are as follows:

The graphic display processing means 17 displays the graphic 26 and change reference graphic 27 in the graphic display area 24 formed in a screen on the display unit 11. The time displaying means 18 displays the time display graphic, which represents a time instant associated with a line or a predetermined graphic, on a time base in the time display area 25 formed in a screen on the display unit 11.

The change information setting means 19 creates or edits the change reference graphic 27, which serves as a reference for moving or deforming (or rotating) a graphic time-sequentially, according to information entered at the position designating unit 12, and specifies the information of associating the positions of some points on the change reference graphic 27 with the positions of the same number of points on the time display graphic 28 in relevant graphic information in the graphic information memory 13.

The display updating means 20 performs interpolation to calculate the position of a point on the change reference graphic 27; that is, the position of the position cursor 29 with the movement of a point representing a current time instant on the time display graphic 28 (movement of the time cursor 30) or the passage of designated time. The display updating means 20 then executes editing to move or deform a graphic according to the calculated position, and thus updates the graphic display screen.

In the aspect of the present invention described in claim 1, a graphic to be handled varies as time passes. In the aspect of the present invention described in claim 2, a graphic to be handled varies with the change in value of a certain attribute. An attribute value displaying means (not shown) is included instead of or in addition to the time displaying means 18 described in claim 1. The attribute value displaying means displays an attribute value display graphic in an attribute value display area similar to the time display area 25.

The processing executed by the change information setting means 19 and display updating means 20 is identical to the processing derived from the passage of time. The change information setting means 19 and display updating means 20 execute the processing with the change of attribute values instead of the passage of time.

In the aspect of the present invention described in claim 3, the change information setting means 19 creates or edits the change reference graphic 27, which serves as a reference for moving or deforming a graphic, time-sequentially in the graphic display area 24 in a display screen of the display unit 11 according to information entered at the position designating unit 12, and then specifies information concerning time instants, which are associated with the positions of some points on the change reference graphic 27, in graphic information. A binding relationship setting means 22 is included. When a binding relationship between a point on the graphic 26 to be edited and the position cursor 29 representing the position representing a current time instant on the change reference graphic 27 is entered at the position designating unit 12, the binding relationship setting means 22 specifies the entered definition information in the relevant general graphic information 14 and change reference graphic information 15.

The display updating means 20 performs interpolation to calculate the position of a point on the change reference graphic 27 associated with a current time instant indicated by the current time indicator 21 after the passage of a designated time interval, effects the movement or deformation of a graphic according to the position of the point and the binding relationship specified in graphic information, and thus updates the display screen of the graphic.

In the aspect of the invention described in claim 3, a graphic to be handled varies as time passes. In the aspect of the present invention described in claim 4, a graphic to be handled varies with the change in value of a certain attribute. The processing executed by the change information setting means 19 and binding relationship setting means 22 in the aspect of the invention described in claim 4 is identical to the processing derived from the passage of time. The change information setting means 19 and binding relationship setting means 22 execute processing according to the change of attribute values instead of the passage of time.

The configurations of the graphic displaying means 17 and time displaying means 18 in the aspect of the invention described in claim 5 are identical to those in the aspect described in claim 1. In the aspect described in claim 5, the graphic 26 is allowed to time-sequentially appear or disappear, or change the states such as a color or a brightness level, but not be moved or deformed time-sequentially.

The change information setting means 19 specifies information on the association of some states of the designated graphic 26 with the positions of the corresponding number of points on the time display graphic 28 in graphic information in the graphic information memory 13. The display updating means 20 interpolates the states of preceding and succeeding points to calculate the states of the graphic 26 to be displayed with the movement of a point representing a current time instant on the time display graphic 28 or the passage of a designated time interval, and then displays a graphic assuming the calculated states.

The time editing means 23 is a processing means for modifying the positions of points on the time display graphic 28, which are associated with states of a graphic, according to information entered at the position designating unit 12 and independently of the associated states of the graphic. Owing to the time editing means 23, the graphic 26 can be allowed to appear or disappear at any time instant, and the speed at which a state changes can be modified merely by editing the time display graphic 28 in the time display area 25.

In the aspect of the present invention described in claim 5, a graphic to be handled varies as time passes. In the aspect described in claim 6, a graphic to be handled varies with the change in value of a certain attribute. The processing of the change information setting means 19 and display updating means 20 in the aspect described in claim 6 is identical to the processing derived from the passage of time. The change information setting means 19 and display updating means 20 execute the processing with the change of attribute values instead of the passage of time.

The attribute value editing means (not shown) modifies the positions of points on an attribute value display graphic, which are associated with states of a graphic, according to information entered at the position designating unit 12 and independently of the associated states of the graphic.

In the aspect of the present invention described in claim 1, the time display graphic 28, which indicates time instants at which the position of the graphic 26 in the graphic display area 24 is changed, is displayed in the time display area 25 formed independently of the graphic display area 24. The change in position of the graphic 26 can therefore be readily controlled using the time display graphic 28 through the change reference graphic 27. That is to say, the position cursor 29 on the change reference graphic 27 in the graphic display area 24 can be moved by moving the time cursor 30 representing a current time instant in the time display area 25.

The trajectory of the moving position cursor 29 can be defined using the change reference graphic 27, which obviates the necessity of editing the graphic 26 at every time instant. The speed of the moving position cursor 29 can be controlled by adjusting the moving speed of the time cursor 30 on the time display graphic 28, or the spaces between adjacent ones of the points on the time display graphic 28 associated with the points on the change reference graphic 27.

The change information setting means 19 obviates the necessity of displaying the change reference graphic 27 and time display area 25 after the information on the association of the time display area 25 with the change reference graphic 27 is specified in the graphic information memory 13. When a current time instant is designated at the position designating unit 12 or by running an application program, the graphic 26 associated with the time instant can be displayed without the display of the change reference graphic 27 and time display area 25.

Likewise, in the aspect of the present invention described in claim 2, a graphic can be moved or deformed with not only the passage of time but also the change in value of an arbitrary attribute. This makes it easy to display a dynamically-varying graphic, for example, a bar graph.

In the aspect of the present invention described in claim 3, the position cursor 29 on the change reference graphic 27 is moved time-sequentially, and a binding relationship between the position cursor 29 and graphic 26 (referencing-referenced relationship) is defined and placed in the graphic information memory 13. The graphic 26 can not only be moved time-sequentially but also be rotated, enlarged, or reduced with the movement of the position cursor 29 according to the type of a binding relationship. This makes it easy to, for example, define the trajectory of the sun using the change reference graphic 27 and edit an animated image such as a sunflower always oriented to the sun.

Likewise, in the aspect of the present invention described in the fourth embodiment, the graphic 26 can be varied with not only the passage of time but also the change in value of an arbitrary attribute according to a binding relationship with the position cursor 29.

In the aspect of the present invention described in claim 5, assuming that the color of the graphic 26 is defined as blue at a time instant T1 on the time display graphic 28, and as yellow at a time instant T2 thereon, as time passes from the time instant T1 to T2, the color of the graphic 26 can be changed continuously from blue to yellow. When the distance between the points representing the time instants T1 and T2 is changed, the speed of changing colors can be varied readily.

Likewise, in the aspect of the present invention described in claim 6, the graphic 26 can be changed in state continuously or allowed to appear or disappear with not only the passage of time but also the change in value of an arbitrary attribute. Assuming that a temperature is regarded as an attribute, when an attribute value is designated by running a program or using the position designating unit 12, an image whose color changes with the fluctuation in temperature can be produced readily.

Figure 2B:
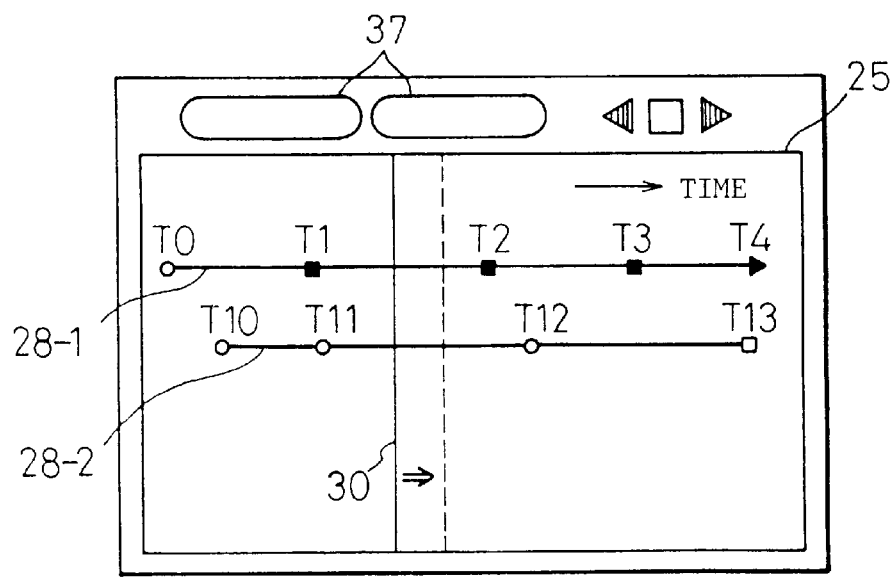

FIGS. 2A and 2B show a practical embodiment of the present invention.

FIG. 2A shows an example of the graphic display area 24, and FIG. 2B shows an example of the time display area 25. The graphic display area 24 and time display area 25 are formed in different windows. A command menu display 35 for use in creating or editing a graphic and a mode indicator display 36 consisting of icons are formed on the circumference of the graphic display area 24. Likewise, a command menu display 37 used for time-related editing is formed on the circumference of the time display area 25.

Assume that a graphic 26 of a human being moving time-sequentially is created or edited in the graphic display area 24. A route along which the graphic 26 moves is created as the change reference graphic 27. The change reference graphic 27 is created using the mode indicator display 36 according to a conventional graphic creation procedure.

When the change reference graphic 27 is created, a time display graphic 28-1 is created in the time display area 25 automatically or by entering a creation command. The axis of abscissas in the time display area 25 represents time. A time cursor 30 represents a current time instant. In association with typical points P0, P1, etc., on the change reference graphic 27, points T0, T1, etc., representing time instants are displayed on the time display graphic 28-1 automatically or by designating the time instants.

The time cursor 30 moves right as time passes. Using the position designating unit 12, the time cursor 30 can be moved to a point of any time instant. With the movement of the time cursor 30, the position cursor 29 moves on the change reference graphic 27. At the time instant T0, the position cursor 29 lies at the point P0. At the time instant T1, the position cursor 29 lies at the point P2. When the time cursor 30 lies between the points representing the time instants T1 and T2, the position cursor 29 is interposed between the points P1 and P2 according to the internal-dividing ratio of a length between the points representing the time instants T1 and T2.

When the graphic 26 to be moved time-sequentially has been created, the position of the graphic 26 is related to the position cursor 29. Specifically, the position designating unit 12 is used to relate the graphic 26 to the position cursor 29. Owing to the relationship, when the position cursor 29 moves, the graphic 26 moves. In other words, the graphic 26 moves with the movement of the time cursor 30.

The relating process falls into several operations; such as, deformation, rotation, and similar transformation deformation (enlargement and reduction). Depending on a relating operation, the graphic 26 is handled to vary with the movement of the position cursor 29.

The time display graphic 28-1 is formed in association with the change reference graphic 27. Likewise, a time display graphic 28-2 is formed in association with the graphic 26. When the time cursor 30 is used to designate a point on the time display graphic 28-2, the states of the graphic 26 such as a color and a brightness level can be defined in association with the time instant of the point. Outside the display of the time display graphic 28-2, the display of the graphic 26 is inhibited. By editing the time display graphic 28-2, the graphic 26 can therefore be started to appear at a certain time instant T10 and then deleted from a screen automatically at a time instant T13.

For example, once the states of the graphic 26 are defined in association with a time instant T11 and a time instant T12, the continuous change in state of the graphic 26 from the time instant T11 to T12 can be realized by performing interpolation.

The movement of the time cursor 30 in the time display area 25 can be designated using the position designating unit 12 or by running an application program. After required information is specified in the graphic information memory 13, when it is designated that the change reference graphic 27 and time display area 25 should not be displayed, the graphic 26 alone may be moved or changed time-sequentially in a display screen in practice.

If a display screen and an object to be handled as those shown in FIG. 2B are formed to cope with the change in value of an arbitrary attribute instead of the passage of time, a graphic that changes with the change in value of an attribute can also be created or edited.

FIGS. 3 to 6 show examples of editing processes in the first embodiment of the present invention.

To begin with, editing of a graphic whose position changes time-sequentially will be described in conjunction with FIG. 3. In the graphic display area 24 shown in FIG. 3A, the change reference graphic 27 serving as a route is created. Next, as shown in FIG. 3B, a Gantt chart creation command is executed in the time display area 25 with the change reference graphic 27 selected. Eventually, as shown in FIG. 3C, a time display graphic 28 is created in the time display area 25 and a position cursor 29 is created on the change reference graphic 27 in the graphic display area 25.

Information for associating points on the change reference graphic 27 with those on the time display graphic 28 is specified in the graphic information memory 13 shown in FIG. 1. Thereafter, the position cursor 29 moves with the movement of the time cursor 30. Specifically, as shown in FIG. 3D, when the time cursor 30 moves, the position cursor 29 moves along the change reference graphic 27.

FIGS. 4A to 4D show an example of editing in which the graphic 26 is associated with the position cursor 29 on the change reference graphic 27 so as to move with the movement of the position cursor 29.

Figure 4A:
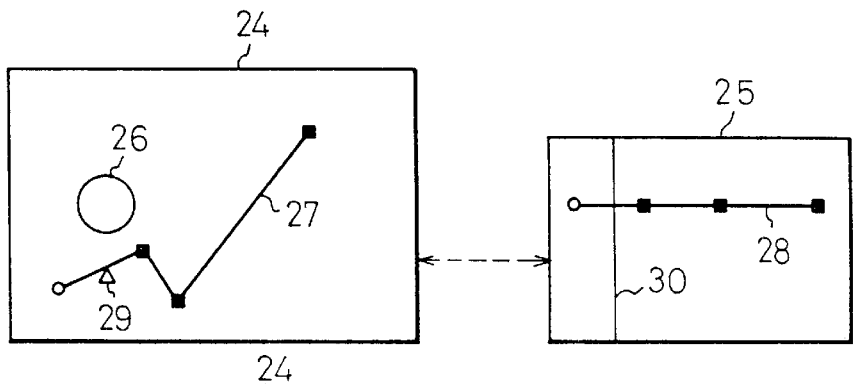
Figures 2, 25B:
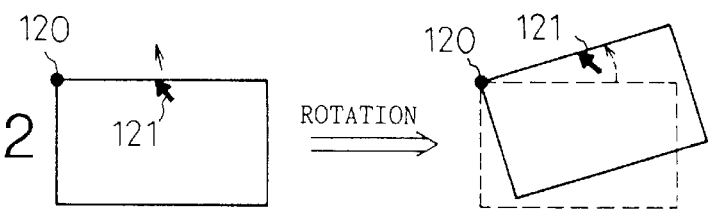
Figures 3, 25B:
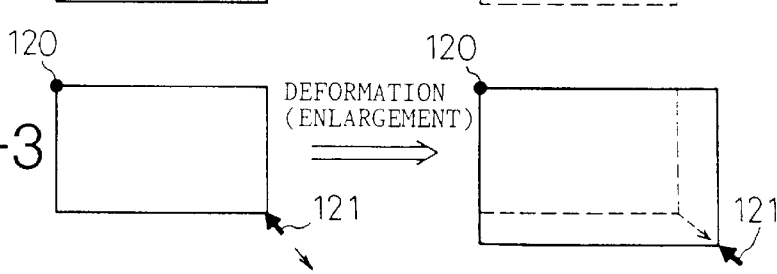

After the change reference graphic 27 and time display graphic 28 are created by executing editing shown in FIG. 3, the graphic 26 is created as shown in FIG. 4A. The graphic 26 may be created first.

Figure 4B:
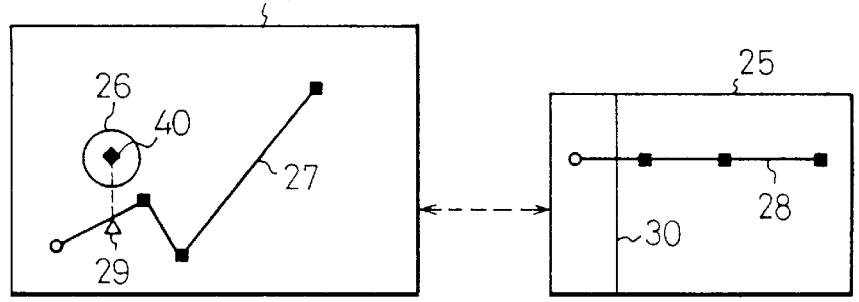

Next, as shown in FIG. 4B, a referencing-referenced relationship is defined between the graphic 26 and position cursor 29. A command is available for executing the relating process. Herein, the command is entered at the position designating unit 12, whereby a bind point 40 pre-defined in the center of the graphic 26 is linked to the position cursor 29.

Figure 4C:
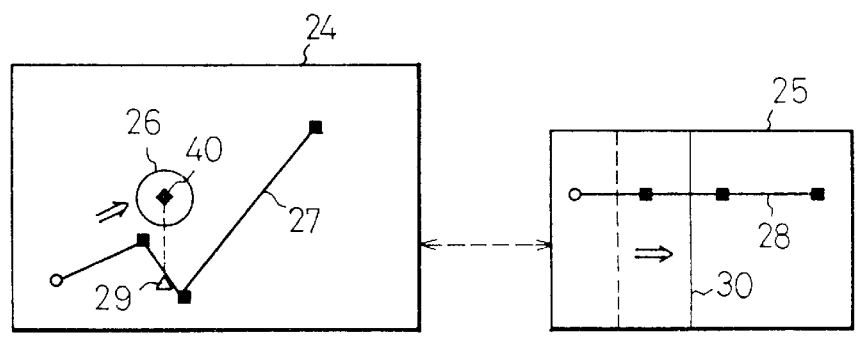
Figure 4D:
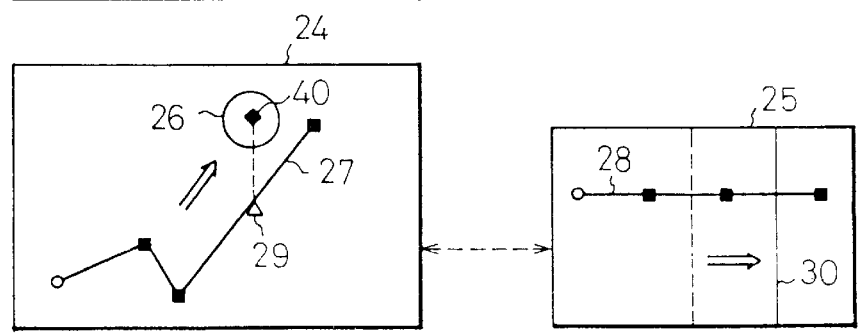

A definition concerning relationship is specified in the graphic information memory 13. Thereafter, when the time cursor 30 moves in the time display area 25, as shown in FIGS. 4C and 4D, the position cursor 29 moves in the graphic display area 24. Accordingly, the graphic 26 moves.

FIGS. 5A to 5H show examples of editing in which the graphic 26 is deformed or rotated with the movement of the position cursor 29 by relating the graphic 26 to the position cursor 29 on the change reference graphic 27. The time display area 25 is not illustrated.

Figure 5A:
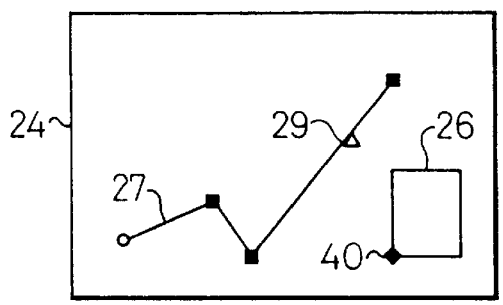

For example, as shown in FIG. 5A, the graphic 26 is created in the graphic display area 24. If necessary, the bind point 40 is designated on the graphic 26 using the position designating unit 12 such as a mouse. When the graphic 26 has been created, the bind point 40 is automatically set at a predetermined position. The position of the bind point 40 may be changed using the position designating unit 12.

Figure 5B:
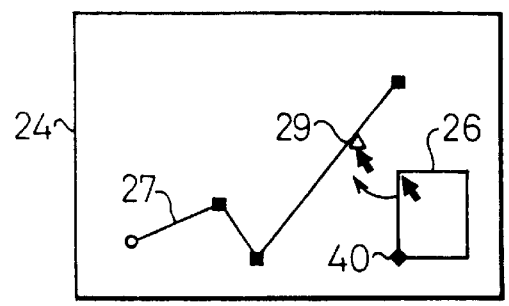

Next, as shown in FIG. 5B, the mouse cursor is moved to designate a point to be related (which is referred to as a referencing point) on the graphic 26 and the position cursor 29 (which is referred to as a referenced point). A deformation reference relationship is established between these points. This establishment is achieved by designating a deformation reference mode using the mode indicator display 36 shown in FIG. 2, selecting the graphic 26 and change reference graphic 27, dragging the referencing point on the graphic 26, and then linking the referencing point to the position cursor 29 or the referenced point.

Figure 5C:
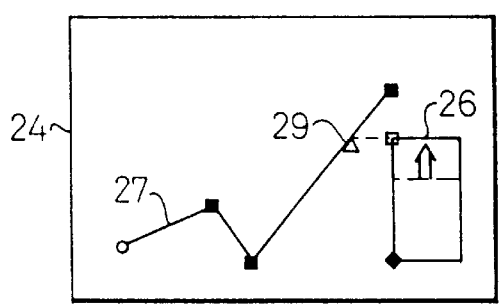
Figure 5D:
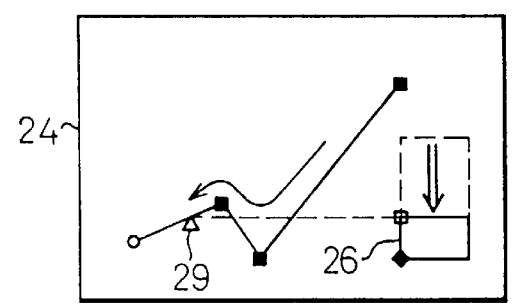

Due to the above relating process, the graphic 26 is deformed as shown in FIG. 5C. Information concerning the referencing-referenced relationship between the referencing point and position cursor 29 is stored in the graphic information memory 13. Thereafter, as shown in FIG. 5D, when the position cursor 29 moves, the referencing point on the graphic 26 moves and the graphic 26 deforms accordingly. In this case, since the position of the bind point 40 does not change, the graphic 26 stretches or shrinks longitudinally with the movement of the position cursor 29.

Figure 5E:
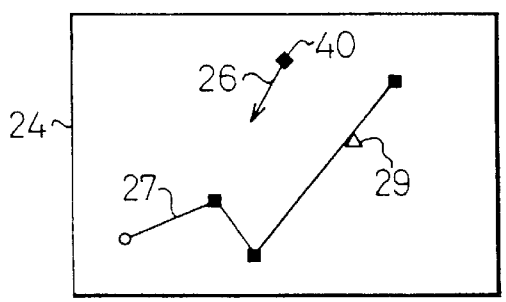
Figure 5F:
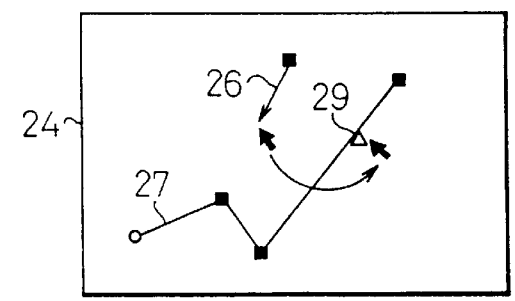
Figure 5G:
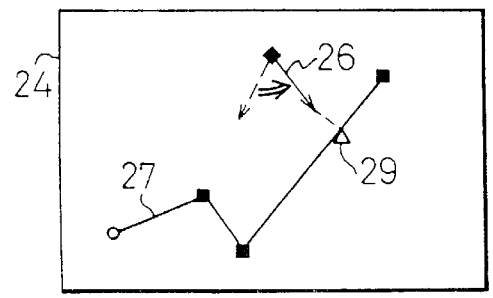
Figure 5H:
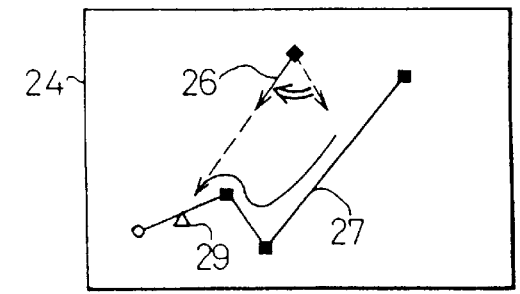

FIGS. 5E and 5H show an example of editing of rotation reference. The graphic 26 is created as shown in FIG. 5E. The graphic 26 in this example is an arrow. The bind point 40 is set at the originating end of the arrow. For keeping the tip of the arrow of the graphic 26 oriented to the position cursor 29, first, the rotation reference mode is selected.

Thereafter, using the mouse, as shown in FIG. 5F, the tip of the graphic 26 is dragged to join the position cursor 29.

Consequently, as shown in FIG. 5G, the arrow of the graphic 26 appears oriented to the position cursor 29. Information concerning setting related to rotation reference is stored in the graphic information memory 13. Thereafter, as shown in FIG. 5H, when the position cursor 29 moves on the change reference graphic 27 with the passage of time, the tip of the arrow of the graphic 26 automatically rotates to face the position cursor 29.

FIGS. 6A to 6E show an example of editing in which the graphic 26 is changed in state with the passage of time.

Figure 6A:
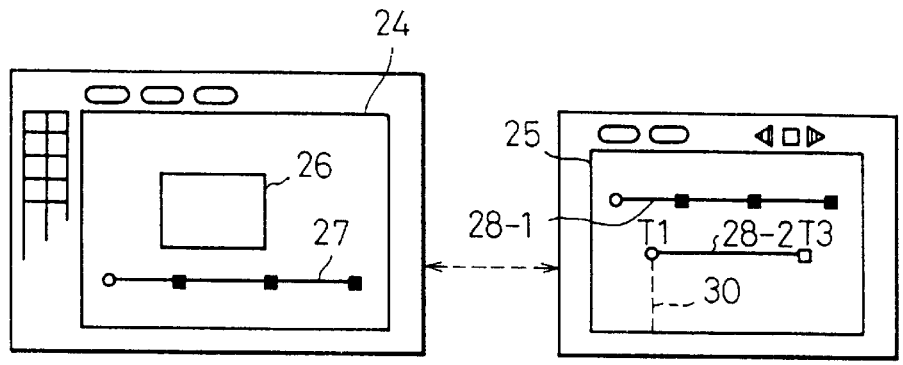

As shown in FIG. 6A, the graphic 26 whose states change is created in the graphic display area 24. A time display graphic associated with the graphic 26 is created in the time display area 25. The graphic in the time display area 25 is hereinafter referred to as a Gantt chart. As the time display graphic 28-1 is formed in association with the change reference graphic 27, so a Gantt chart 28-2 is formed in association with the graphic 26 automatically or by designating it.

Figure 6B:
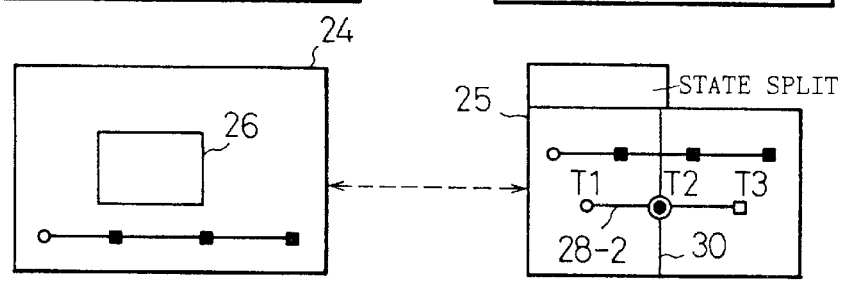

For designating a color and other states for the graphic 26, the position designating unit 12 is used to move the time cursor 30 to a time instant T2 at which states are to set. A state split command is then executed as shown in FIG. 6B. With the execution of the command, a state designation point is set on the Gantt chart 28-2.

Figure 6C:
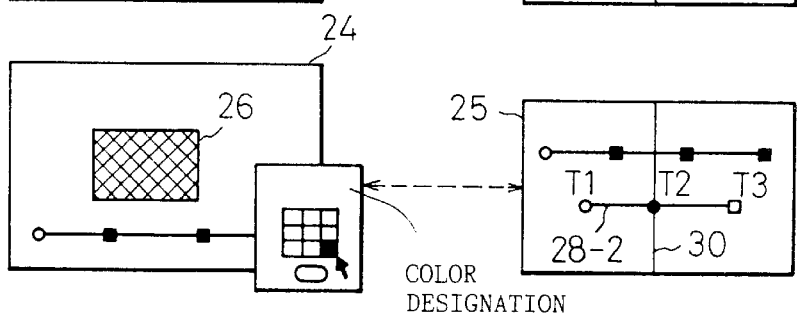

A color, a brightness level, and other necessary states are then designated for the graphic 26 as shown in FIG. 6C. Information of associating the states of the graphic 26 with the time instant T2 on the Gantt chart 28-2 is then stored in the graphic information memory 13. When the Gantt chart 28-2 is created, the initial states of the graphic 26 at the time instant T1 are placed in the graphic information memory 13.

Figure 6D:
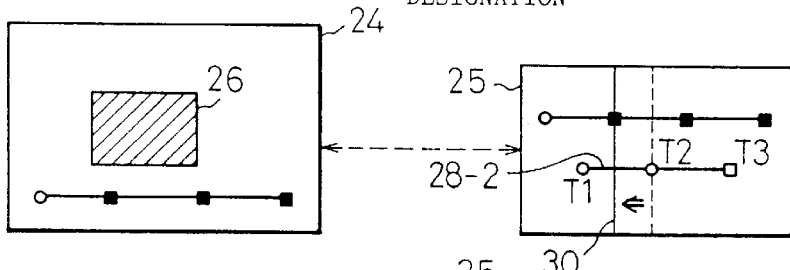

Thereafter, as shown in FIG. 6D, when the time cursor 30 is moved, a state (herein, color) of the graphic 26 changes automatically.

Figure 6E:
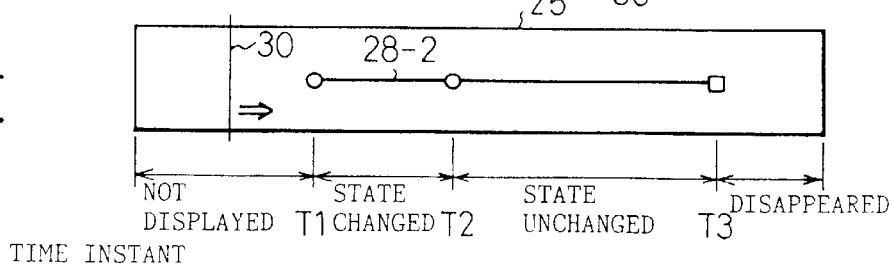

FIG. 6E shows a relationship between the position of the time cursor 30 and a state of the graphic 26. When the time cursor 30 lies between a point preceding the point of the time instant T1 and the point of the time instant T1 from which the Gantt chart 28-2 originates, the graphic 26 is not displayed and does not appear in the graphic display area 24. At the time instant T1, the graphic 26 is displayed in a color specified for the initial state. While the time cursor 30 is moving in a duration from the time instant T1 to T2, the graphic 26 appears in intermediate states between the states set at the time instants T1 and T2 according to the position of the time cursor 30.

The state of the graphic 26 set at the time instant T2 is retained for a duration from the time instant T2 to T3 at which the Gantt chart 28-2 terminates. If a new state is designated at the time instant T3, the graphic 26 appears in intermediate states resulting from interpolation of the states set at the time instants T2 and T3. After the time instant T3, the graphic 26 is deleted to disappear from the graphic display area 24.

FIGS. 7A to 7D show examples of editing a Gantt chart in the first embodiment of the present invention.

The time display graphic 28-1 (or the Gantt chart 28-2 associated with the ordinary graphic 26) in the time display area 25 can be edited using the time editing means 23 shown in FIG. 1. This editing is achieved according to, fundamentally, the same procedure as normal graphic editing.

Figure 7A:
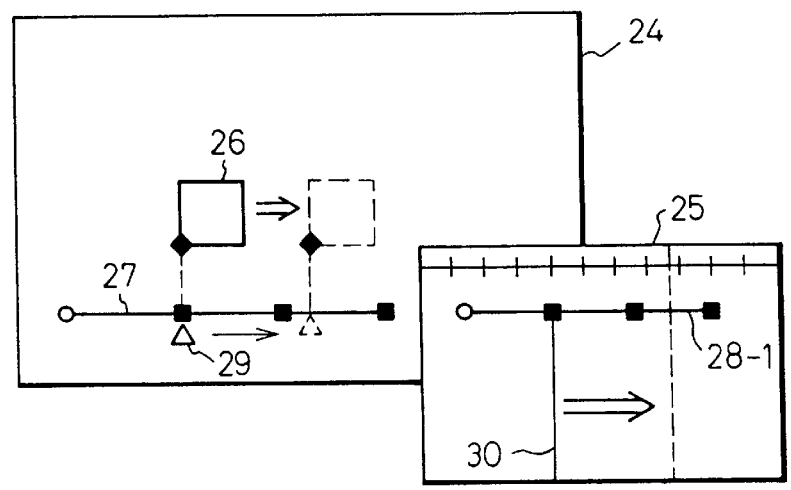

For example, as shown in FIG. 7A, when the time cursor 30 moves in the time display area 25, the position cursor 29 moves on the change reference graphic 27. In response to a normal operational command, the time cursor 30 moves at a constant speed. The moving speed of the position cursor 29 on the change reference graphic 27 can therefore be changed by varying spaces between adjacent points on the time display graphic 28-1. In short, the movement of the graphic 26 can be defined merely by editing the time display graphic 28-1 without editing the change reference graphic 27.

Figure 7B:
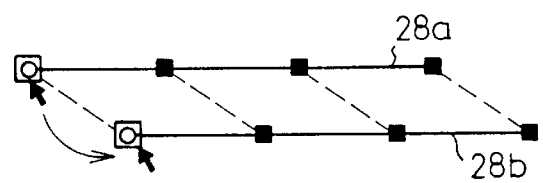

FIG. 7B shows an example of moving the time display graphic 28 in the time display area 25. The time display graphic 28 is dragged by the mouse cursor and moved from the position of a time display graphic 28a to the position of a time display graphic 28b.

Figure 7C:
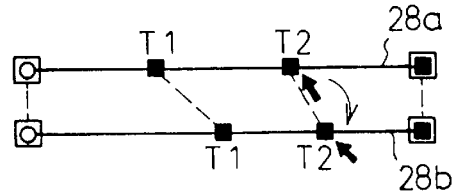

FIG. 7C shows movement within a particular range in the time display graphic 28-1. When a point (for example, a point of a time instant T2) is dragged with the origin and terminal of the time display graphic 28a fixed, another point T1 also moves by a length proportional to the distance from the fixed point. This results in the time display graphic 28b.

Figure 7D:
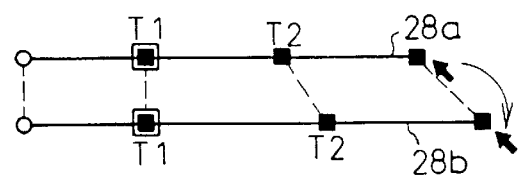

In FIG. 7D, the terminal of the time display graphic 28-1 is dragged with the point of the time instant T1 fixed. The portion of the time display graphic 28a from the point of the time instant T1 to the terminal is stretched as a whole, which results in the time display graphic 28b. These editing operations can be executed selectively by entering a menu command.

FIG. 8A shows an example of a basic data structure of graphic information to be specified in the graphic information memory 13 shown in FIG. 1.

Graphic information is, as shown in FIG. 8A, composed basically of a graphic header 50 and a set of point information 51-1, 51-2, etc., that define a shape of a graphic. The graphic header 50 consists of information concerning a rectangular zone occupied by a graphic (which is referred to as an extent), the number of points, and a pointer pointing to an address of point information 51 concerning a start point. The graphic header 50 further includes a pointer pointing to point information concerning a point defined as the bind point 40.

When a graphic is a polygon such as that shown in FIG. 8B, the extent is a rectangular zone indicated with a dashed line. Extent information included in the graphic header 50 includes the coordinates (x0, y0) of a point at the left upper corner of the extent, the width w of the extent, and the height h thereof. Point information 51 includes coordinates of the vertices of the polygon; (x1, y1), (x2, y2), etc., and a pointer pointing to point information concerning the next point. The graphic header 50 and point information 51 may include various other attributes if necessary.

In an example shown in FIGS. 8A and 8B, the point (x2, y2) specified in point information 51-2 is defined as the bind point 40. The bind point 40 is regarded as one of attributes specified in graphic information and helps effect deformation during graphic editing.

FIG. 9 shows a correlation among data in the first embodiment of the present invention.

Graphic headers 50-1, 50-2, and 50-3 are associated with general graphic information 14, change reference graphic information 15, and time display graphic information 16. Extent information described in conjunction with FIG. 8A is not shown in the graphic headers in FIG. 9.

The change reference graphic information 15 includes position cursor information 52. The position cursor information 52 includes coordinates (x, y) of the position cursor 29, pointers indicating addresses of point information concerning right and left adjacent points, and a dividing ratio of a length between the right and left points with respect to the point of the position cursor 29. Point information 51-3, 51-4, and 51-5 pointed to by the graphic header 50-2 are concerned with the points P0, P1, and P2 in FIG. 2.

The time display graphic information 16 is concerned with the time display graphic 28-1 shown in FIG. 2B, comprising a graphic header 50-3, and point information 51-6, 51-7, etc. Furthermore, time cursor information is provided to have the same data structure as the position cursor information 52. The point information 51-6, 51-7, etc., is concerned with the points T0, T1, etc., and correspond to the point information 51-3, 51-4, etc., in the change reference graphic information 15.

The graphic header 50-3 points to the current time indicator 21 and manages current time.

As described previously, a point on the graphic 26 is related to another point such as the position cursor 29. In an example of a data structure in FIG. 9, the point defined by the point information 51-1 is related to the position cursor 29. Pointers pointing to both the addresses of the point information 51-1 and position cursor information 52 are specified in the position cursor information 52 and point information 51-1. A type of a relationship such as a relationship of deformation reference or rotation reference (not shown) is also specified in the point information 51-1.

FIG. 10 shows an example of a data structure of data for representing states used for the state change described in conjunction with the example of FIG. 6.

A graphic header 50-2 associated with the Gantt chart 45 shown in FIG. 6 points to point information 51-1, 51-2, etc., that indicate time instants at which the states of the graphic 26 are defined. The point information 51-1 is associated with a time instant T1. The point information 51-2 is associated with a time instant T2. When the time cursor 30 lies between, for example, the points of the time instants T1 and T2, pointers pointing to the addresses of the point information 51-1 and 51-2 are, as shown in FIG. 10, specified in time cursor information 61.

The graphic header 50-1 associated with the graphic 26 points to state information 60-1, 602, etc., that indicate states at the time instants T1, T2, etc. The state information 60-1, 60-2, etc., are pointed to by the point information 51-1, 51-2, etc., concerning time instants. Each of the state information 60-1, 60-2, etc., includes information of indicating whether a graphic should appear or disappear, a color, a brightness level, and a transparency. In addition, shape-related information; such as, a line width and a graphic size may be included.

After the position of the time cursor 30 is retrieved from the time cursor information 61, the point information 51-1 and 51-2 are referenced to calculate a dividing ratio of a length between the two points. Interpolation is performed relative to the ratio in order to calculate intermediate values between state specification values retrieved from the state information 60-1 and those retrieved from the state information 60-2. Consequently, current states are determined.

When the time cursor 30 moves, data shown in FIG. 10 are referenced or updated at intervals of unit time. The states of the graphic 26 to be displayed are thus determined, whereby the graphic 26 changes states.

FIG. 11A is an explanatory diagram showing a sequence of creating the change reference graphic 27 and time display graphic 28 in the first embodiment of the present invention. First, the sequence starts at a step S0.

At a step S1, a creation command for instructing creation of the change reference graphic 27 or an ordinary graphic creation command is entered to select a graphic creation mode, and then information concerning positions of an origin, a terminal, and other major points of the change reference graphic 27 are entered at the position designating unit 12.

At a step S2 after the change reference graphic 27 is created, information concerning the time display graphic 28 associated with the change reference graphic 27 is produced automatically or by designating it explicitly. In short, the time display graphic information 16 shown in FIG. 9 is created.

At a step S3, point information is created as the time display graphic information 16 in association with the point information concerning the change reference graphic 27. When no designation is made, points of time instants are spaced regularly.

At a step S4, the change reference graphic 27 is displayed in the graphic display area 24.

At a step S5, the time display graphic 28 is displayed in the time display area 25.

The above operations may not always proceed in the order of the steps S1 to S5.

For relating an arbitrary graphic 26 is, as shown in FIGS. 4A to 4D, to the change reference graphic 27, the processing shown in FIG. 11B is executed.

At a step S11, information necessary for graphic creation is entered at the position designating unit 12.

At a step S12, the time display graphic information 16 for an associated Gantt chart is produced and displayed in the time display area 25.

At a step S13, the relating operation described in conjunction with FIG. 5 is executed to input a type of reference such as deformation reference, movement reference, or rotation reference. A referencing-referenced relationship is established between a point on the graphic 26 and the position cursor 29 on the change reference graphic 27. This input information is reflected on the data structure shown in FIG. 9.

At a step S14, positions and shapes at and in which the graphic 26 is to be displayed are calculated so that the designated referencing-referenced relationship can be maintained irrelevant of the movement of the position cursor 29.

At a step S15, the related graphic 26 is re-displayed.

FIG. 12 is an explanatory diagram showing a sequence of changing the graphic 26 time-sequentially. Advance of time can be designated using the position designating unit 12 or by running an application program.

The sequence starts at a step S20.

At a step S21, the position of the time cursor 30 is determined according to a designated current time instant or a current time instant automatically advanced.

At a step S22, an internally-dividing ratio S of a length between the points T1 and T2 preceding and succeeding the time cursor 30 is calculated. That is to say, a ratio of a distance from the time cursor 30 to the preceding point T1 and a distance therefrom to the succeeding point T2 is calculated using the point information 51-1 and 51-2 shown in FIG. 9.

At a step S23, the position of the position cursor 29 is determined on the basis of points P1 and P2 on the change reference graphic 27 associated with the time points T1 and T2, and the internal-dividing ratio S.

At a step S24, the position cursor information 52 shown in FIG. 9 is updated and the position cursor 29 is moved to a new position on the change reference graphic 27.

At a step S25, it is determined whether any point is referencing the position cursor 29. If a point is referencing the position cursor 29, control is passed to a step S26.

At the step S26, the graphic 26 having the referencing point is moved, rotated, or deformed according to the relationship between the position cursor 29 and referencing point. This processing is repeated for all graphics related to the position cursor 29.

The sequence terminates at a step S27.

FIG. 13 shows the processing of changing the states of the graphic 26 time-sequentially.

The sequence starts at a step S30.

At a step S31, the position of the time cursor 30 is determined according to a designated current time instant or a current time instant automatically advanced.

At a step S32, an internal-dividing ratio S of a length between the points T1 and T2 preceding and succeeding the time cursor 30 is calculated. That is to say, a ratio of a distance from the time cursor 30 to the preceding point T1 and a distance therefrom to the succeeding point T2 is calculated using the point information 51-1 and 51-2 shown in FIG. 10.

At a step S33, interpolation is performed on the basis of the state specification values representing the states of the graphic 26 associated with the time points T1 and T2, and the internal-dividing ratio S to calculate intermediate values of the state specification values. The states of the graphic 26 are thus determined.

At a step S34, a relationship between the Gantt chart 45 and the position at a current time instant or the state specification value representing appearance or disappearance is referenced to determine whether or not the graphic 26 is to disappear.

At a step S35, if the graphic 26 has not disappeared, the graphic 26 is re-delineated according to the states calculated at the step S33.

At a step S36, if the graphic 26 has disappeared, the graphic 26 is deleted from the graphic display area 24.

The sequence then terminates at a step S37.

FIGS. 14A to 14F show an example of a practical application of the present invention.

Assume that an animated image is created using a graphic of a human being comprising a head A, a body B, and legs C and D as shown in FIG. 14A.

As shown in FIG. 14B, the portions of the graphic are related to one another. Specifically, a bind point defined on the head A is related to a bind point defined on the body B. Bind points defined on the legs C and D are related to points on the lower side of the body B. A graphic E is created along the body B as a change reference graphic. A position cursor 29-1 is related to the bottom of the body B. Similarly, a graphic F is created along the leg D. A position cursor 29-2 is related to the distal ends of the legs C and D.

As shown in FIG. 14C, Gantt charts of graphics A to F are created and displayed in the time display area 25. With the movement of the time cursor 30 in the time display area 25, the position cursors 29-1 and 29-2 move.

As shown in FIGS. 14D to 14F, when the time cursor 30 moves time-sequentially, the position cursors 29-1 and 29-2 move on the graphics E and F. The movements cause referencing points related to the position cursors 29-1 and 29-2 to move. Specifically, the head A does not grow, but the body B grows and then the legs C and D grow. Graphic editing accompanied by this sequence of changes is realized readily.

The connections among the head A, body B, and legs C and D are maintained by means of relating these parts. Despite the deformation (growth) of each part, the graphics A to D that are the portions of the graphic of a human being will not be disconnected.

A time instant can be updated according to the following procedure:

(a) The position designating unit 12 such as a mouse is used to move the time cursor 30 to any position in the time display area 25.

(b) A time designation dialog window (not shown) is displayed to enter a numerical value representing any time instant.

(c) Continuous Advance is selected from a menu, whereby a time instant is advanced by certain time at intervals of predetermined unit time.

(d) An application program is run to retrieve a time setting function preprogrammed in the system, which provides an interface. This function is described as follows:

For designating continuous execution

Set_Time (start-time, end-time, update-speed or interval)

For not designating continuous execution

Set_Time (set-time)

When continuous execution is designated, a start time instant, an end time instant, and a speed at which a time instant is updated are specified as parameters. When continuous execution is not designated, a time instant at which update is executed is specified as a parameter.

In the above description of the embodiment, a graphic is varied with the passage of time. Alternatively, a graphic can be varied depending on the value of an arbitrary attribute. Apparently, this variant can be described merely by reading "time" or "a time instant" as "an attribute" or "an attribute value" in the above description.

An interface with an application program for use in updating a current value of an arbitrary attribute is provided by invoking a function described as follows:

Set_Attribute_Value-name, (new-value)

where, name represents an attribute name, and new-value represents a new attribute value.

When an application program is intended to be run to use graphic information edited according to the present invention, if an attribute is used to interface with a graphic displaying means to handle a graphic defined with the graphic information, the application program can be described more flexibly and simply.

According to prior arts, a dynamic change in the position of a graphic must be specified as an expression or data in an application program. To change positions of a graphic, the application program must therefore be re-edited or re-complied. Graphic information created by an editing apparatus according to the present invention is managed independently of application programs. The modification of a trajectory such as a change reference graphic does not affect any application program.

In the prior arts, when an application program is run to change positions of a graphic dynamically, two-dimensional coordinates (x, y) must be calculated. When a graphic created by an editing apparatus according to the present invention is to be changed in position dynamically, if an application program is to be run, new time instants or attribute values alone should be designated but coordinates in a screen need not be considered.

The graphic display area 24, and time display area 25 or attribute display area may be assigned to screens of different display units 11 or assigned on a one-to-one basis to windows of a known system having a window control feature.

FIG. 15 shows an example of a hardware configuration in an embodiment of the present invention.

The present invention can be implemented in known hardware as shown in FIG. 15. A display adaptor 103, a random access memory (RAM) 105, a CPU 106, and a disk adaptor 108 are connected by a system bus 107. The disk adaptor 103 is connected to a graphic display 100, a keyboard 101, a mouse 102, and a video memory (VRAM) 104. The contents of the video memory 104 are displayed on the graphic display 100 via the display adaptor 103. The disk adaptor 108 is connected to a disk storage such as a magnetic disk. The disk adaptor 108 controls data transfer between the RAM 105 and disk storage 109 in response to an input-output instruction sent from the CPU 106.

The graphic display 100, keyboard 101, mouse 102, and display adaptor 103 correspond to the display unit 11 and position designating unit 12 shown in FIG. 1. The graphic information memory 13 shown in FIG. 1 is installed in the RAM 105 or disk storage 109.

Needless to say, this embodiment can be implemented not only in the system shown in FIG. 15 but also in a general-purpose computer, a workstation type computer, or a standard personal computer.

As described above, according to the first embodiment of the present invention, a graphic varying with the passage of time or the change of attribute values can be edited readily and delineated on a screen of a display unit. For changing the shape of an edited graphic, not only the position designating unit 12 is used but also an application program may be run via a simple interface. The present invention thus contributes to improvement of flexibility and simplification of application programs.

Next, a synchronous editing apparatus for graphics will be described as the second embodiment. An object of the synchronous editing apparatus for graphics is to permit easy editing of a plurality of graphics, whose positions, shapes, and states change synchronously, by retaining the synchronism among the graphics while handling the time-sequential changes independently.

FIG. 16 shows facilities to explain the principle of operation of the second embodiment. The apparatus according to the present invention comprises a processing unit and a display unit.

In FIG. 16, reference numeral 10 denotes a processing unit comprising a CPU and a memory. 11 denotes a display unit for displaying graphics to be created or edited. 12 denotes a position designating unit for use in designating positions in a display screen; such as, a mouse or a keyboard. 13 denotes a graphic information memory. 14 denotes general graphic information concerning ordinary graphics. 15 denotes change reference graphic information concerning graphics that express trajectories along which graphics follow to change. 16 denotes time display graphic information that is associated with ordinary graphics or change reference graphics and represents time instants on a time axis. 17 denotes a graphic displaying means for displaying normal graphics or change reference graphics. 18 denotes a time displaying means for displaying time display graphics. 19 denotes a change information setting means for specifying time-sequential changes. 20 denotes a display updating means for updating a display screen of graphics time-sequentially. 21A denotes a time display editing means for synchronously editing time display graphics.

Reference numeral 24 denotes a graphic display area in a screen for displaying ordinary graphics or change reference graphics. 25 denotes a time display area in a screen for displaying time display graphics. 26 denotes ordinary graphics. 27 denotes change reference graphics. 28 denotes time display graphics. 29 denotes a position cursor for indicating a position that varies time-sequentially. 30 denotes a time cursor indicating a current time instant in the time display area 25.

In the aspect of the present invention described in claim 7, processing means included are as follows:

The graphic displaying means 17 displays the graphics 26 or change reference graphics 27 in the graphic display area 24 formed in a screen of the display unit 11. The time display processing means 18 displays the time display graphics 28, which are plotted as lines or predetermined graphics to indicate time instants on a time base, in the time display area 25 formed on a screen of the display unit 11.

The graphic information memory 13 stores general graphic information that defines shapes of graphics, and information on the association of points of time instants on the time display graphics 28 with points of positions on the change reference graphics 27.

The change information setting means 19 inputs points on the change reference graphics 27, which serve as references for changing positions or shapes of graphics time-sequentially and are entered in the graphic display area 24 at the position designating unit 12, and specifies information for associating the positions of some points on the change reference graphics 27 with the positions of some points on the time display graphics 28 in relevant graphic information in the graphic information memory 13.

The display updating means 20 performs interpolation to calculate the position of a point on each of the change reference graphics 27 associated with a point of a current time instant on each of the time display graphics 28 with the movement of the point of a current time instant (time cursor 30) on the time display graphic 28 or the passage of a designated time interval, synchronously changes the positions or shapes of graphics according to the positions of the points, and thus updates the display screen of the graphics.

The time display editing means 21A relates some points on one time display graphic 28 to some points on other time display graphic 28, and edits the time display graphics 28 so that points related to a point can move with the movement of the point.

In the aspect of the present invention described in claim 8, the graphic displaying means 17, time displaying means 18, and time display editing means 21A have substantially the same configurations as those in the aspect described in claim 7. The graphic information memory 13 stores information for associating points of time instants on the time display graphics 28 with states of a graphic or a plurality of graphics appearing in the graphic display area 24 which vary time-sequentially.

The change information setting means 19 specifies in graphic information the information for associating some states of a designated graphic with positions of some points on the time display graphics 28. The display updating means 20 calculates the state of each graphic associated with a point representing a current time instant on each of the time display graphics 28 with the movement of the point representing a current time instant on each of the time display graphics 28 or the passage of a particular time interval, synchronously changes the states of a plurality of graphics, for example, causes the graphics to appear or disappear, and thus updates the display screen of the graphics.

Assume that a circular graphic 26a is moved along the change reference graphic 27-1 in the graphic display area 24 time-sequentially. When reaching a point P1, the circular graphic 26a is split into a square graphic 26b and a triangular graphic 26c. The square graphic 26b and triangular graphic 26c are further moved along the change reference graphic 27-1 and a change reference graphic 27-2. In the second embodiment of the present invention, this sequence is achieved as described below.

In the graphic display area 24, the change reference graphic 27-1 is created as a trajectory along which the graphics 26a and 26b are moved and the change reference graphic 27-2 is created as a trajectory along which the graphic 26c is moved. Time display graphics 28-1-a and 28-1-b are created in the time display area 25 in association with the change reference graphics 27-1 and 27-2. A point P1 on the change reference graphic 27-1 is associated with a time instant T1 on the time display graphic 28-1-a. The change information setting means 19 places this associated information in the graphic information memory 13.

Graphics 26a, 26b, and 26c that move time-sequentially are created and related to the position cursor 29 that moves on the change reference graphics 27-1 and 27-2. A relating command for executing the relating process is available. The time display graphics 28-2-a, 28-2-b, and 28-2-c are time display graphics created in association with the graphics 26a, 26b, and 26c.

For example, the relating command is entered to relate the following time instants on the time display graphics to a time instant T1 associated with the point P1:

(1) Start time instant of the time display graphic 28-1-b
(2) End time instant of the time display graphic 28-2-a
(3) Start time instant of the time display graphic 28-2-b
(4) Start time instant of the time display graphic 28-2-c After the relating process is completed, when the position of the point of the time instant T1 is changed due to editing, the points of the above time instants are adjusted automatically so as to align with one another.

When the time cursor 30 representing a current time instant is moved from the leftmost end to the rightmost end in the time display area 25, the graphics in the graphic display area 25 move accordingly. That is to say, as the time cursor 30 moves on the time display graphic 28-1-a, the position cursor 29 moves on the change reference graphic 27-1. This causes the graphic 26a related to the position cursor 29 to move. When the time cursor 30 reaches the point of the time instant T1, the position cursor 29 comes to the point P1. The time display graphic 28-2-a comes to an end and the graphic 26a disappears.

At the point P1, the graphics 26b and 26c appear and start moving. When the graphic 26c has been related to the position cursor on the change reference graphic 27-2, the time display graphic 28-2-c moves left with respect to the change reference graphic 27-2. The end time instant of the time display graphic 28-2-c comes earlier than that of the time display graphic 28-2-b. The graphic 26c therefore disappears earlier than the graphic 26b.

The time display graphics can be edited in the time display area 25, and the moving speeds and the time instants of appearance or disappearance of graphics can therefore be changed. However, since the graphics 26a, 26b, and 26c are synchronized with one another due to the aforesaid relating process, the disappearance of the graphic 26a and the appearance of the graphics 26b and 26c occur simultaneously. The graphic 26a will not appear simultaneously with the graphics 26b and 26c.

FIGS. 17A to 19D show examples of graphic editing in the second embodiment of the present invention.

Figure 17A:
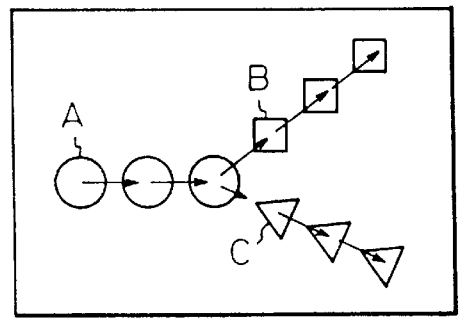

The second embodiment of the present invention will be described in conjunction with an example of graphic editing in which, as shown in FIG. 17A, a circle A moves right and splits into a square B and a triangle C in the middle.

Figure 17B:
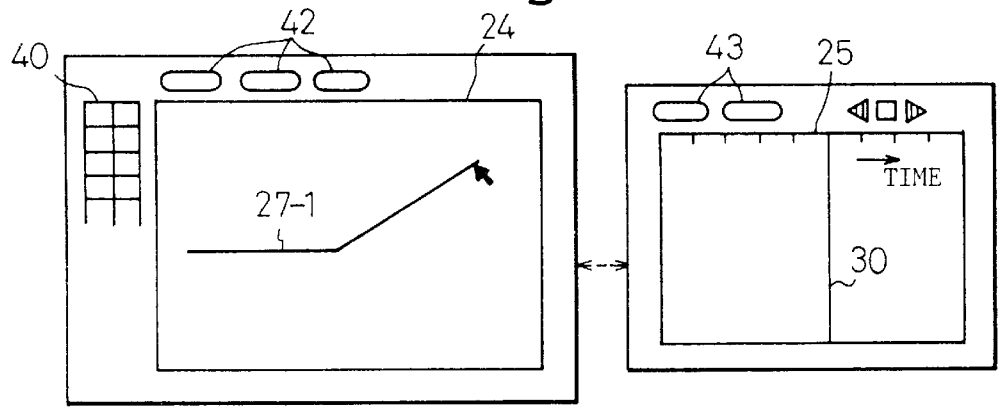
Figure 17C:
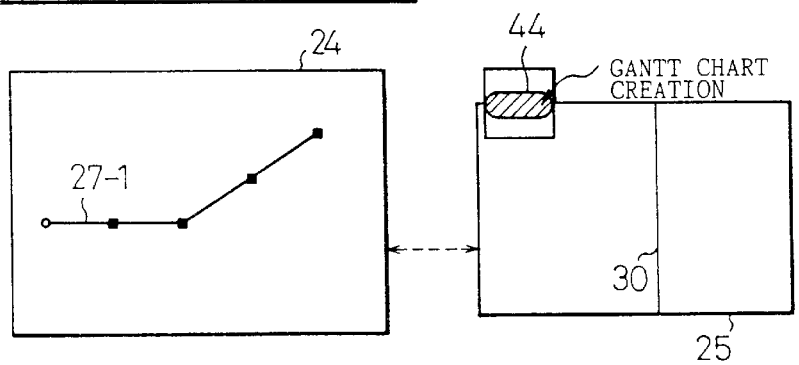

Reference numeral 40 in FIG. 17B denotes a mode indicator display showing icons. 42 denotes a command menu display for use in creating or editing graphics. 43 denotes a command menu display for use in editing time.

First of all, a change reference graphic 27-1 serving as a trajectory, along which a graphic is moved, is created in the graphic display area 24. Creating or editing the change reference graphic 27-1 is performed using the mode indicator display 40 according to a conventional graphic creating or editing sequence.

Figure 17D:
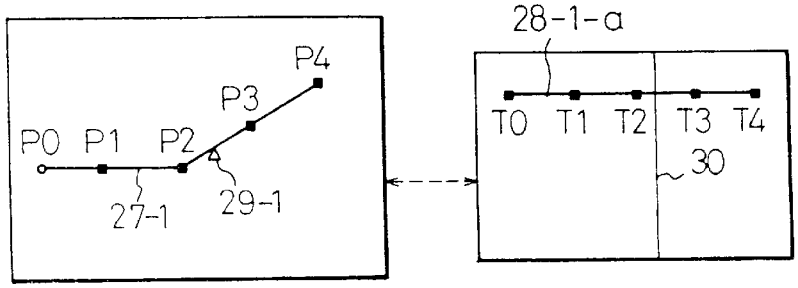

Next, the change reference graphic 27-1 is selected, and then a menu 44 is clicked to execute a Gantt chart creation command in the time display area 25. This causes, as shown in FIG. 17D, a time display graphic (which is referred to as a Gantt chart) 28-1-a to appear in the time display area 25. A position cursor 29-1 is created on the change reference graphic 27-1 in the graphic display area 24.

Points T0, T1, etc., of time instants are set on the Gantt chart 28-1-a in association with typical points P0, P1, etc., on the change reference graphic 27-1. The information of associating these points is placed in the graphic information memory 13 shown in FIG. 16.

Figure 18A:
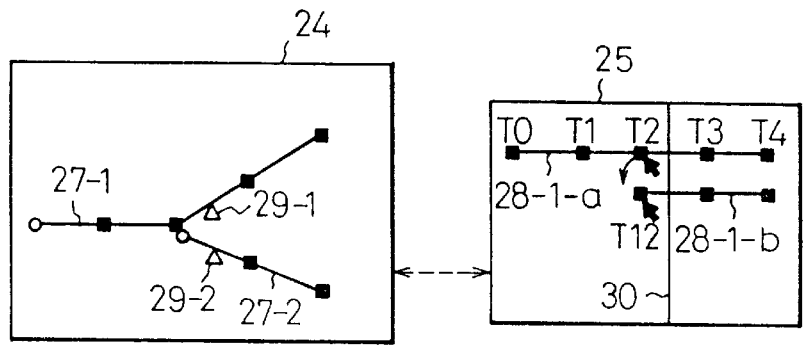

Likewise, as shown in FIG. 18A, a change reference graphic 27-2 is created in the graphic display area 24. A Gantt chart creation command is entered to create a Gantt chart 28-1-b. A position cursor 29-2 then appears on the change reference graphic 27-2. The aforesaid relating process is executed to relate a point T2 on the Gantt chart 28-1-a to a start point T12 of the Gantt chart 28-1-b. This relating process is accomplished by entering a relating command, dragging the point T12 to the point T2 using a mouse. Information concerning the relating process is stored in the graphic information memory 13 shown in FIG. 16.

Figure 18B:
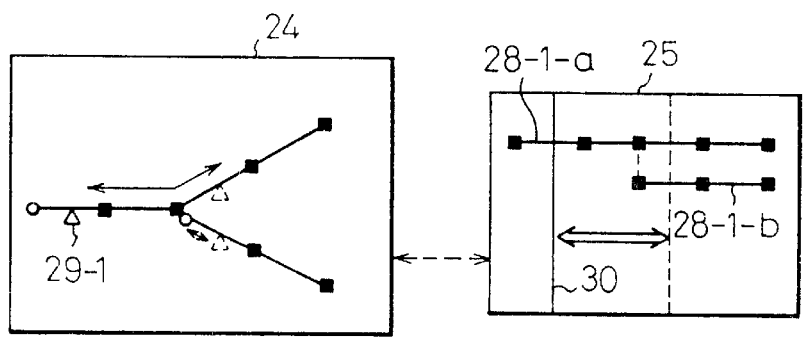

Thereafter, when the time cursor 30 moves, as shown in FIG. 18B, according to the graphic information stored in the graphic information memory 13, the position cursors 29-1 and 29-2 move. When the time cursor 30 moves left beyond the time instant point T1, the position cursor 29-2 disappears.

Figure 18C:
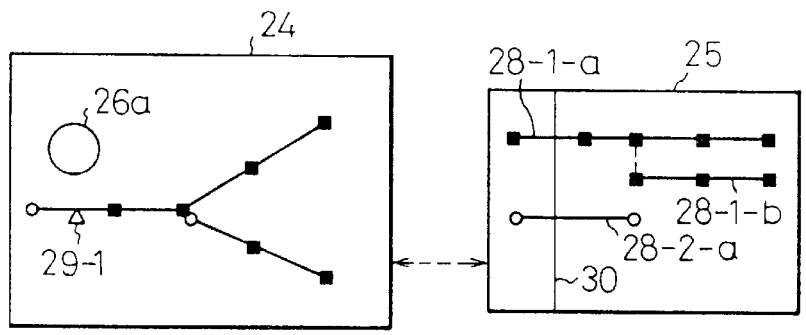

As shown in FIG. 18C, a graphic 26a is created in the graphic display area 24, and a Gantt chart 28-2-a is created in the time display area 25 in association with the graphic 26a.

Figure 18D:
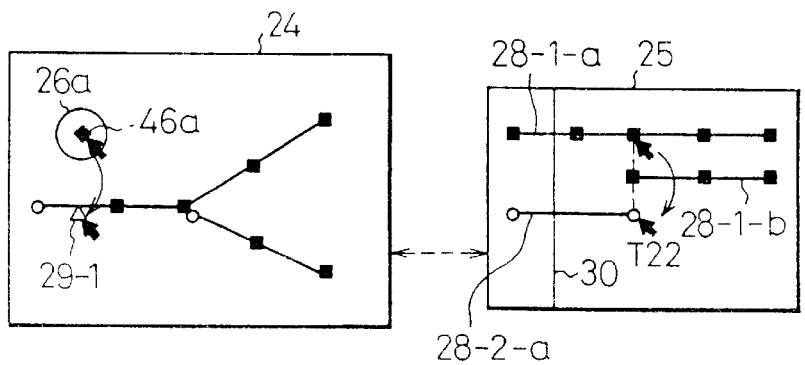

The relating process is executed to relate the graphic 26a to the position cursor 291, as shown in FIG. 18D, so that the graphic 26a will move with the movement of the time cursor 30. Herein, the center of the circle of the graphic 26a is defined as a bind point 46a. The bind point 46a is dragged to the position cursor 29-1, whereby the graphic 26a is related to the position cursor 29-1. A point of an end time instant T22 on the Gantt chart 28-2-a is related to a point T2 on the Gantt chart 28-1-a.

Figure 19A:
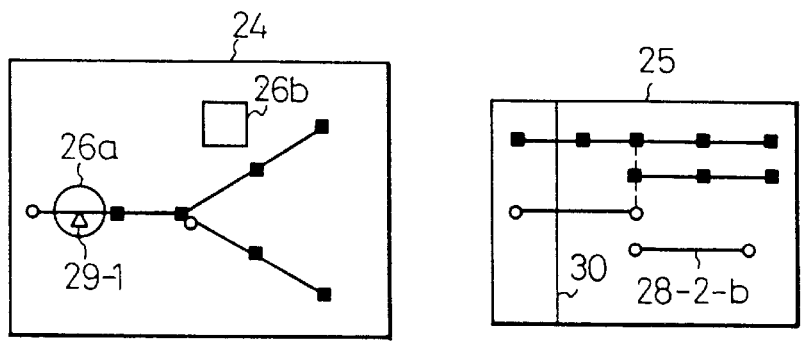
Figure 19B:
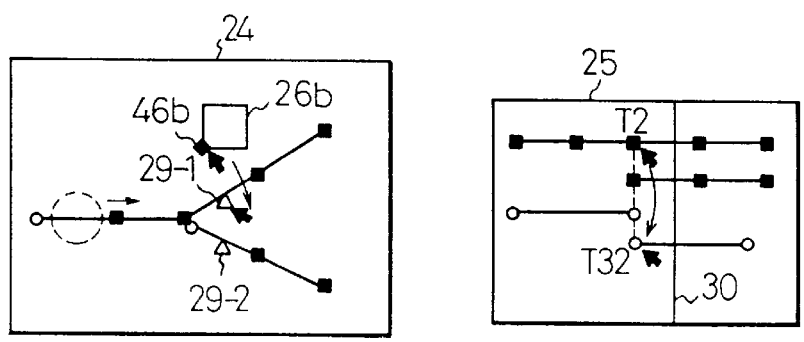

Likewise, as shown in FIG. 19A, a graphic 26b is created and a Gantt chart 28-2-b is created in association with the graphic 26b. As shown in FIG. 19B, the relating process is executed to relate the graphic 26b to the position cursor 29-2 and a point of a start time instant T32 on the Gantt chart 28-2-b to the point T2 on the Gantt chart 28-1-a.

Figure 19C:
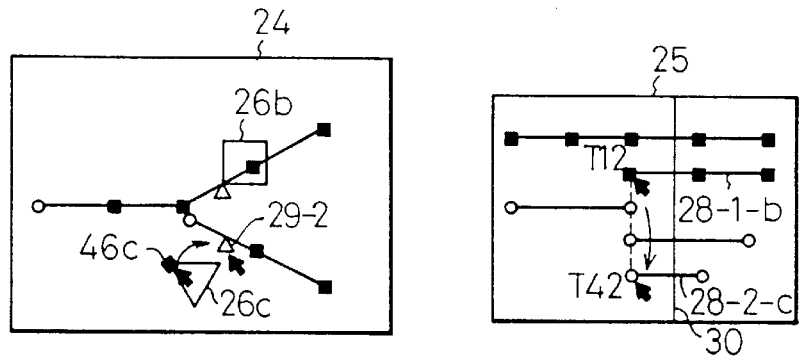

As shown in FIG. 19C, a graphic 26c and a Gantt chart 28-2-c are created. A bind point 46c on the graphic 26c is related to the position cursor 29-2, and a point of a start time instant T42 on the Gantt chart 28-1-b is related to the point of the start time instant T12 on the Gantt chart 28-1-b.

Figure 19D:
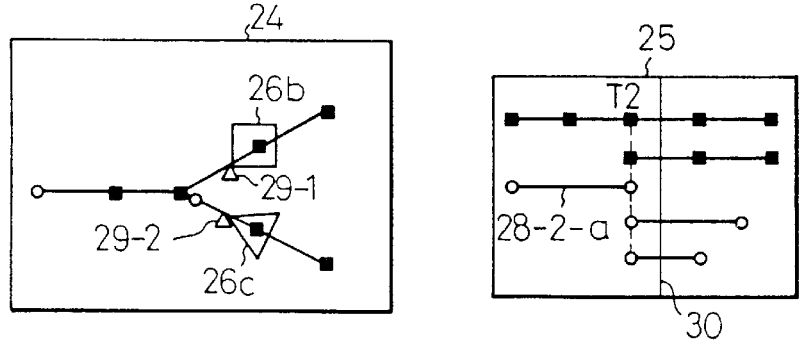

The graphics 26b and 26c are then, as shown in FIG. 19D, displayed on the position cursors 29-1 and 29-2. In FIG. 19D, the time cursor 30 is away from the Gantt chart 28-2-a. The circular graphic 26a is therefore not displayed.

FIGS. 20A to 20D show an example of handling graphics created as shown in FIGS. 17A to 19D.

Figure 20A:
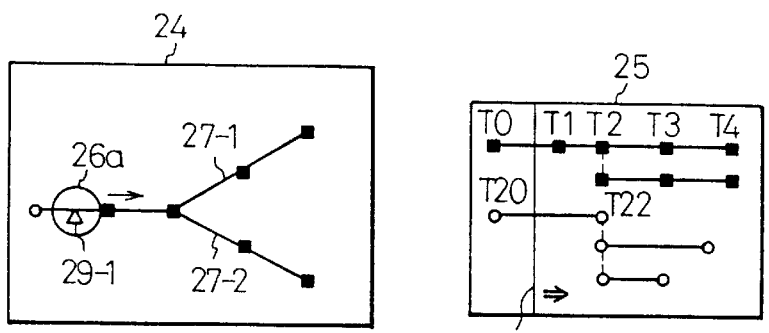

As shown in FIG. 20A, when the time cursor 30 moves from the point of a time instant T0 to T2 in the time display area 25, the position cursor 29-1 moves from left to right along the change reference graphic 27-1. The movement of the time cursor 30 can be instructed using the position designating unit 12 or by running an application program.

Figure 20B:
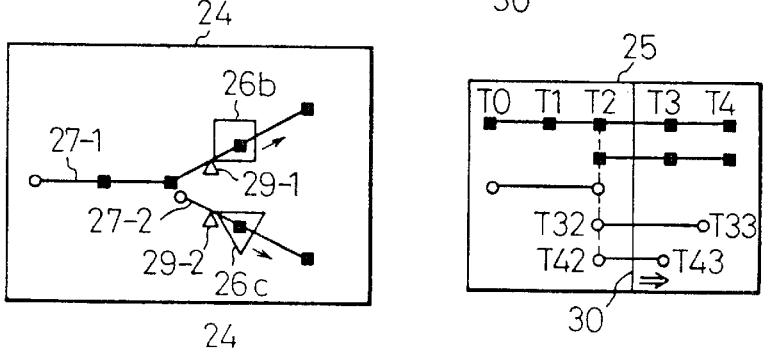

As shown in FIG. 20B, when the time cursor 30 passes the point of the time instant T2, the graphic 26a disappears. The graphics 26b and 26c are displayed at the positions of the position cursors 29-1 and 29-2 on the change reference graphics 27-1 and 27-2.

Figure 20C:
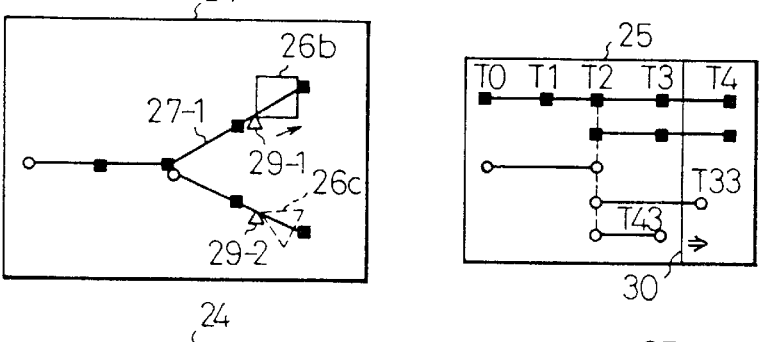
Figure 20D:
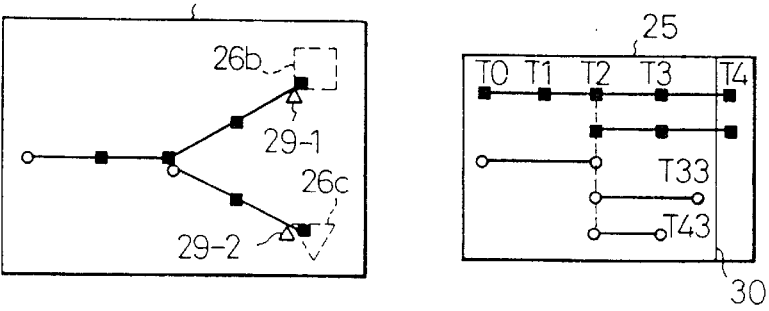

When the time cursor 30 moves further to pass the point of the time instant T43, as shown in FIG. 20C, the graphic 26c disappears. When the time cursor 30 passes the point of the time instant T33, as shown in FIG. 20D, the graphic 26b disappears.

In the foregoing graphic handling, the disappearance of the graphic 26a and the appearance of the graphics 26b and 26c are effected simultaneously. This is because the origins and terminals of the Gantt charts are related to the same time instant.

FIGS. 21A to 21D show an example of editing states in an embodiment of the present invention.

Figure 21A:
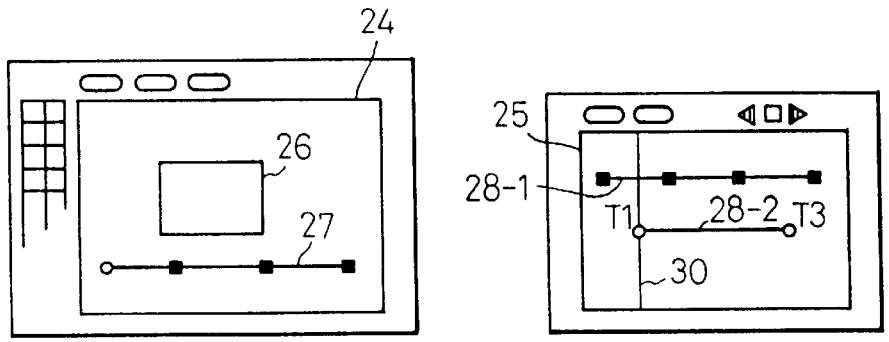

As shown in FIG. 21A, a graphic 26 whose states change is created in the graphic display area 24. A time display graphic or Gantt chart 28-2 is created in association with the graphic 26 in the time display area 25.

Figure 21B:
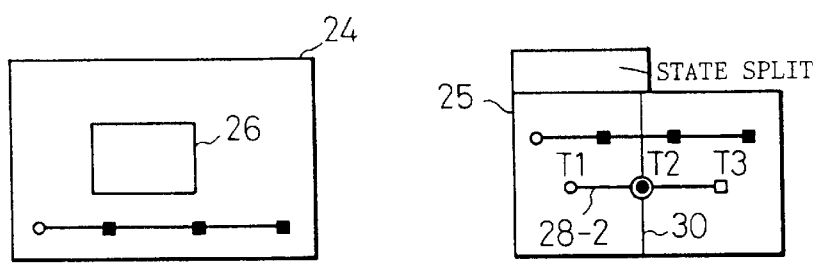

When states including a color are specified for the graphic 26, the position designating unit 12 is used to move the time cursor 30 to the point of the time instant T2 at which states are specified. A state split command is then, as shown in FIG. 21B, executed, whereby a state setting point appears on the Gantt chart 28-2.

Figure 21C:
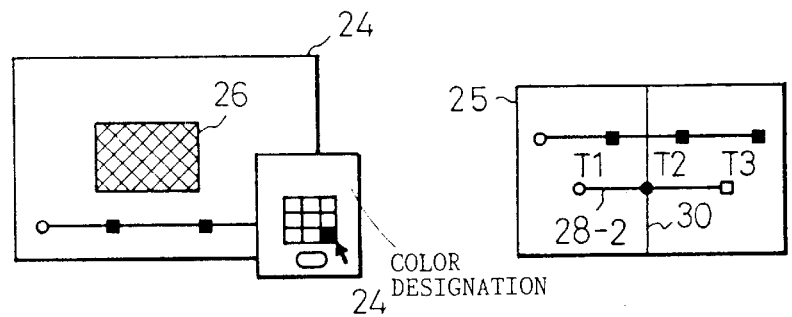

Next, as shown in FIG. 21C, necessary states such as a color and a brightness level of the graphic 26 are designated, whereby information for associating the states of the graphic 26 with the time instant T2 on the Gantt chart 28-2 is stored in the graphic information memory 13. The initial states thereof at the time instant T1 are stored in the graphic information memory 13 at the time of creation of the Gantt chart 28-2.

Figure 21D:
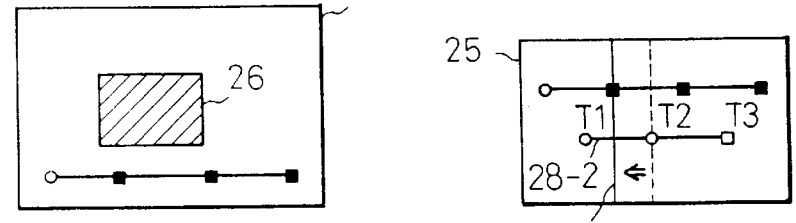

Thereafter, as shown in FIG. 21D, when the time cursor 30 is moved, the states (color in FIG. 21D) are automatically changed and displayed.

Figure 21E:
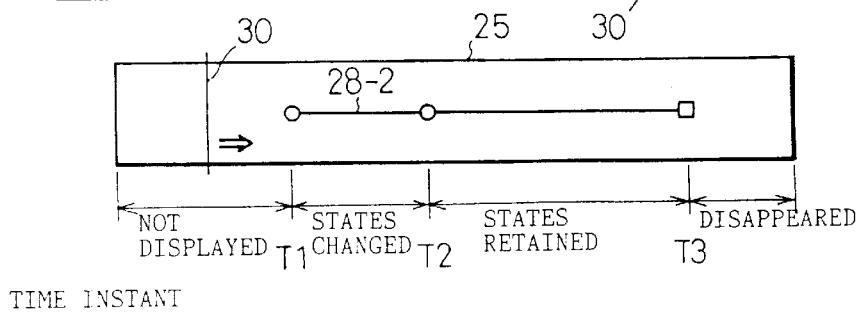

FIG. 21E show a relationship between the position of the time cursor 30 and the states of the graphic 26. When the time cursor 30 lies between a point of a time instant earlier than the time instant T1 and the point of the start time instant T1 of the Gantt chart 28-2, the graphic 26 is in a non-display state and is not displayed in the graphic display area 24. When the time cursor reaches the point of the time instant T1, the graphic 26 appears in the initial color. While the time cursor 30 is moving from the point of the time instant T1 to that of the time instant T2, the graphic 26 appears assuming intermediate states between the states set at the time instant T1 and those set at the time instant T2 according to the position of the graphic 26.

When the time cursor 30 lies between the point of the time instant T2 and that of the time instant T3 or the terminal of the Gantt chart 28-2, the states of graphic 26 set at the time instant T2 are retained. If new states are set at the time instant T3, the graphic 26 is displayed in intermediate states calculated by performing interpolation. After the time instant T3, the graphic 26 is deleted to disappear from the graphic display area 24.

FIGS. 21A to 21E show an example of editing the states of one graphic 26. This editing is executed for a plurality of graphics. When the states of the graphics are related to arbitrary points on Gantt charts associated with the graphics, the changes in state of the graphics can be manifested synchronously.

FIGS. 22A to 22D show examples of editing a Gantt chart in the second embodiment of the present invention.

A Gantt chart 28 in the time display area 25 can be edited using the time display editing means 21A shown in FIG. 16. This editing is, in principle, as shown in FIG. 7, executed according to the same sequence as normal graphic editing.

Figure 22A:
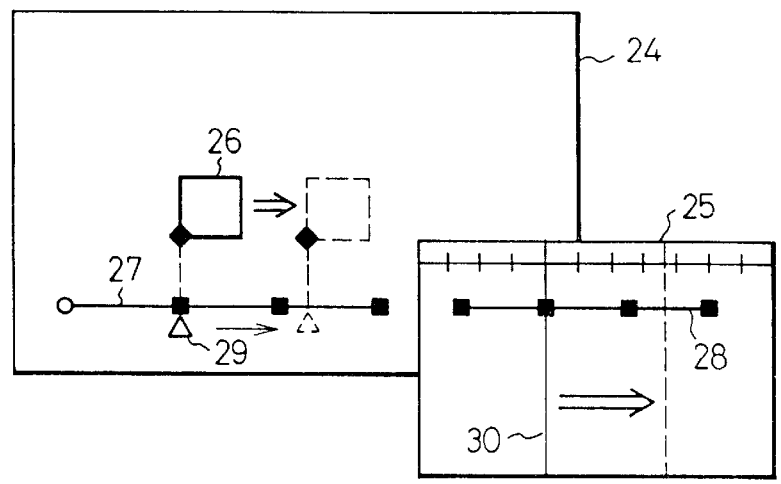

For example, as shown in FIG. 22A, when the time cursor 30 moves in the time display area 25, the position cursor 29 moves along the change reference graphic 27. In response to an ordinary operational command, the time cursor 30 moves at a constant speed. The moving speed of the position cursor 29 on the change reference graphic 27 can be varied by changing the space between adjoining points on the time display graphic 28. In short, the movement of the graphic 26 can be defined merely by editing the time display graphic 28 without editing the change reference graphic 27.

Figure 22B:
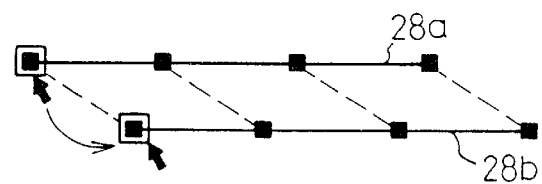

FIG. 22B shows an example of moving the Gantt chart 28 in the time display area 25. A Gantt chart 28a is dragged using a mouse cursor and moved to the position of a Gantt chart 28b.

Figure 22C:
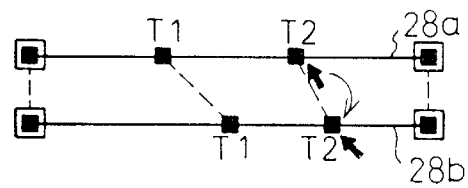

FIG. 22C shows movement of a specific portion of the Gantt chart 28. With the origin and terminal of the Gantt chart 28a fixed, when one point of the Gantt chart 28a (for example, a point of a time instant T2) is dragged, another point T1 is also moved by a length proportional to a distance to a fixed point. This results in a Gantt chart 28b.

Figure 22D:
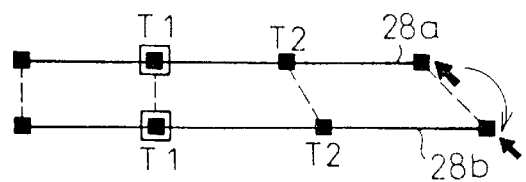

In FIG. 22D, the terminal of the Gantt chart 28 is dragged with the point of the time instant T1 fixed, and thus the portion of the Gantt chart 28 from the point of the time instant T1 to the terminal is stretched so that the Gantt chart 28 changes from the Gantt chart 28a to 28b. These editing operations can be executed selectively using menu commands.

FIGS. 23A to 23H are explanatory diagrams concerning relating of a plurality of Gantt charts.

Figure 23A:
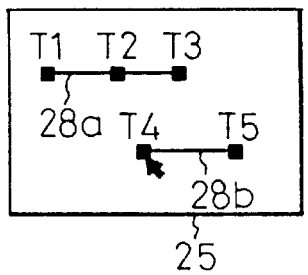
Figure 23B:
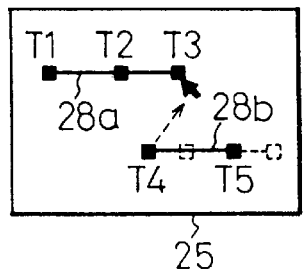

Assume that a point T3 on a Gantt chart 28a shown in FIG. 23A is related to a point T4 on a Gantt chart 28b. These two Gantt charts 28a and 28b are selected by clicking a button on a mouse. The mouse cursor is then positioned at the point T4, and then the mouse button is pressed. With the mouse button held down, as shown in FIG. 23B, the mouse cursor is moved to the point T3 to be related. The mouse button is then released. This handling is referred to as "dragging."

Figure 23C:
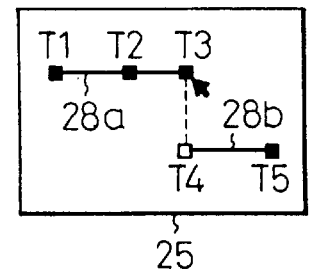

Thus, the point T4 is related to the point T3 as shown in FIG. 23C. The points T4 and T3 are aligned with each other at a position of the same time instant. Herein, the point T4 is referred to as a referencing point and the point T3 is referred to as a referenced point. Information concerning the relating process is stored in the graphic information memory 13. The referencing-referenced relationship is retained until relating process release is executed.

Figure 23D:
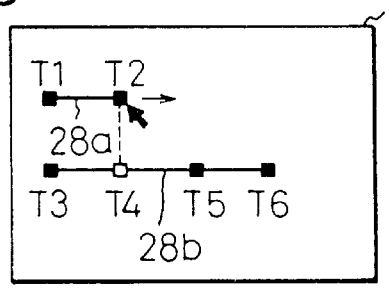

Assume that, as shown in FIG. 23D, the point T4 on the Gantt chart 28b is related to the point T2 on the Gantt chart 28a. The point T2 on the Gantt chart 28a is dragged using the mouse, whereby the whole of the Gantt chart 28a is moved right. Since the point T4 on the Gantt chart 28b is related to the point T2 on the Gantt chart 28a, the Gantt chart 28b also moves right as shown in FIG. 23E.

Figure 23F:
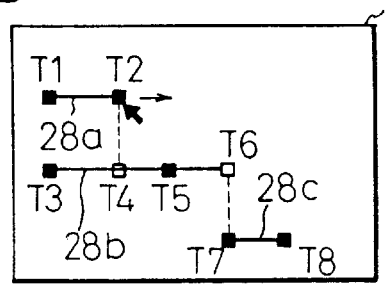
Figure 23E:
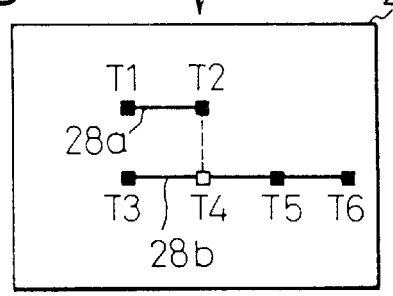

Assume that, as shown in FIG. 23F, the point T4 on the Gantt chart 28b is related to the point T2 on the Gantt chart 28a and the point T6 on the Gantt chart 28b is related to a point T7 on a Gantt chart 28c.

Figure 23G:
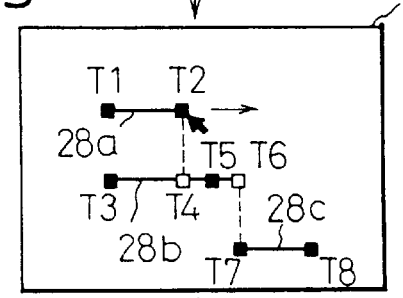
Figure 23H:
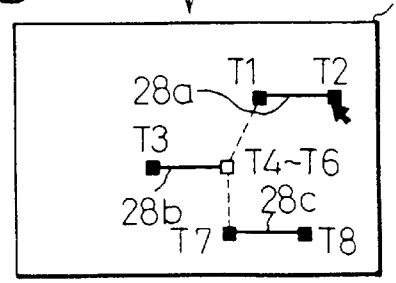

When the point T2 on the Gantt chart 28a is dragged right to move the Gantt chart 28a, the point T4 moves right together with the point T2. However, since a point T6 on the Gantt chart 28b is related to the point T7, the point T6 does not move. The distance between the points T4 and T6 is therefore reduced as shown in FIG. 23G. When the point T2 is further moved right, the points T4, T5, and T6 on the Gantt chart 28b coincide with one another as shown in FIG. 23H.

The fundamental data structure of graphic information to be placed in the graphic information memory 13 shown in FIG. 16 is identical to that shown in FIG. 8.

FIG. 24 show correlations of data in the second embodiment of the present invention, which is identical to FIG. 9.

Graphic headers 50-1, 50-2, and 50-3 are provided for general graphic information 14, change reference graphic information 15, and time display graphic information 16 respectively. Extent information described in conjunction with FIG. 8 is not illustrated in each graphic header in FIG. 24.

The change reference graphic information 15 includes position cursor information 52. The position cursor information 52 includes coordinates (x, y) of the position cursor 29, pointers pointing to point information of right and left adjacent points, and an internal-dividing ratio of the length between the two points with respect to the position cursor 29. The point information 51-3, 51-4, and 51-5 pointed to by the graphic header 50-2 are information concerning the points P0, P1, etc., in FIG. 17D.

The time display graphic information 16 is information concerning a Gantt chart 45-1 shown in FIG. 17D, comprising a graphic header 50-3, and point information 51-6, 51-7, etc. The time display graphic information 16 includes time cursor information, which is not shown, having the same data structure as the position cursor information 52. The point information 51-6, 51-7, etc., indicates the positions of the points T0, T1, etc., in FIG. 17D, and is associated with the point information 51-3, 51-4, etc., included in the change reference graphic information 15.

The graphic header 50-3 points to a current time indicator 53 and manages a current time instant.

As described previously, points on the graphic 26 can be related to other points including the position cursor 29. In the data correlation shown in FIG. 24, the point defined with the point information 51-1 is related to the position cursor 29. Pointers pointing to the point information 51-1 and are position cursor information 52 specified in the position cursor information 52 and point information 51-1 respectively. A type of a relationship (not shown) such as a relationship of deformation reference or rotation reference is also specified in the point information 51-1.

FIG. 24 shows one set of the general graphic information 14, change reference graphic information 15, time display graphic information 16, and relevant information thereof. This set of information is provided for each graphic 26, change reference graphic 27, and time display graphic 28. A plurality of sets of the general graphic information 14, change reference graphic information 15, and time display graphic information 16 are usually installed. In FIG. 24, a referencing-referenced relationship is defined between the general graphic information 14 and change reference graphic information 15. When Gantt charts are related as shown in FIG. 23, a referencing-referenced relationship is defined between each pair of a plurality of time display graphic information 16. The relationships are stored as pointers similarly to the relationship between the general graphic information 14 and change reference graphic information 15 shown in FIG. 24.

A data structure of the data indicating states used to manage information concerning state change is described in conjunction with FIGS. 21A to 21E.

Sequences of creating the change reference graphic 27 and Gantt chart 45 in this embodiment of the present invention are identical to those shown in FIGS. 11A and 11B. The Gantt chart 45 corresponds to the time display graphic 28 (FIGS. 11A and 11B).

As described in the examples of editing shown in FIGS. 17A to 19D, when an arbitrary graphic 26 is to be related to the change reference graphic 27, the processing shown in FIG. 11B is executed. Relating among a plurality of Gantt charts 45 is effected by executing the similar processing.

(a) Information required for creating a graphic is entered at the position designating unit 12.

(b) Time display graphic information 16 is created in association with a Gantt chart and displayed in the time display area 25.

(c) The relating process is executed according to the sequence shown in FIGS. 4A to 4D, whereby a reference mode such as deformation, movement, or rotation is entered and a referencing-referenced relationship is defined between a point on the graphic 26 and the position cursor 29 on the change reference graphic 27. This input information is reflected on the data structure shown in FIG. 8A. By entering the reference mode of deformation, movement, or rotation, it is designated how a graphic including a referencing point is changed with the movement of a referenced point. This is, however, not concerned with the second embodiment, of which a detailed description will be omitted.

(d) The position and shape at and in which the graphic 26 is displayed are calculated so that the designated referencing-referenced relationship can be retained irrelevant of the movement of the position cursor 29.

The processing of changing the graphic 26 time-sequentially is identical to that described in conjunction with FIG. 12. Time advance can be designated using the position designating unit 12 or by running an application program.

At a step S21, the position of the time cursor 30 is determined according to a designated current time instant or an automatically-advanced current time instant.

At a step S22, an internal-dividing ratio S of a length between points T1 and T2 preceding and succeeding the time cursor 30; that is, a dividing ratio of a distance of the time cursor 30 from the point T1 to a distance thereof from the point T2 is calculated using the point information 51-1 and 51-2 shown in FIG. 24.

At a step S23, the position of the position cursor 29 is determined on the basis of the points P1 and P2 on the change reference graphic 27 associated with the points of time instants T1 and T2, and the internal-dividing ratio S.

At a step S24, the position cursor information 52 shown in FIG. 24 is updated, and the position cursor 29 is moved to a new position on the change reference graphic 27.

At a step S25, it is determined whether any point is related to the position cursor 29. If any point is referencing the position cursor 29, the processing (f) is executed.

At a step S26, the graphic 26 having a referencing point is moved, rotated, or deformed according to the relationship between the position cursor 29 and referencing point. This processing is repeated for all graphics related to the position cursor 29.

A sequence of changing the states of the graphic 26 time-sequentially is described in conjunction with FIG. 13.

At a step S31, the position of the time cursor 30 is determined according to the designated current time instant or automatically-advanced current time instant.

At a step S32, an internal-dividing ratio of a length between points T1 and T2 immediately preceding and succeeding the time cursor 30; that is, a dividing ratio of a distance of the time cursor 30 from the point T1 to a distance thereof from the point T2 is calculated using the point information 51-1 and 51-2 shown in FIG. 24.

At a step S33, a state specification value of each state is interpolated on the basis of the state specification values associated with the points of time instants T and T2, and internal-dividing ratio S. Thus, the states of the graphic 26 are determined.

At a step S34, a relationship between the Gantt chart 45 and a position of a current time instant or a state specification value indicating appearance or disappearance are checked to determine whether the graphic 26 should disappear.

At a step S35, if the graphic 26 should not disappear, the graphic 26 is re-delineated according to the states calculated at the step S33.

At a step S36, if the graphic 26 should disappear, the graphic 26 is deleted from the graphic display area 24.

A time instant can be updated according to the procedure below.

(1) The time cursor 30 is moved to an arbitrary position in the time display area 25 using the position designating unit 12 such as a mouse.

(2) A time designation dialog window (not shown) is retrieved to enter a numerical value representing any time instant.

(3) Continuous Execution is selected from a menu, whereby a time instant is advanced by a certain time at intervals of a predetermined time unit.

(4) An application program is run to invoke a time setting function preprogrammed in the system. The function has, for example, the format below.

For designating continuous execution:
Set_Time (start-time, end-time, updating-speed or interval)
For not designating continuous execution:
Set—Time (set-time)

When continuous execution is designated, the start time instant, end time instant, and speed at which a time instant is advanced are specified as parameters. When continuous execution is not designated, a time instant to be updated is specified as a parameter.

As described above, according to the second embodiment of the present invention, a plurality of varying points of time instants are associated with one another in a time display area independent of a graphic display area so that a plurality of graphics can be time-sequentially changed in a synchronous and harmonious manner, and then the time instants at which the graphics change can be edited without the synchronism among the graphics. A plurality of graphics, which change time-sequentially and synchronously, can therefore be edited readily.

Next, the third embodiment will be described.

In conventional graphic editing, various editing operations must be designated in advance, and then a graphic to be deformed and a magnitude of deformation must be instructed. The procedure is complex and time-consuming. An object of the third embodiment devised to solve this problem is to provide an apparatus capable of executing various editing operations directly for a graphic without switching editing modes.

FIG. 25A shows facilities to explain the principle of operation of the third embodiment of the present invention.

In FIGS. 25A and 25B, reference numeral 110 denotes a processing unit comprising a CPU and a memory. 111 denotes a display unit for displaying graphics to be created or edited. 112 denotes a position designating unit for use in designating positions in a display screen; such as, a mouse or a keyboard. 113 denotes a graphic information memory. 114 denotes a graphic header containing graphic management information. 115 denotes point information that defines shapes of graphics. 116 denotes a bind point setting means. 117 denotes a graphic handling means. 118 denotes a grip display mode setting means. 119 denotes a grip displaying means. 120 denotes a bind point. 121 denotes a cursor indicating a handling position in a display screen.

Graphic information concerning each graphic to be displayed on the display unit 111 comprises the graphic header 114 and point information 115 concerning points constituting the graphic. According to the present invention, one point or a plurality of points on the graphic can be defined as a bind point or bind points. Information concerning a bind point or bind points is stored as an attribute or attributes of a graphic or a point in the graphic information memory 113.

The bind point setting means 116 defines one point or a plurality of points on a graphic to be edited as a bind point or bind points according to a designation made at the time of graphic creation or information entered at the position designating unit 112, and then specifies the bind point or points in graphic information.

The graphic handling means 117 effects graphic deformation on the basis of a positional relationship between a point on a graphic designated at the position designating unit 112 during graphic editing and a predetermined bind point on the graphic, and thus updates the graphic.

The grip display mode setting means 118 selects a mode in which candidate points, which may be designated during graphic editing, are displayed in a specific mode in which the candidate points are distinguished from other ordinary points. When a grip display mode is selected, the grip displaying means 119 displays a bind point or one of designation candidate points in a first specific style, and the other candidate points except the bind point in a second specific mode different from the first specific style. When the grip display mode is not selected, an original graphic alone is displayed.

When editing a graphic, the graphic handling means 117 holds a point on a graphic designated at the position designating unit 112, and moves the point to a designated position. At this time, the graphic handling means 117 references the graphic information memory 113 to determine deformation on the basis of a positional relationship between the designated point and a bind point. Specifically, when the designated point is a bind point, editing is executed to move the graphic together with the designated point. If the designated point lies on a predetermined side of the graphic but is not a bind point, editing is executed to rotate the graphic toward the designated point with the bind point as a center. When the designated point is neither a bind point nor lying on the predetermined side of the graphic, editing is executed to deform the graphic in the moving direction of the designated point according to a positional relationship between the designated point and bind point.

When the grip display mode setting means 118 sets the grip display mode, the grip displaying means 119 displays candidates points on the graphic, which may be designated, with specific easy-to-see marks. This contributes to easy operation. A bind point and other designation candidate points are displayed with mutually different marks.

A bind point can be defined on each graphic beforehand. For example, as shown in FIG. 25B, the left upper vertex of a rectangular graphic is defined as the bind point 120.

In graphic editing, the cursor 121 is positioned, as shown in FIG. 25B(a), to indicate the bind point 120. With the cursor 121 held at the bind point 120, the cursor is moved. The whole rectangular graphic is then moved together with the bind point 120 to a destination of the cursor 121. When the cursor 121 is, as shown in FIG. 25B(b), positioned to indicate a point on a side of the graphic and then moved, the rectangular graphic rotates in the moving direction of the cursor 121 with the bind point 120 as a center. When the cursor 121 is, as shown in FIG. 25B(c), positioned to indicate the lower right vertex diagonal to the bind point 120 and then moved, the rectangular graphic is enlarged (or reduced) so that the lower right vertex comes to the destination of the cursor 121. Even when any other point is handled, the rectangular graphic is deformed according to a positional relationship between the point and bind point 120.

According to prior arts, an editing operation such as movement or rotation must be designated in advance, and then a reference point of deformation and a magnitude of deformation must be designated one after another. According to the present invention, an editing operation is automatically selected according to a positional relationship between a designated point on a graphic and the bind point 120. This obviates the necessity of designating an editing operation. Various editing operations can be performed directly on a graphic. In short, various editing operations can be executed merely by dragging a point using a mouse cursor or the like.

The bind point 120 is defined as an attribute of a graphic itself but not as an attribute of an operation. The bind point 120 need therefore not be designated for each operation. A graphic can be deformed freely merely by handling one point on the graphic. Thus, operability is excellent. A graphic can be moved, rotated, or deformed merely by dragging one point on the graphic using a mouse cursor or the like. This allows an operator to handle a graphic with a natural sense.

FIG. 26A shows an example of a data structure of graphic information in the third embodiment of the present invention.

Graphic information is, as shown in FIG. 26A, composed of a graphic header 114, and a set of point information 115-1, 115-2, etc., defining a shape of a graphic. The graphic header 114 includes information concerning a rectangular zone occupied by a graphic (which is referred to as an extent), the number of points, and a pointer pointing to the point information 115 located at a leading address. The graphic header 114 further includes a pointer pointing to a point defined as the bind point 120.

If a graphic is, for example, a polygon shown in FIG. 26B, the extent is a rectangular zone indicated with a dashed line. Extent information included in the graphic header 114 consists of coordinates (x0, y0) of a point at a left upper corner of the extent, a width w of the extent, and a height h of the extent. The point information 115 includes coordinates (x1, y1), (x2, y2), etc., of vertices of the polygon, and a pointer of the next point. If necessary, other various attributes may be specified in the graphic header 114 and point information 115.

In an example shown in FIGS. 26A and 26B, a point (x2, y2) specified in the point information 115-2 is defined as the bind point 120.

FIGS. 27A to 27J show examples of graphic handling in the third embodiment of the present invention. In the drawings, reference numeral 130a denotes a handling start point, and 130b denotes a handling end point.

Figure 27A:
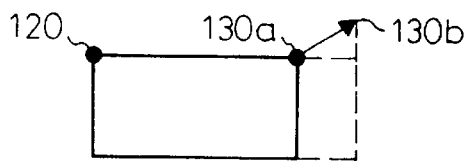

An upper left vertex of a two-dimensional graphic shown in FIG. 27A is defined as the bind point 120. A point adjacent to the bind point 120 on the same side is regarded as the handling start point 130a. The handling start point 130a is dragged to the position of the handling end point 130b using the position designating unit 112 shown in FIG. 25A. The graphic handling means 117 performs single-axis deformation on the rectangle according to a positional relationship between the bind point 120 and handling start point 130a, and thus extends the rectangle as indicated with a dashed line in FIG. 27A.

Figure 27B:
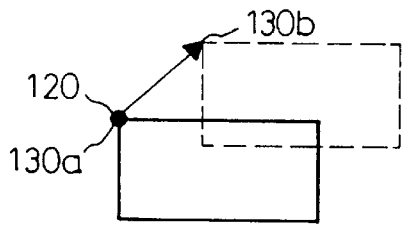

When the handling start point 130a coincides with the bind point 120, as indicated with a dashed line in FIG. 27B, the whole graphic is moved in parallel until the bind point 120 reaches the handling end point 130b.

Figure 27C:
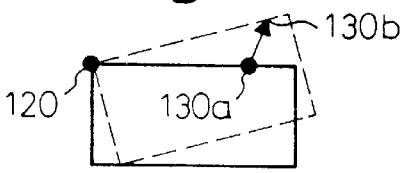

When the handling start point 130a is a point on a side but not a vertex, as shown in FIG. 27C, the graphic is rotated toward the handling end point 130b with the bind point 120 as a center.

Figure 27D:
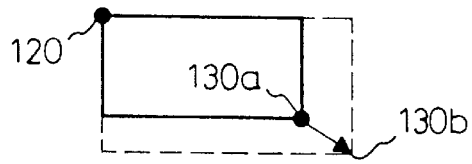

When the handling start point 130a is diagonal to the bind point 120, as shown in FIGS. 27D, the rectangle is subjected to dual-axis deformation; that is, to similar transformation deformation (enlargement or reduction) so that the handling start point 130a comes to the position of the handling end point 130b.

When a graphic is three-dimensional, deformation is effected on the basis of a positional relationship between the bind point 120 and handling start point 130a. An example will be described below.

Figure 27E:
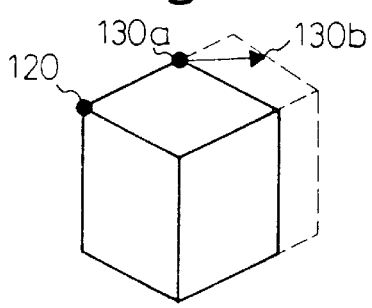

FIG. 27E shows an example of single-axis deformation. When the handling start point 130a is adjacent to the bind point 120 on the same side, the parallelepiped or three-dimensional graphic is stretched toward the handling end point 130b.

Figure 27F:
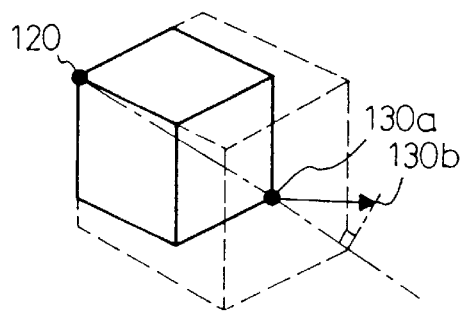

When the handling start point 130a is diagonal to the bind point 120 but not lie on the same plane as the bind point 120, as shown in FIG. 27F, the three-dimensional graphic is subjected to triple-axis similar transformation deformation, and thus the whole graphic is enlarged or reduced.

Figure 27G:
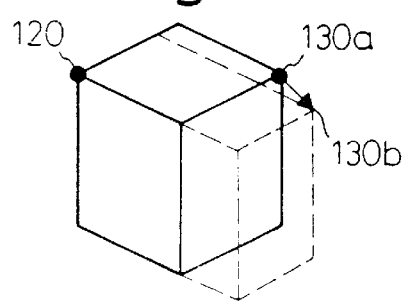

When the handling start point 130a is diagonal to the bind point 120 and lies on the same plane as the bind point 120, as shown in FIG. 27G, the three-dimensional graphic is subjected to dual-axis deformation so that the handling start point 130a comes to the position of the handling end point 130b. Thus, the length and width of the graphic are stretched or shrunken.

Figure 27H:
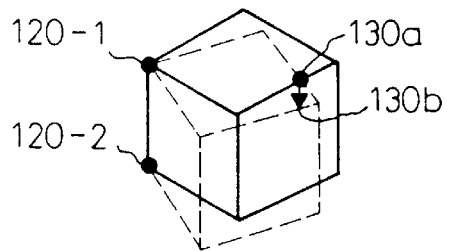

FIG. 27H shows an example of single-axis rotation. In this example, two points are defined as bind points; a bind point 120-1 and a bind point 120-2. A point on a side of the graphic is defined as the handling start point 130a. The handling start point 130a is then dragged to the position of the handling end point 130b, whereby the three-dimensional graphic rotates with a line linking the bind points 120-1 and 120-2 as a center axis as indicated with a dashed line.

Figure 27I:
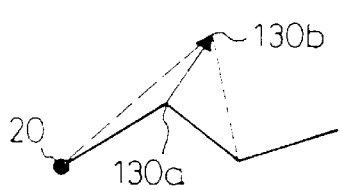
Figure 27J:
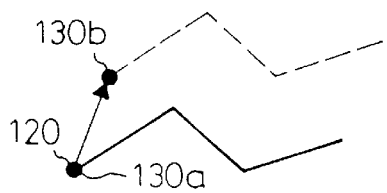

FIGS. 27I and 27J show examples of editing a continuous line. For example, as shown in FIG. 27I, a vertex that is not the bind point 120 is defined as the handling start point 130a. The handling start point 130a is then dragged to the position of the handling end point 130b, whereby single-point deformation is performed to deform the graphic. When the handling start point 130a coincides with the bind point 120, as shown in FIG. 27I, the whole graphic is moved in parallel.

FIGS. 28A to 28C are explanatory diagrams concerning display of grips in the third embodiment of the present invention.

According to the present invention, graphic deformation is effected on the basis of a positional relationship between a bind point and the handling start point 130a described in conjunction with FIGS. 27A to 27J. Which point on a graphic is a bind point and which points may be designated must be discernible immediately in a screen of the display unit 111 at least until graphic creation or editing is completed.

In this embodiment, a candidate point that may be designated during graphic editing is regarded as a "grip." The grip can be displayed with a particular mark. The grip includes a bind point grip representing a bind point and a normal grip representing a point that is not a bind point.

When a point is not selected as a handling object at the position designating unit 112 shown in FIG. 25A, a normal grip is displayed as a square mark as shown in FIG. 28A(*a*), while a bind point is displayed as a rhomboid graphic as shown in FIG. 28A(*b*). When these points are selected as handling objects at the position designating unit 112, the marks are enlarged as shown in FIGS. 28A(*c*) and (*d*). For example, a bind point grip may be displayed as a circle, or all marks may be distinguished using different colors.

These marks usually become unnecessary after graphic creation or editing is completed. In this embodiment, when a graphic to be handled is selected, grips are displayed automatically. Thereafter, either a grip non-display mode or a grip display mode can be selected by operating a menu or entering a command. In the grip non-display mode, when a graphic is a rectangle, as shown in FIG. 28B, the shape of the graphic alone is displayed. When the grip display mode is selected, as shown in FIG. 28C, the bind point 120 and other handling object points are displayed in the styles of grips shown in FIG. 28A.

In this example, nine grips are set on a rectangular graphic. When a graphic is, for example, a circle (not shown), nine grips are set at positions corresponding to those of the grips on the circumscribing rectangle.

FIGS. 29A to 29C are explanatory diagrams concerning the third embodiment of the present invention.

FIG. 29A shows an example of bind point setting. When a graphic is created (step S41), a point on the graphic predetermined as a system default is defined as a bind point and specified in the graphic header 114 shown in FIG. 26 (step S42).

An additional bind point can be created or a bind point can be changed depending a way of handling. For example, when designation of a bind point change is detected at the step S43, bind point information in the graphic header 114 is modified at a step S44.

FIG. 29B shows an example of grip display-mode setting. Using a menu or the like, a grip display (non-display) mode can be designated. At a step S51, the designated grip display (non-display) mode is established. Based on the determination made at a step S52, either the grip display or non-display modes are selected. If the grip display mode is selected, the grips shown in FIG. 28C are displayed at a step S53.

FIG. 29C shows an example of processing related to graphic editing. At a step S61, a designated graphic to be handled is selected. Next, a point on the designated graphic is held intact and dragging is started at a step S62. In the dragging process, a point, which is indicated with a mouse cursor by pressing a button of a mouse or the like, is held intact, and the mouse cursor moved with the mouse button held down to move the point. At a step S63, a positional relationship between a bind point and a handling start point is analyzed for dragging. According to the positional relationship, the graphic is moved (step S64), rotated (step S65), or deformed (step S66). The graphic resulting from the operation is processed at a step S67, and re-delineated in a screen on the display unit 111.

FIG. 30 is an explanatory diagram concerning handling of a three-dimensional graphic in the third embodiment of the present invention. FIG. 30 details the process shown in FIG. 29C. As for graphics except three-dimensional ones, a predetermined deformation operation is executed according to a positional relationship between a handling start point that is a dragging start point and a bind point.

(a) When a grip on a graphic in a display screen is selected by clicking a button on a mouse, the grip is detected and regarded as a dragging start point (S71).

(b) The graphic information memory 113 is referenced to determine whether the dragging start point is a bind point (S72). If the dragging start point is a bind point, editing is executed to move the whole graphic in parallel to a dragging end point (S73). Control is then passed to a step S81.

(c) When the dragging start point is not a bind point, it is determined whether the dragging start point lies on a side of the three-dimensional graphic (S74). If the dragging start point lies on a side of the three-dimensional graphic, editing is executed to rotate the graphic with a bind point as a center (S75). Control is then passed to a step S81.

(d) When the dragging start point coincides with a point adjacent to the bind point and lies on the same side of the graphic as the bind point, the graphic is rotated with the bind point as a center (S76). Single-axis deformation is executed to deform the graphic in a direction of an extension of the side having the point with respect to the bind point (S77). Thereafter, control is passed to a step S81.

(e) When the dragging start point is diagonal to the bind point on the plane containing the bind point but not lying on the same side of the graphic as the bind point (S78), dual-axis deformation is executed to deform the graphic on an extension of the plane (S79). Control is then passed to a step S81.

(f) When the dragging start point lies in any other place, triple-axis similar-transformation deformation is executed to enlarge or reduce the graphic with the shape unchanged (S80). Thereafter, control is passed to the step S81, and then the processing terminates (S82).

(g) The graphic resulting from the deformation is re-delineated in a screen (S81).

Needless to say, the present invention is not limited to the system shown in FIG. 15 but may be implemented in an ordinary general-purpose computer, a workstation-type computer, a general personal computer, or the like.

As described above, according to the third embodiment of the present invention, editing modes of rotation, movement, and deformation need not be switched but various editing operations can be executed by directly handling a graphic. Various editing operations can be executed merely by selecting a point on a graphic and moving the point. Eventually, an editing facility offering a natural sense of handling can be rendered to a user.

Next, a graphic relating-based editing method and apparatus of the fourth embodiment will be described, wherein a plurality of graphics can be created or edited by relating graphic elements to one another.

In the fourth embodiment of the present invention, a group of graphics having a certain relationship can be treated as a part with the positional relationship unchanged. When the graphic elements or mutually-related graphics are edited individually, the related graphics are automatically edited as a whole without causing a discrepancy according to the type of relationship.

FIGS. 31A, 31B, and 31C are explanatory diagrams concerning the principle of operation of the fourth embodiment of the present invention. An apparatus of the fourth embodiment comprises a processing unit, a display unit, and a position designating unit.

In FIGS. 31A to 31C, reference numeral 210 denotes a processing unit comprising a CPU and a memory. 211 denotes a display unit for displaying graphics to be created or edited. 212 denotes a position designating unit for use in designating positions in a display screen; such as, a mouse or a keyboard. 213 denotes a graphic information memory. 214A and 214B denote graphic headers including management information concerning graphics. 215A and 215B denote shape determination point information concerning points that determine shapes of graphics. 216 denotes referenced point information concerning a point related to a shape determination point of another graphic. 217 denotes a relating means. 218 denotes a graphic handling means. 220A and 220B denote graphics to be edited. 221 denotes a referencing point. 222 denotes a referenced point defined in relation to the referenced point 221. 223 denotes a predetermined bind point on a graphic.

Graphic information concerning each graphic, which is to be displayed on the display unit 211, comprises the graph header 214 and shape determination point information 215 that determines a shape of the graphic. In this embodiment, when a certain point on a graphic is related to a shape determination point on another graphic, the information is stored as the referenced point information 216 in the graphic information memory 213. The shape determination point on another graphic related to the referenced point is referred to as a referencing point.

When a referencing-referenced relationship between a shape determination point that determines a shape of a graphic and any point on another graphic is entered at the position designating unit 212, the relating means 217 creates the referenced point information 216 and specifies a pointer in the referenced point information 216 in the shape determination point information 215.

When the referenced point moves with the movement or deformation of the graphic including the referenced point, the graphic handling means 218 moves the referencing point, which references the referenced point, in harmony with the referenced point, and thus performs editing of moving or deforming the graphic having the referencing point.

The process in the fourth embodiment of the present invention is executed as described below.

When a command stating that a referencing-referenced relationship should be established between the referencing point 221 on the graphic 220B shown in FIG. 31B and the referenced point 222 on the graphic 220A is entered at the position designating unit 212, the relating means 217 creates the referenced point information 216 including the position of the referenced point 222, and specifies a pointer pointing to the referenced point information 216 in the shape determination point information 215 defining the referencing point 221.

When editing is performed on the graphic 220A to move the graphic 220A, for example, as shown in FIG. 31C, the referenced point 222 moves. When detecting the movement of the referenced point 222, the graphic handling means 218 references the referenced point information 216 to retrieve the shape determination point information 215 concerning the referencing point 221 that references the referenced point 222, moves the referencing point 221 in harmony with the referenced point 222, and thus moves or deforms the graphic 220B having the referencing point 221. In an example shown in FIG. 31C, as the referenced point 222 is moved up, the referencing point 221 moves up and the graphic 220B deforms. In this example, since the right corner point on the bottom side of the graphic 220B is pre-defined as the bind point 223, the bind point 223 does not therefore move. The graphic 220B deforms to stretch longitudinally.

The referencing-referenced relationship includes relationships of rotation, deformation, and similar transformation deformation for enlargement or reduction. The type of a relationship is determined by entering a relating command or a positional relationship between the bind point 223 and referencing point 221 on the same graphic. The bind point 223 can be pre-determined for each graphic and may comprise one point or a plurality of points. The information is stored in the graphic information memory 213.

When the referencing point 221 has a relationship of rotation reference to the referenced point 222, the graphic 220B having the referencing point 221 rotates with, for example, the bind point 223 as a center with the movement of the referenced point 222. When the referencing point 221 has a relationship of deformation referenced to the referenced point 222, the graphic 220B having the referencing point 221 deforms, for example, as shown in FIG. 31C with the movement of the referenced point 222. When the referencing point 221 has a relationship of similar transformation deformation referenced to the referenced point 222, the graphic 220B having the referencing point 221 deforms to enlarge or reduce with the movement of the referenced point 222.

According to the present invention, a point determining the shape of the graphic 220B is regarded as the referencing point 221, and related to the referenced point 222 on another graphic 220A. The relationship is specified in the graphic information memory 213. When the graphic 220A is deformed or moved by performing editing at the position designating unit 212, the graphic 220B having the referencing point 221 is deformed or moved so that the predetermined relationship can be held intact.

When another shape determination point of the graphic 220B having the referencing point 221, for example, the bind point 223 is moved down using the position designating unit 212, since the relationship between the referencing point 221 and referenced point 222 is held intact, the graphic 220B can be deformed to stretched down.

FIG. 32 shows an example of a data structure of graphic information in the fourth embodiment of the present invention.

The referencing-referenced relationship between the graphics 220A and 220B shown in FIG. 32A is managed in the form of the data structure shown in FIG. 32B.

Graphic headers 214A and 214 are provided for graphics. The graphic header 214A (or 214B) consists of information concerning a rectangular zone occupied by the graphic (which is referred to as an extent) and other information including the number of shape determination points and a pointer pointing to shape determination information 215A located at a leading address. The graphic header further includes a pointer pointing to the information concerning a shape determination point defined as a bind point on the graphic.

The extent of the graphic 220A shown in FIG. 32A is a zone indicated with a dashed line. The extent information in the graphic header 14A consists of coordinates (x0, y0) of an upper left corner point of the extent, a width w of the extent, and a height h of the extent. The shape determination point information 215A includes coordinates (x1, y1) of a vertex of the graphic 220A and a pointer pointing to point information concerning the next point. The area containing the shaped determination point information 215A has fields in which a pointer of referenced information and a reference mode are placed when the shape determination point is a referencing point related to a point on another graphic.

The shape determination point information 215B in FIG. 32B is concerned with a shape determination point related to the referencing point 221 in FIG. 32A. The referenced point information 216 is concerned with the referenced point 222. The referenced point 222 is not necessarily a shape determination point but a point dependent on shape determination points on the graphic 220A. Assuming that the position of the referenced point 222 is dependent on three shape determination points a, b, and c, pointers pointing to the point information concerning the three points, and degrees of dependency on the points; $k_a$, $k_b$, and $k_c$ are specified in the referenced point information 216.

Assume that, as shown in FIG. 32C, the coordinates of the points a, b, and c are indicated as $(x_a, y_a)$, $(x_b, y_b)$, and $(x_c, y_c)$ and the coordinates of the referenced point 222 is indicated as $(x_p, y_p)$. The degrees of dependency on the three points; $k_a$, $k_b$, and $k_c$ are given by the following simultaneous equations:

$$x_a k_a + x_b k_b + x_c k_c = x_p$$

$$y_a k_a + y_b k_b + y_c k_c = y_p$$

$$k_a + k_b + k_c = 1$$

The referenced point information 216 is created dynamically by the relating means 217, and includes a pointer pointing to the shape determination point information 215B defining the referencing point 221. The shape determination point information 215B has a pointer pointing to the referenced point information 216. When the graphic 220A has a plurality of referenced points, the referenced point information 216 includes a pointer pointing to point information concerning the next referenced point.

FIGS. 33A to 33G show an example of deformation reference in the fourth embodiment of the present invention. In the drawings, reference numeral 230 denotes a cursor indicating a position in a screen to be handled. 231 denotes an area containing icons used to designate various operations. 232 denotes a display screen.

Figure 33A:
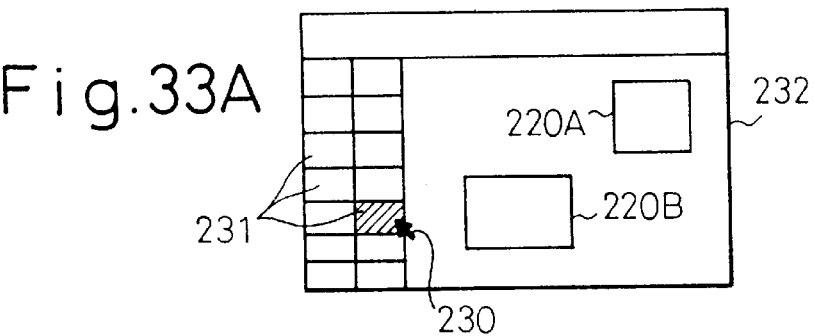

A mouse is employed as the position designating unit 212 shown in FIG. 31. The cursor 230 changes its position depending on how the mouse is handled. As shown in FIG. 33A, an icon 231 for instructing deformation reference is selected, and graphics 220A and 220B to be related mutually are selected.

Figure 33B:
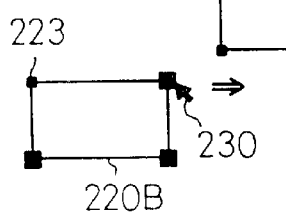
Figure 33C:
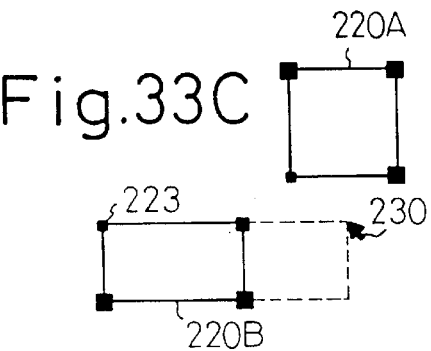

For relating an upper right shape determination point of the graphic 220B to a point on the lower side of the graphic 220A, as shown in FIG. 33B, the cursor 230 is moved to the upper right point of the graphic 220B, and then a button on the mouse is pressed. With the mouse button held down, as shown in FIG. 33C, the cursor 230 is moved. Moving the cursor 230 with the mouse button held down is referred to as dragging.

Figure 33D:
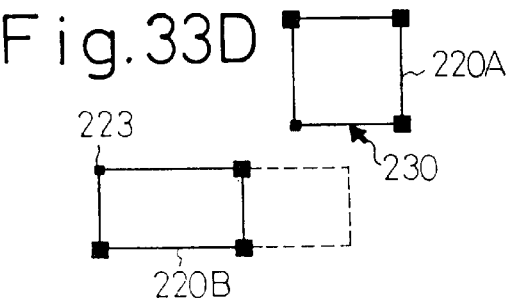
Figure 33E:
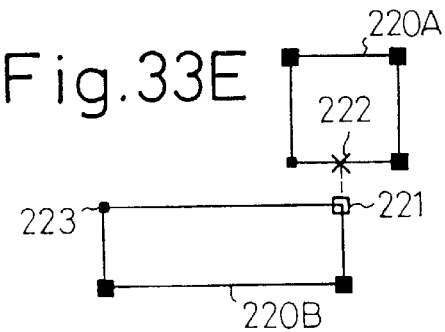

As shown in FIG. 33D, the cursor 230 is moved to a point to be related on the graphic 220A, and then dragging is terminated. As shown in FIG. 33E, the dragging end point is recognized as the referenced point 222. The graphic 220B is then deformed so that the dragging start point on the graphic 220B; that is, the referencing point 221 can be aligned with the referenced point 222.

When relating is designated, the relating means 217 shown in FIG. 31 executes the foregoing process, and specifies in the graphic information memory 213 information indicating that the referencing-referenced relationship between the referencing point 221 and referenced point 222 is a relationship of deformation reference.

Figure 33F:
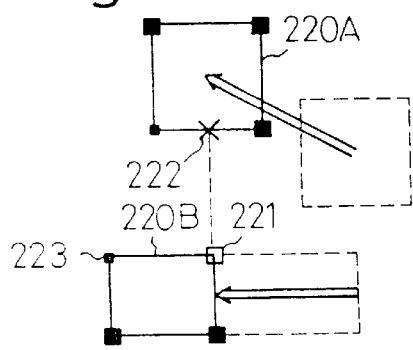
Figure 33G:
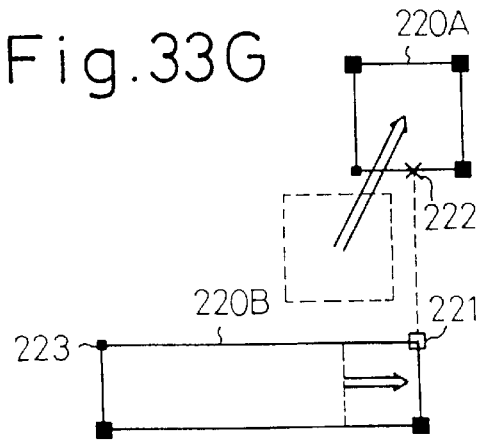

After the above relating is performed, when, for example, as shown in FIG. 33F, the graphic 220A is moved left, the referenced point 222 moves left. Accordingly, the referencing point 221 moves, whereby the graphic 220B is automatically edited so as to reduce the lateral width thereof. When the graphic 220A moves right as shown in FIG. 33G, the referencing point 221 moves right. The graphic 220B is deformed to become elongated. The above graphic handling operation is executed by the graphic handling means 218 shown in FIG. 31 according to the referencing-referenced relationship read from the graphic information memory 213.

FIGS. 34A to 34E show an example of rotation reference in the fourth embodiment of the present invention. Similarly to the example shown in FIGS. 33A to 33G, a mouse is employed as the position designating unit 212 and the cursor 230 changes the position thereof depending on how the mouse is handled.

Figure 34A:
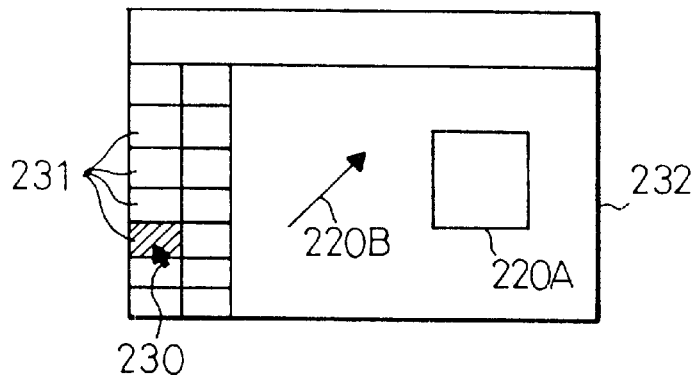

As shown in FIG. 34A, the cursor 230 is moved to select an icon 231 indicating rotation reference and also select graphics 220A and 220B to be related mutually.

Figure 34B:
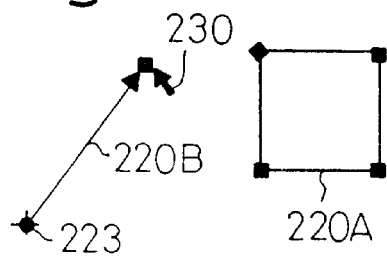
Figure 34C:
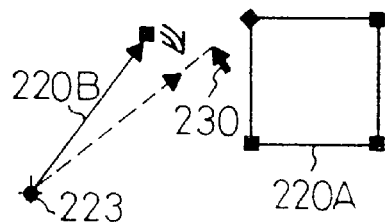

For relating enabling the tip of the arrow of the graphic 220B; that is, a shape determination point to always face a point on the left side of the graphic 220A, as shown in FIG. 34B, the cursor 230 is moved to the tip of the arrow of the graphic 220B, and then a button on the mouse is pressed. With the mouse button pressed, as shown in FIG. 34C, dragging is carried out. The dragging causes the graphic 220B to rotate. Thus, rubber-banding is achieved as indicated with a dashed line.

Figure 34D:
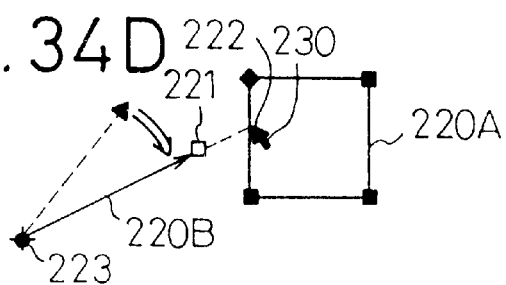

When the dragging is completed at a point to be related on the graphic 220A, as shown in FIG. 34D, the graphic 220B rotates to face the dragging end point (referenced point 222) on the graphic 220A, and then reappears.

In order to maintain the above relationship, the relating means 217 shown in FIG. 31 specifies in the graphic information memory 213 the referencing-referenced relationship between the referencing point 221 and referenced point 222 and the information indicating that the referencing-referenced relationship is a relationship of rotation reference.

Figure 34E:
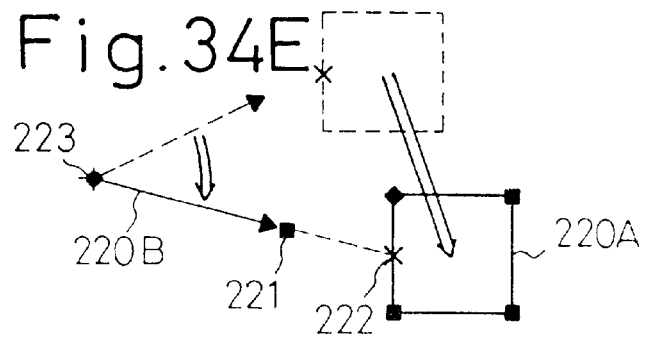

After the graphics are related, when the graphic 220A is moved down in such a manner as, for example, as shown in FIG. 34E, the referenced point 222 and referencing point 221 are moved in harmony by the graphic handling means 218 according to the relationship of rotation reference. The graphic 220B is thus rotated so that the referencing point 221 at the tip of the arrow of the graphic 220B faces the referenced point 222.

FIGS. 35A and 35B show an example of similar transformation deformation in the fourth embodiment of the present invention.

Similar transformation deformation is an operation of enlarging or reducing the graphic 220B having the referencing point 221 with the movement of the referenced point 222. When similar transformation deformation is designated, as shown in FIG. 35A, the referencing point 221 on the graphic 220B is related to the referenced point 222 on the graphic 220A according to a procedure similar to that shown in FIGS. 33A to 33G or FIGS. 34A to 34E. The referencing means 217 sets in the graphic information memory 213 the referencing-referenced relationship between the referencing point 221 and referenced point 222 and the information indicating that the referencing-referenced relationship is a relationship of similar transformation deformation reference.

After the graphics are related, when the graphic 220A is moved in such a manner as, for example, shown in FIG. 35B, the referencing point 221 is moved in harmony with the referenced point 222 by the graphic handling means 218 according to the relationship of similar transformation deformation. A new position of the referencing point 221 is then calculated, whereby the graphic 220B is enlarged or reduced.

FIGS. 36A and 36B show an example of movement reference in an embodiment of the present invention.

Movement reference is a form of deformation reference. When deformation reference is executed, if the bind point 223 on the graphic 220B is selected as the referencing point 221 as shown in FIG. 36A; that is, the bind point 223 coincides with the reference point 221, the deformation reference is referred to as movement reference.

For movement reference, as shown in FIG. 36B, when the graphic 220A having the referenced point 222 moves, editing is executed to move the graphic 220B as it is according to the relationship between the referencing point 221 and referenced point 222.

FIGS. 37A to 37J show examples of deformation based on a bind point in an embodiment of the present invention.

As described in the example shown in FIGS. 33A to 33G and others, a reference mode is designated by selecting a corresponding icon 231. Thus, rotation or deformation can be determined. Alternatively, deformation may be effected according to a positional relationship between the bind point 223 and referencing point 221.

In FIGS. 37A to 37J, the position of a referencing point 221a represents a position at which a referencing point lies before a referenced point moves. The position of a referencing point 221b represents a virtual position in a direction in which the referencing point is dragged with the movement of the referenced point.

Figure 37A:
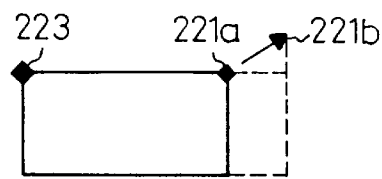

It is assumed that an upper left point of a two-dimensional graphic shown in FIG. 37A is defined as the bind point 223 and an adjacent point on the side of the graphic on which the bind point 223 lies is the referencing point 221a. With the movement of a referenced point (not shown), the referencing point 221a is dragged to the position of the referencing point 221b, the graphic handling means 218 recognizes the necessity of single-axis deformation on the basis of the positional relationship between the bind point 223 and referencing point 221a, and executes deformation of dragging the rectangle as indicated with a dashed line in FIG. 37A.

Figure 37B:
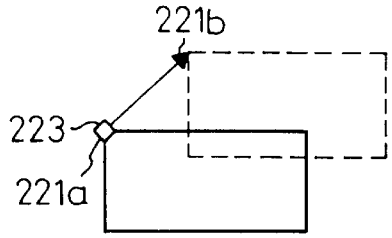

When the referencing point 221a coincides with the bind point 223, as indicated with a dashed line in FIG. 37B, the whole graphic is moved in parallel together with the bind point 223 (referencing point) with the movement of the referenced point.

Figure 37C:
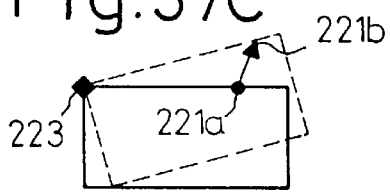

When the referencing point 221a is not a vertex but a point on a side of the graphic, as shown in FIG. 37C, the graphic is rotated toward the referencing point 221b or the referenced point with the bind point 223 as a center.

Figure 37D:
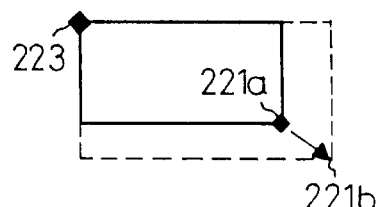

As shown in FIG. 37D, when the referencing point 221a is diagonal to the bind point 223, the rectangular graphic is subjected to dual-axis deformation; that is, similar transformation deformation (enlargement or reduction) so that the referencing point 221a comes to the position of the referencing point 221b.

When the graphic is a three-dimensional graphic, deformation is effected according to the positional relationship between the bind point 223 and referencing point 221a as described below.

Figure 37E:
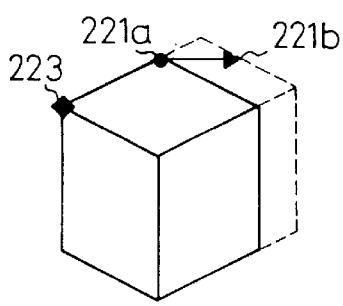

FIG. 37E shows an example of single-axis deformation. When the referencing point 221a adjoins the bind point 223 and lies on the same side as the bind point 223, the parallelepiped graphic is dragged toward the referencing point 221b.

Figure 37F:
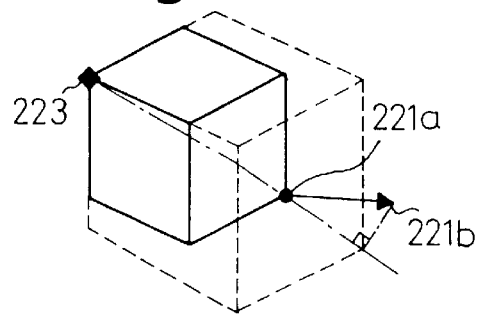

When the referencing point 221a is diagonal to the bind point 223 but not lying on the same plane as the bind point 223, as shown in FIG. 37F, the three-dimensional graphic is subjected to triple-axis similar transformation deformation. Thus, the whole graphic is enlarged or reduced.

Figure 37G:
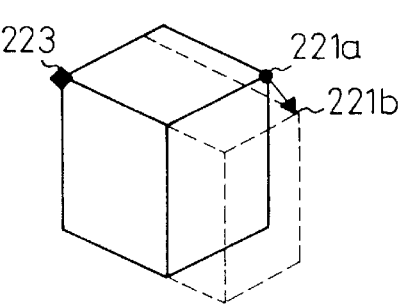

When the referencing point 221a is diagonal to the bind point 223 and lying on the same plane as the bind point 223, as shown in FIG. 37G, dual-axis deformation is executed so that the referencing point 221a comes to the position of the referencing point 221b. Thus, the graphic is stretched or shrunken lengthwise or sideways.

Figure 37H:
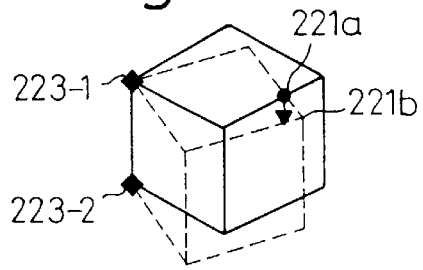

FIG. 37H shows an example of single-axis rotation. In this example, two points are defined as bind points; a bind point 223-1 and a bind point 223-2. A point on a side of the graphic is the referencing point 221a. When the referencing point 221a is dragged to the position of the referencing point 212b with the movement of a referenced point, the three-dimensional graphic is rotated as indicated with a dashed line with an axis linking the bind points 223-1 and 223-2 as a center.

Figure 37I:
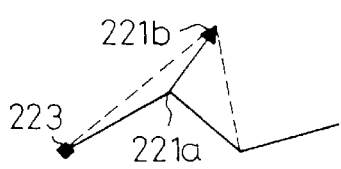
Figure 37J:
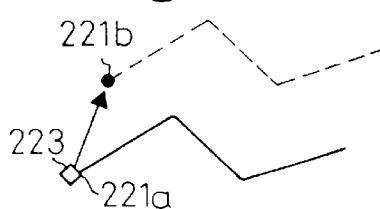

FIGS. 37I and 37J show examples of reference editing for a continuous line. Assuming that, as shown in FIG. 37I, a vertex different from the bind point 223 is regarded as the referencing point 221a, as a referenced point moves, single-axis deformation is executed to deform the graphic so that the referencing point 221a comes to the position of the referencing point 221b. When the referencing point 221 coincides with the bind point 223, as shown in FIG. 37J, the whole graphic is moved in parallel.

FIGS. 37A and 37B show examples of deformation of a graphic that references a referenced point. In this embodiment, even when the shape determination point is dragged from the position of the referencing point 221a to that of the referencing point 221b using a mouse or the like, deformation is effected to edit the graphic in the same manner as mentioned above.

FIGS. 38A to 38C are explanatory diagrams concerning display of grips in an embodiment of the present invention.

In the present invention, when points are to be selected to have a referencing-referenced relationship, which points are shape determination points, or especially, which point is a bind point must be discernible immediately in a screen of the display unit 211. It is also required to distinguish a point defined as a referencing point from those that are not referencing points.

In this embodiment, a candidate point that may be designated for graphic editing is regarded as a "grip." The grip can be displayed with a particular mark. The grip includes a bind point grip representing a bind point and an ordinary grip that does not represent a bind point.

For a point not designated as a handling object, an ordinary grip of a square mark is displayed as shown in FIG. 38A(a). For a bind point, as shown in FIG. 38A(b), a rhombic graphic is displayed. When these points are designated as handling objects at the position designating unit 212 shown in FIG. 31, the corresponding marks are enlarged as shown in FIG. 38A(c) and (d) and displayed. When these grips are not referencing points, they are displayed with the marks drawn in an upper row in FIG. 38A. When they are referencing points, they are displayed with white-centered marks shown in a lower row in FIG. 38A. Alternatively, a bind point grip may be displayed in another shape such as a circle or a mark painted in a color different from that for an ordinary grip may be adopted for a bind point grip.

These marks usually become unnecessary after the completion of creation or editing of a graphic. In this embodiment, when a graphic is selected, a grip non-display mode and a grip display mode are switched automatically or by designating either of them.

In the grip non-display mode, when a graphic is a rectangle, as shown in FIG. 38B, the shape of the graphic alone is displayed. When the grip display mode is selected, as shown in FIG. 38C, grips are displayed with different marks depending on the natures of shape determination points. In this example, nine grips are set on the rectangular graphic. When the graphic is, for example, a circle which is not shown, nine grips are automatically set at positions of the graphic corresponding to the positions of grips on a circumscribed rectangle.

FIG. 39 is an explanatory diagram showing a sequence of the relating process in an embodiment of the present invention. The relating means 217 shown in FIG. 31 relates a plurality of graphics one another by following steps S91 to S97 shown in FIG. 39.

At a step S91, a graphic reference mode of deformation reference, rotation reference, or similar transformation deformation is input, which may be performed after graphic selection is completed at the step S92.

At the step S92, a plurality of graphics selected to be related mutually using a mouse are input, and thus related objects are identified.

At a step S93, grips shown in FIG. 38A are displayed on the selected graphics for easier operation.

At a step S94, if any grip on any of the selected graphics is dragged using a button on the mouse, the dragging start point or a shape determination point is recognized as a referencing point.

At a step S95, a dragging end point on other selected graphic is regarded as a referenced point. If the dragging end point does not lie on other selected graphic, relating is invalidated.

At a step S96, when a referenced point is identified, a dependent point is determined on the basis of the positional relationship between a shape determination point on the graphic and the referenced point. A degree of dependency is then calculated. The referenced point information 216 is then created and stored in the graphic information memory 213. In the referenced point information 216, the position of the referenced point, dependent point, degree of dependency, and reference mode are specified. In addition, a pointer of the shape determination information 215 concerning the referencing point is specified. In the shape determination information 215 concerning the referencing point, a pointer of referenced information 216 is specified.

At a step S97, the graphic having the referencing point is updated so that the referencing point coincides with the referenced point, and is displayed again.

FIG. 40 is an explanatory diagram showing a sequence of graphic handling in an embodiment of the present invention. The graphic handling means 218 shown in FIG. 31 executes editing for graphics having related points by following steps S101 to S107 shown in FIG. 40. This processing is invoked and executed when a point on a graphic is handled using a mouse or an associated referenced point is moved by performing any operation.

First, graphic handling is started up (S100).

At a step S101, a report saying that a point on a graphic has moved is received.

At a step S102, a graphic editing operation of movement, rotation, deformation, or similar transformation deformation is determined and executed for the graphic, of which point has moved, according to an edit mode of rotation, deformation, or similar transformation, a reference mode, and a positional relationship between a moving point and a bind point.

At a step S103, the updated graphic is re-delineated on the display unit 211.

At a step S104, the graphic information memory 213 is retrieved to see if the referenced point information 216 concerning the updated graphic is found. If the referenced point information 216 is not found, the process is terminated (S108).

At a step S105, if the referenced point information 216 is found, a new position of the referenced point is calculated using degrees of dependency on other points. Assuming that the referenced point is dependent on three points a, b, and c, and that the degrees of dependency on the three points are $k_a$, $k_b$, and $k_c$, new coordinates ($x_p$, $y_p$) for the referenced point are calculated as follows:

$$x_p = x_a k_a + x_b k_b + x_c k_c$$

$$y_p = y_a k_a + y_b k_b + y_c k_c$$

Note that ($x_a$, $y_a$), ($x_b$, $y_b$), and ($x_c$, $y_c$) are the coordinates at which the points a, b, and c lie after the graphic is updated.

At a step S106, a length by which a referencing point should move is calculated using a difference between the old and new coordinates of the referenced point according to a reference mode. The movement of the referencing point is then reported. In other words, editing is executed recursively for another graphic having a referencing point that references the referenced point.

At a step S107, if another referenced point is found, the steps S105 and S106 are repeated.

As apparent from the description of the fourth embodiment, this system may be implemented in an ordinary sequential-processing facility or in an object-oriented processing facility in which the shape determination point information 215 is structured as a processing object made up of a procedure and internal state values and the processing proceeds by passing messages. The adoption of the latter facility makes it possible to simplify the processing concerning a referencing-referenced relationship or the like.

A referencing-referenced relationship between graphics can be dissolved by executing relationship release. When relationship release is executed, the referenced point information 216 is deleted. The graphics are thereafter handled independently.

As described so far, according to the fourth embodiment of the present invention, a group of graphics having a certain relationship can be handled as a part with the positional relationship held unchanged. The associated graphics can be edited automatically without causing a discrepancy according to a type of relating process. In particular, when animated images are edited for animation, if a conventional method is used to divide a plurality of graphics into groups, graphics belonging to each group are handled as a whole. Using graphic relating according to the present invention, when individual graphic elements are deformed, parts affected by the deformation are changed accordingly and automatically. This results in effortless editing.

We claim:

1. A graphic editing apparatus comprising:
a display unit having a screen for displaying graphics;
a position designating unit for designating positions on a display screen;
a processing unit for creating and editing graphics;
a graphic displaying means for displaying a graphic in a graphic display area formed on the screen of said display unit;
a time displaying means for displaying a time display graphic on a time base in a time display area formed on the screen of said display unit;
a change information setting means for creating or editing a change reference graphic which serves as a reference for moving and deforming the graphic time-sequentially relative to the change reference graphic according to information entered by said position designating unit, and specifying graphic information associating points on the change reference graphic with points on the time display graphic; and
a display updating means for performing interpolation to calculate the position of a point on the change reference graphic with the movement of a point representing a current time instant on the time display graphic or the passage of a designated time interval, executing editing to move and deform said graphic according to the calculated position of the point, and thus updating the display screen of said graphic.

2. A graphic editing apparatus according to claim 1, further comprising:
a binding relationship setting means for defining a binding relationship between a point on graphic and a point representing a current time instant on the change reference graphic, the binding relationship indicative of an amount and type of movement deformation and of the graphic and, and specifying the binding relationship in graphic information; and wherein said
display updating means effecting graphic movement and deformation according to the calculated position of said point and the binding relationship.

3. A graphic editing apparatus according to claim 1, wherein:
said change information setting means specifies in graphic information, information for associating some states of a designated graphic with some points on the time display graphic;
said display updating means performs interpolation to calculate the states of the graphic to be displayed with the movement of a point representing a current time instant on the time display graphic or the passage of a designated time interval, and displaying said graphic according to the calculated states; and further comprising
a time editing means for changing the position of a point, which is lying on time display graphic and associated with the states of the graphic, independently of said associated states of the graphic according to information entered at said position designating unit.

4. An editing apparatus for graphics that vary depending on the value of an attribute, comprising:
a graphic displaying means for displaying a graphic in a graphic display area formed on a screen of a display unit;
an attribute value displaying means for displaying an attribute value display graphic on a predetermined attribute base in an attribute value display area formed on a screen of said display unit;
a change information setting means for creating and editing a change reference graphic, which serves as a reference for moving and deforming a graphic based on a change in a value of an attribute, according to information entered by a user, and specifying, in graphic information, information on the association of points on the change reference graphic with points on said attribute value display graphic; and
a display updating means for performing interpolation to calculate the position of a point on the change reference graphic with the movement of a point representing a current attribute value on said attribute value display graphic or the change in value of a designated attribute, and for moving and deforming said graphic according to said calculated position of said point.

5. A graphic editing apparatus according to claim 4, further comprising:
a binding relationship setting means for defining a binding relationship between a point on a graphic to be edited and a point representing an attribute value on the change reference graphic, and specifying the binding relationship in graphic information; and wherein said
display updating means performs interpolation to calculate the position of a point, which is lying on said change reference graphic and associated with a point representing a current attribute value, with the change in value of a designated attribute, effecting movement or deformation of the graphic according to said calculated position of the point and said binding relationship specified in graphic information.

6. A graphic editing apparatus according to claim 4, wherein:
said change information setting means specifies in graphic information, information on the association of some states of a designated state with some points on said attribute value display graphic; and
said display updating means performs interpolation to calculate the states of the graphic to be displayed with the movement or a point representing a current attribute value on the attribute value display graphic or the change in value of a designated attribute, and displaying the graphic according to the calculated states.

7. A synchronous graphic editing apparatus comprising:
a display unit for displaying graphics; and
a position designating unit for designating positions on a display screen;
a processing unit for creating or editing graphics;
a graphic displaying means for displaying graphics and change reference graphics serving as references for changing positions and shapes of the graphics on said display unit;
a time displaying means for displaying time display graphics on a time base in a time display area formed in said display unit in association with said change reference graphics;
a change information setting means that when some points on each of said change reference graphics serving as references for time-sequentially changing positions and shapes of the graphics are entered in said graphic display area at said position designating unit, specifies in graphic information, information on the association of points on each of the change reference graphics with points on each of the time display graphics;

a display updating means for performing interpolation to calculate the positions of points on the change reference graphics associated with points representing a current time instant on the time display graphics with the movement of the points representing a current time instant on the time display graphics or the passage of a designated time interval, synchronously changing positions or shapes of the graphics according to said calculated positions of the points; and a time display editing means for relating points on one time display graphic to points on another time display graphic, and editing the time display graphics so that said related point can move with the movement of one point.

8. A synchronous graphic editing apparatus according to claim 7, further comprising:

a graphic information memory for storing information on the association of points representing time instants on the time display graphics with time-sequentially changing states of at least one graphic to be displayed on the display unit;

the change information setting means specifies in graphic information information of associating some states of each of the designated graphics and points on said time display graphics;

the display updating means calculating the states of the graphics, which are associated with points representing a current time instant on the time display graphics, with the movement of the points representing a current time instant on said display unit or the passage of a designated time interval, synchronously changing the states of said plurality of graphics so that said plurality of graphics appear or disappear, and thus updating said display unit of graphics; and a time display editing means for relating some points on one time display graphic to some points on other time display graphic, and editing said plurality of time display graphics so that said related points move with the movement of one points.

9. A graphic editing apparatus comprising:

a display unit for displaying graphics;

a position designating unit for designating a reference point of a graphic on a display screen;

a processing unit for creating and editing graphics;

a graphic information memory which stores at least one point on a graphic plotted with a set of some points as graphic information;

a bind point setting means for defining at least one point on a graphic to be edited as at least one bind point to control the orbit of the graphic, and specifying the at least one bind point in graphic information; and a graphic handling means for effecting deformation of the graphic according to a positional relationship between the reference point and the at least one bind point.

10. A graphic editing apparatus according to claim 9, further comprising:

a grip display mode setting means for establishing a mode in which candidate points that may be designated during graphic editing are displayed in a particular style distinguishable from other ordinary points; and a grip displaying means that when a grip display mode is established, displays the at least one bind point included in said designation candidate points in a first particular style and other designation candidate points except the at least one bind point in a second particular style different from said first particular style.

11. A graphic editing method comprising:

defining at least one designated point on a graphic to be edited as a bind point, and the at least one bind point being specified in graphic information;

holding a designated point on the graphic intact, and then moving the point to a designated position during graphic editing;

when the designated point is a bind point, moving the graphic together with said designated point;

when the designated point lies on a predetermined side of the graphic, rotating the graphic toward the position of the designated point with the bind point as a center; and when the designated point is neither a bind point nor lying on said predetermined side, deforming the graphic in a moving direction of the designated point according to the positional relationship between the point and the bind point.

12. An editing method comprising:

entering a command to establish a referencing-referenced relationship between a shape determination point for determining a shape of a graphic and any other point on a graphic;

specifying a relationship between a referencing point and a referenced point in graphic information; and when a graphic having a referenced point is moved or deformed, the referencing point that references the referenced point is moved in harmony with the referenced point so as to move or deform the graphic.

13. An editing method according to claim 12, wherein:

the referencing-referenced relationship includes at least a relationship of rotation, a relationship of deformation, and a relationship of similar transformation deformation for enlargement or reduction;

when editing is executed, the graphic having the referenced point is moved or deformed, the referencing point that references the referenced point is moved in harmony with the referenced point, and the graphic having the referencing point is subjected to rotation, deformation, or similar-transformation deformation according to the reference relationship.

14. A graphic relating-based editing apparatus comprising:

a display unit for displaying graphics;

a position designating unit for designating positions in a display screen a processing unit for creating or editing graphics;

a graphic information memory for storing information concerning shape determination points that determine a shape of a graphic and a referenced point that is referenced by other points on the graphic;

a relating means that when a referencing-referenced relationship between any of said shape determination points determining said shape of said graphic and any other point on said graphic is entered at said position designating unit, specifies a relationship between said referencing point and referenced point in graphic information; and a graphic handling means that when the graphic having a referenced point is moved or deformed, moves a referencing point which references the referenced point in harmony with the referenced point, and thus performs editing of moving or deforming a graphic having a referencing point.

15. A graphic managing apparatus comprising:

a change reference graphic defining means which defines a path of a moving point, a graphic information memory for storing information concerning a reference point on a graphic which determines a shape of the graphic and for storing a relationship between the reference point and the path; and a graphic updating means for determining the shape of the graphic based upon the position on the path and the information stored in the graphic information memory.

16. A graphic managing apparatus, according to claim 15, wherein said graphic information memory also stores information concerning a bind point which determines a point on the graphic which is related to the path as being one of fixed relative to the path and moving in accordance with the path.

17. A graphic managing apparatus, according to claim 16, wherein the relationship between the reference point and the path is one of moving in accordance with the path and rotating in accordance with the path.

18. A graphic managing apparatus, in accordance with claim 15, wherein said graphic information memory stores a relationship between the reference point and a second graphic; and said graphic updating means determines the shape of the graphic based upon the position of the second graphic and the information stored in the graphic information memory.

19. A graphic managing apparatus, in accordance with claim 15 wherein said graphic information memory stores information concerning a reference point on a first graphic which determines a shape of the first graphic and for storing a relationship between the reference point and a second graphic; and said graphic updating means determines the position of the first graphic based upon the position of the second graphic and the information stored in the graphic information memory.

* * * * *

UNITED STATES PATENT AND TRADEMARK OFFICE
CERTIFICATE OF CORRECTION

PATENT NO.: 5,926,186
DATED : July 20, 1999
INVENTOR(S): Yasunari ITOH et al.

It is certified that error appears in the above-identified patent and that said Letters Patent is hereby corrected as shown below:

Col. 43, line 59, after "on" insert --the--.

Signed and Sealed this

Fourteenth Day of December, 1999

Attest:

Q. TODD DICKINSON

Attesting Officer

Acting Commissioner of Patents and Trademarks